United States Patent
Lei et al.

(10) Patent No.: US 12,069,633 B2
(45) Date of Patent: Aug. 20, 2024

(54) DOWNLINK CONTROL CHANNEL MONITORING IN MULTIPLE DOWNLINK BANDWIDTH PARTS

(71) Applicant: QUALCOMM Incorporated, San Diego, CA (US)

(72) Inventors: Jing Lei, San Diego, CA (US); Huilin Xu, Temecula, CA (US); Renqiu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/347,843

(22) Filed: Jul. 6, 2023

(65) Prior Publication Data

US 2023/0362906 A1   Nov. 9, 2023

Related U.S. Application Data

(63) Continuation of application No. 18/061,347, filed on Dec. 2, 2022, now Pat. No. 11,743,877.

(60) Provisional application No. 63/297,691, filed on Jan. 7, 2022.

(51) Int. Cl.
*H04W 72/0453* (2023.01)
*H04L 5/00* (2006.01)
*H04W 72/51* (2023.01)

(52) U.S. Cl.
CPC ....... *H04W 72/0453* (2013.01); *H04L 5/0053* (2013.01); *H04W 72/51* (2023.01)

(58) Field of Classification Search
CPC .......................... H04W 72/0453; H04W 72/51
USPC ....................................................... 370/329
See application file for complete search history.

(56) References Cited

U.S. PATENT DOCUMENTS

2019/0182000 A1   6/2019   Futaki
2023/0224878 A1   7/2023   Lei et al.

OTHER PUBLICATIONS

3GPP TS 38.213: "3rd Generation Partnership Project, Technical Specification Group Radio Access Network, NR, Physical layer procedures for control (Release 16)", 3GPP TS 38.213, V16.8.0, 3rd Generation Partnership Project, Mobile Competence Centre, 650, Route Des Lucioles, F-06921 Sophia-Antipolis Cedex, France, Dec. 2021, pp. 1-189.
3GPP TS 38.331: "3rd Generation Partnership Project; Technical Specification Group Radio Access Network; NR; Radio Resource Control (RRC) Protocol Specification (Release 16)", 3GPP TS 38.331, V16.7.0, Dec. 23, 2021, pp. 1-963, XP052083424, pp. 227, 348, 785, 865, Paragraph [05.6].

(Continued)

*Primary Examiner* — Angel T Brockman
(74) *Attorney, Agent, or Firm* — Holland & Hart LLP

(57) ABSTRACT

Methods, systems, and devices for wireless communications are described. A user equipment (UE) may receive, from a network entity, one or more control messages that indicate a configuration for a first downlink bandwidth part (BWP) associated with a first operating mode of the UE, a second downlink BWP associated with a second operating mode of the UE, a first set of resources within the first downlink BWP, and a second set of resources within the second downlink BWP. At least a portion of the configuration may correspond to a capability of the UE. The UE may monitor the first set of resources while in the first operating mode, and may monitor the second set of resources while in the second operating mode. The UE may receive a system information update or a public warning system (PWS) notification from the network entity via the second set of resources.

30 Claims, 19 Drawing Sheets

(56) References Cited

OTHER PUBLICATIONS

CMCC: "Discussion on Reduced Maximum UE Bandwidth", 3GPP TSG RAN WG1 #107-e, R1-2111613, e-Meeting, Nov. 11-19, 2021, 14 Pages.
ETRI: "SDT Handling in RRC_INACTIVE state", 3GPP TSG-RAN WG2 #112-e, R2-2009345, 3rd Generation Partnership Project, Mobile Competence Centre, 650, Route Des Lucioles, F-06921 Sophia-Antipolis Cedex, France, vol. RAN WG2, No. Online meeting, Nov. 2, 2020-Nov. 13, 2020, Oct. 23, 2020, XP051942307, 2 pages, p. 2, lines 20-21.
International Search Report and Written Opinion—PCT/US2022/080885—ISA/EPO—Apr. 4, 2023.
Moderator (Ericsson): "FL Summary #1 on Reduced Maximum UE Bandwidth for RedCap", 3GPP TSG-RAN WG1 Meeting #107-e, R1-2112497, e-Meeting, Nov. 11-19, 2021, 65 Pages.
Qualcomm Incorporated: "RedCap IDLE Mode Operation", 3GPP TSG RAN Meeting #94-e, RP-213046, e-Meeting, Dec. 6-17, 2021, 3 Pages.
Samsung: "Bandwidth Reduction for RedCap UEs", 3GPP TSG RAN WG1 #106-bis-e, R1-2109496, 3rd Generation Partnership Project, Mobile Competence Centre, 650, Route Des Lucioles, F-06921 Sophia-Antipolis Cedex, France, Vol. RAN WG1, No. e-Meeting, Oct. 11, 2021-Oct. 19, 2021, Oct. 2, 2021, XP052058442, pp. 1-6, sections 1, 2.1, 2.2 and 2.3.
Sharp: "Discussion on Reduced Maximum UE Bandwidth", 3GPP TSG RAN WG1 #107-e, R1-2112015, 3rd Generation Partnership Project, Mobile Competence Centre, 650, Route Des Lucioles, F-06921 Sophia-Antipolis Cedex, France, vol. RAN WG1, No. e-Meeting, Nov. 11, 2021-Nov. 19, 2021, Nov. 6, 2021, XP052075219, pp. 1-10, section 2.1.

DOWNLINK CONTROL CHANNEL MONITORING IN MULTIPLE DOWNLINK BANDWIDTH PARTS

CROSS REFERENCE

The present application for patent is a continuation of U.S. patent application Ser. No. 18/061,347 to LEI et al., entitled "DOWNLINK CONTROL CHANNEL MONITORING IN MULTIPLE DOWNLINK BANDWIDTH PARTS," filed Dec. 2, 2022, which claims the benefit of U.S. Provisional Patent Application No. 63/297,691 to LEI et al., entitled "DOWNLINK CONTROL CHANNEL MONITORING IN MULTIPLE DOWNLINK BANDWIDTH PARTS," filed Jan. 7, 2022, each of which is assigned to the assignee hereof, and each of which is expressly incorporated by reference herein.

TECHNICAL FIELD

The following relates to wireless communications, including downlink control channel monitoring in multiple downlink bandwidth parts (BWPs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE). Components within a wireless communication system may be coupled (e.g., operatively, communicatively, functionally, electronically, and/or electrically) to each other.

An idle or inactive UE may be configured to monitor resources in different bandwidth parts (BWPs). For example, an idle or inactive UE may switch from a first downlink BWP to a second downlink BWP such that the UE can monitor for downlink transmissions in the second downlink BWP. In some cases, however, switching between downlink BWPs and monitoring a relatively large number of resources may result in greater power consumption and higher processing overhead at the UE.

SUMMARY

The described techniques relate to improved methods, systems, devices, and apparatuses that support downlink control channel monitoring in multiple downlink bandwidth parts (BWPs). Generally, the described techniques provide for improving the efficiency of downlink monitoring procedures at an idle or inactive user equipment (UE). A UE may receive, from a network entity, one or more control messages that indicate a configuration for a first downlink BWP associated with a first operating mode of the UE, a second downlink BWP associated with a second operating mode of the UE, a first set of resources within the first downlink BWP, and a second set of resources within the second downlink BWP. At least a portion of the configuration may correspond to a capability of the UE. The UE may monitor the first set of resources while in the first operating mode, and may monitor the second set of resources while in the second operating mode. The UE may receive a system information update or a public warning system (PWS) notification from the network entity via the second set of resources. The techniques described herein may enable the UE (e.g., an idle or inactive UE) to perform downlink channel monitoring with reduced power consumption and greater processing efficiency, among other benefits.

A method for wireless communication at a UE is described. The method may include receiving one or more control messages that indicate a first configuration for a first downlink BWP and a second configuration for a second downlink BWP that is specific to reduced capability (RedCap) UEs, the first configuration identifying a first set of resources within the first downlink BWP, the second configuration identifying a second set of resources within the second downlink BWP. The method may further include monitoring the first set of resources within the first downlink BWP according to the first configuration, a radio resource control (RRC) state of the UE, and a capability of the UE. The method may further include monitoring the second set of resources within the second downlink BWP that is specific to RedCap UEs according to the second configuration, the RRC state of the UE, and the capability of the UE.

An apparatus for wireless communication at a UE is described. The apparatus may include at least one processor and memory coupled (e.g., operatively, communicatively, functionally, electronically, or electrically) with the at least one processor, the memory storing instructions executable (e.g., directly, or indirectly) by the at least one processor to cause the UE to receive one or more control messages that indicate a first configuration for a first downlink BWP and a second configuration for a second downlink BWP that is specific to RedCap UEs, the first configuration identifying a first set of resources within the first downlink BWP, the second configuration identifying a second set of resources within the second downlink BWP. The instructions may be further executable by the at least one processor to cause the UE to monitor the first set of resources within the first downlink BWP according to the first configuration, an RRC state of the UE, and a capability of the UE. The instructions may be further executable by the at least one processor to cause the UE to monitor the second set of resources within the second downlink BWP that is specific to RedCap UEs according to the second configuration, the RRC state of the UE, and the capability of the UE.

Another apparatus for wireless communication at a UE is described. The apparatus may include means for receiving one or more control messages that indicate a first configuration for a first downlink BWP and a second configuration for a second downlink BWP that is specific to RedCap UEs, the first configuration identifying a first set of resources within the first downlink BWP, the second configuration identifying a second set of resources within the second downlink BWP. The apparatus may further include means for monitoring the first set of resources within the first downlink BWP according to the first configuration, an RRC state of the UE, and a capability of the UE. The apparatus may further include means for monitoring the second set of resources within the second downlink BWP that is specific to RedCap UEs according to the second configuration, the RRC state of the UE, and the capability of the UE.

A non-transitory computer-readable medium storing code for wireless communication at a UE is described. The code may include instructions executable by at least one processor to receive one or more control messages that indicate a first configuration for a first downlink BWP and a second configuration for a second downlink BWP that is specific to RedCap UEs, the first configuration identifying a first set of resources within the first downlink BWP, the second configuration identifying a second set of resources within the second downlink BWP. The instructions may be further executable by the at least one processor to monitor the first set of resources within the first downlink BWP according to the first configuration, an RRC state of the UE, and a capability of the UE. The instructions may be further executable by the at least one processor to monitor the second set of resources within the second downlink BWP that is specific to RedCap UEs according to the second configuration, the RRC state of the UE, and the capability of the UE.

Some examples of the methods, apparatuses, and non-transitory computer-readable media described herein may further include operations, features, means, or instructions for determining a first set of parameters for the first downlink BWP based on the first configuration, the first set of parameters including one or more of a cyclic prefix, a subcarrier spacing, a number of resource blocks, or a number of symbols for a control resource set (CORESET) within the first downlink BWP.

Some examples of the methods, apparatuses, and non-transitory computer-readable media described herein may further include operations, features, means, or instructions for determining a second set of parameters for the second downlink BWP that is specific to RedCap UEs based on the second configuration, the second set of parameters including one or more of a bandwidth, a first physical resource block (PRB), or a subcarrier spacing for the second downlink BWP.

In some examples of the methods, apparatuses, and non-transitory computer-readable media described herein, monitoring the first set of resources may include operations, features, means, or instructions for receiving at least one message of a paging operation via a common search space (CSS) within the first downlink BWP according to the first configuration and the capability of the UE, where the first downlink BWP includes a CORESET with an index of zero (0).

In some examples of the methods, apparatuses, and non-transitory computer-readable media described herein, monitoring the second set of resources may include operations, features, means, or instructions for receiving one or more random access messages via the second set of resources within the second downlink BWP that is specific to RedCap UEs according to the second configuration, the RRC state of the UE, and the capability of the UE, where the second downlink BWP does not include a CORESET with an index of zero (0).

Some examples of the methods, apparatuses, and non-transitory computer-readable media described herein may further include operations, features, means, or instructions for receiving, via one or more physical downlink control channel (PDCCH) resources within the first downlink BWP, a downlink message that schedules transmission of a first system information block (SIB) within the first downlink BWP, where the first SIB indicates the second configuration of the second downlink BWP that is specific to RedCap UEs.

In some examples of the methods, apparatuses, and non-transitory computer-readable media described herein, monitoring the first set of resources may include operations, features, means, or instructions for receiving one or more cell-defined synchronization signal blocks (CD-SSBs) via the first set of resources within the first downlink BWP, and operations, features, means, or instructions for performing a cell selection procedure based on a measurement of the one or more CD-SSBs.

In some examples of the methods, apparatuses, and non-transitory computer-readable media described herein, receiving the one or more control messages may include operations, features, means, or instructions for receiving an indication of a search space (SS) configured for downlink small data transmissions (SDTs) in the first downlink BWP or the second downlink BWP, and operations, features, means, or instructions for monitoring the SS for a downlink SDT in accordance with the indication.

In some examples of the methods, apparatuses, and non-transitory computer-readable media described herein, receiving the one or more control messages may include operations, features, means, or instructions for receiving a master information block (MIB) that indicates the first configuration of the first downlink BWP, and operations, features, means, or instructions for receiving a SIB that indicates the second configuration of the second downlink BWP.

Some examples of the methods, apparatuses, and non-transitory computer-readable media described herein may further include operations, features, means, or instructions for receiving one or more of a system information message, a message of a paging operation, a random access message, an SDT, a broadcast message, a PWS notification, or a non-cell-defined synchronization signal block (NCD-SSB) via one or more CORESETs or SS sets within the first downlink BWP or the second downlink BWP that is specific to RedCap UEs.

Some examples of the methods, apparatuses, and non-transitory computer-readable media described herein may further include operations, features, means, or instructions for receiving one or more of a CD-SSB, a system information message, a message of a paging operation, or a random access message via the first set of resources within the first downlink BWP according to the first configuration, the RRC state of the UE, and the capability of the UE.

Some examples of the methods, apparatuses, and non-transitory computer-readable media described herein may further include operations, features, means, or instructions for transmitting one or more of an SDT, a random access message, UE mobility information, or a request for on-demand system information via one or more resources within an uplink BWP configured for the UE.

Some examples of the methods, apparatuses, and non-transitory computer-readable media described herein may further include operations, features, means, or instructions for transmitting a request for on-demand system information via one or more resources within an uplink BWP configured for the UE, and operations, features, means, or instructions for receiving the on-demand system information via the first set of resources within the first downlink BWP or the second set of resources within the second downlink BWP.

In some examples of the methods, apparatuses, and non-transitory computer-readable media described herein, the UE transmits the request for on-demand system information in accordance with a random access procedure.

In some examples of the methods, apparatuses, and non-transitory computer-readable media described herein, a bandwidth of the second downlink BWP that is specific to RedCap UEs is less than or equal to a maximum downlink bandwidth supported by the UE.

In some examples of the methods, apparatuses, and non-transitory computer-readable media described herein, the one or more control messages include a MIB, a SIB, an RRC message, or a combination thereof.

In some examples of the methods, apparatuses, and non-transitory computer-readable media described herein, the first downlink BWP may be used for reception of CD-SSBs.

In some examples of the methods, apparatuses, and non-transitory computer-readable media described herein, the UE may be a RedCap UE and the RRC state of the UE may be an idle RRC state or an inactive RRC state.

In some examples of the methods, apparatuses, and non-transitory computer-readable media described herein, the first downlink BWP includes a first set of CSSs configured for cell selection procedures or cell re-selection procedures and the second downlink BWP includes a second set of CSSs configured for random access procedures or paging operations.

In some examples of the methods, apparatuses, and non-transitory computer-readable media described herein, the first downlink BWP includes one or more CSSs configured for system information acquisition or paging operations.

Some examples of the methods, apparatuses, and non-transitory computer-readable media described herein may further include operations, features, means, or instructions for determining a quantity of CORESETs within the second downlink BWP based on a quantity of CORESETs within the first downlink BWP, a summation of CORESETs within other downlink BWPs of the UE, a threshold quantity of CORESETs supported by the UE, or a combination thereof.

Some examples of the methods, apparatuses, and non-transitory computer-readable media described herein may further include operations, features, means, or instructions for determining a quantity of SS sets within the second downlink BWP based on a quantity of SS sets within the first downlink BWP, a summation of SS sets within other downlink BWPs of the UE, a threshold quantity of SS sets supported by the UE, or a combination thereof.

Some examples of the methods, apparatuses, and non-transitory computer-readable media described herein may further include operations, features, means, or instructions for switching from the first downlink BWP to the second downlink BWP after transitioning from a first operating mode associated with the first downlink BWP to a second operating mode associated with the second downlink BWP.

In some examples of the methods, apparatuses, and non-transitory computer-readable media described herein, receiving the one or more control messages may include operations, features, means, or instructions for receiving system information that indicates at least one of an aggregation level (AL), a monitoring periodicity, or a monitoring occasion configuration for CSS sets within the second downlink BWP that is specific to RedCap UEs.

In some examples of the methods, apparatuses, and non-transitory computer-readable media described herein, receiving the one or more control messages may include operations, features, means, or instructions for receiving a SIB that indicates a first downlink control information (DCI) size alignment for PDCCH messages scheduled in SS sets of the first downlink BWP, a second DCI size alignment for PDCCH messages scheduled in SS sets of the second downlink BWP, or both.

In some examples of the methods, apparatuses, and non-transitory computer-readable media described herein, receiving the one or more control messages may include operations, features, means, or instructions for receiving an indication of a quantity of PRBs within the second downlink BWP that is specific to RedCap UEs, where the quantity of PRBs is based on a control channel element (CCE) AL of CORESETs within the second downlink BWP, a time duration of CORESETs within the second downlink BWP, a total number of CORESETs within the second downlink BWP, the RRC state of the UE, or a combination thereof.

In some examples of the methods, apparatuses, and non-transitory computer-readable media described herein, receiving the one or more control messages may include operations, features, means, or instructions for receiving one or more of a system information message, an RRC message, a broadcast message, or a multicast message that indicates a CCE AL for SS sets within the second downlink BWP, a quantity of blind decoding candidates for SS sets within the second downlink BWP, or both.

A method for wireless communication at a network entity is described. The method may include transmitting one or more control messages that indicate a first configuration for a first downlink BWP and a second configuration for a second downlink BWP that is specific to RedCap UEs, the first configuration identifying a first set of resources within the first downlink BWP, the second configuration identifying a second set of resources within the second downlink BWP. The method may further include transmitting a first downlink message to a RedCap UE via the first set of resources within the first downlink BWP according to the first configuration indicated by the one or more control messages. The method may further include transmitting a second downlink message to the RedCap UE via the second set of resources within the second downlink BWP that is specific to RedCap UEs according to the second configuration indicated by the one or more control messages.

An apparatus for wireless communication at a network entity is described. The apparatus may include at least one processor and memory coupled (e.g., operatively, communicatively, functionally, electronically, or electrically) with the at least one processor, the memory storing instructions executable by the at least one processor to cause the network entity to transmit one or more control messages that indicate a first configuration for a first downlink BWP and a second configuration for a second downlink BWP that is specific to RedCap UEs, the first configuration identifying a first set of resources within the first downlink BWP, the second configuration identifying a second set of resources within the second downlink BWP. The instructions may be further executable by the at least one processor to cause the network entity to transmit a first downlink message to a RedCap UE via the first set of resources within the first downlink BWP according to the first configuration indicated by the one or more control messages. The instructions may be further executable by the at least one processor to cause the network entity to transmit a second downlink message to the RedCap UE via the second set of resources within the second downlink BWP that is specific to RedCap UEs according to the second configuration indicated by the one or more control messages.

Another apparatus for wireless communication at a network entity is described. The apparatus may include means for transmitting one or more control messages that indicate a first configuration for a first downlink BWP and a second configuration for a second downlink BWP that is specific to RedCap UEs, the first configuration identifying a first set of resources within the first downlink BWP, the second configuration identifying a second set of resources within the second downlink BWP. The apparatus may further include means for transmitting a first downlink message to a RedCap UE via the first set of resources within the first downlink BWP according to the first configuration indicated by the one or more control messages. The apparatus may further include means for transmitting a second downlink message to the RedCap UE via the second set of resources within the second downlink BWP that is specific to RedCap UEs according to the second configuration indicated by the one or more control messages.

A non-transitory computer-readable medium storing code for wireless communication at a network entity is described. The code may include instructions executable by at least one processor to transmit one or more control messages that indicate a first configuration for a first downlink BWP and a second configuration for a second downlink BWP that is specific to RedCap UEs, the first configuration identifying a first set of resources within the first downlink BWP, the second configuration identifying a second set of resources within the second downlink BWP, transmit a first downlink message to a RedCap UE via the first set of resources within the first downlink BWP according to the first configuration indicated by the one or more control messages, and transmit a second downlink message to the RedCap UE via the second set of resources within the second downlink BWP that is specific to RedCap UEs according to the second configuration indicated by the one or more control messages.

In some examples of the methods, apparatuses, and non-transitory computer-readable media described herein, transmitting the first downlink message may include operations, features, means, or instructions for transmitting at least one message of a paging operation to the RedCap UE via a CSS within the first downlink BWP according to the first configuration, where the first downlink BWP includes a CORESET with an index of zero (0).

A method for wireless communications at a UE is described. The method may include receiving, from a network entity, one or more control messages that indicate a configuration for a first downlink BWP associated with a first operating mode of the UE, a second downlink BWP associated with a second operating mode of the UE, a first set of control resources within the first downlink BWP, and a second set of control resources within the second downlink BWP, where at least a portion of the configuration corresponds to a capability of the UE, monitoring, by the UE in the first operating mode, the first set of control resources within the first downlink BWP in accordance with the configuration and based on the capability of the UE, and monitoring, by the UE in the second operating mode, the second set of control resources within the second downlink BWP in accordance with the configuration and based on the capability of the UE.

An apparatus for wireless communications at a UE is described. The apparatus may include at least one processor and memory coupled (e.g., operatively, communicatively, functionally, electronically, and/or electrically) with the at least one processor, the memory storing instructions executable by the at least one processor to cause the apparatus to receive, from a network entity, one or more control messages that indicate a configuration for a first downlink BWP associated with a first operating mode of the UE, a second downlink BWP associated with a second operating mode of the UE, a first set of control resources within the first downlink BWP, and a second set of control resources within the second downlink BWP, where at least a portion of the configuration corresponds to a capability of the UE, monitor, by the UE in the first operating mode, the first set of control resources within the first downlink BWP in accordance with the configuration and based on the capability of the UE, and monitor, by the UE in the second operating mode, the second set of control resources within the second downlink BWP in accordance with the configuration and based on the capability of the UE.

Another apparatus for wireless communications at a UE is described. The apparatus may include means for receiving, from a network entity, one or more control messages that indicate a configuration for a first downlink BWP associated with a first operating mode of the UE, a second downlink BWP associated with a second operating mode of the UE, a first set of control resources within the first downlink BWP, and a second set of control resources within the second downlink BWP, where at least a portion of the configuration corresponds to a capability of the UE, means for monitoring, by the UE in the first operating mode, the first set of control resources within the first downlink BWP in accordance with the configuration and based on the capability of the UE, and means for monitoring, by the UE in the second operating mode, the second set of control resources within the second downlink BWP in accordance with the configuration and based on the capability of the UE.

A non-transitory computer-readable medium storing code for wireless communications at a UE is described. The code may include instructions executable by at least one processor to receive, from a network entity, one or more control messages that indicate a configuration for a first downlink BWP associated with a first operating mode of the UE, a second downlink BWP associated with a second operating mode of the UE, a first set of control resources within the first downlink BWP, and a second set of control resources within the second downlink BWP, where at least a portion of the configuration corresponds to a capability of the UE, monitor, by the UE in the first operating mode, the first set of control resources within the first downlink BWP in accordance with the configuration and based on the capability of the UE, and monitor, by the UE in the second operating mode, the second set of control resources within the second downlink BWP in accordance with the configuration and based on the capability of the UE.

Some examples of the method, apparatuses, and non-transitory computer-readable medium described herein may further include operations, features, means, or instructions for monitoring, by the UE in the first operating mode, the first set of control resources within the first downlink BWP, receiving, from the network entity and via the first set of control resources, the one or more control messages that indicate the configuration for the second downlink BWP and the second set of control resources within the second downlink BWP, and determining a quantity of control resources within the second downlink BWP based on a quantity of control resources within the first downlink BWP.

Some examples of the method, apparatuses, and non-transitory computer-readable medium described herein may further include operations, features, means, or instructions for determining a quantity of control resources within the second downlink BWP based on a quantity of control resources within the first downlink BWP, a summation of control resources within different downlink BWPs of the UE, and a threshold quantity of control resources corresponding to the capability of the UE.

Some examples of the method, apparatuses, and non-transitory computer-readable medium described herein may further include operations, features, means, or instructions for determining a quantity of SS sets within the second downlink BWP based on a quantity of SS sets within the first downlink BWP, a summation of SS sets within different downlink BWPs of the UE, and a threshold quantity of SS sets corresponding to the capability of the UE.

In some examples of the method, apparatuses, and non-transitory computer-readable medium described herein, receiving the one or more control messages may include operations, features, means, or instructions for receiving control signaling indicating one or both of a first set of parameters related to the first downlink BWP or a second set of parameters related to the second downlink BWP, the first set of parameters including a bandwidth, an initial PRB location, a numerology, or a combination thereof associated with the first downlink BWP, the second set of parameters including a bandwidth, an initial PRB location, a numerology, or a combination thereof associated with the second downlink BWP, where the first set of parameters may be different from the second set of parameters.

In some examples of the method, apparatuses, and non-transitory computer-readable medium described herein, receiving the one or more control messages may include operations, features, means, or instructions for receiving, from the network entity, a MIB indicating the configuration for the first downlink BWP and receiving, from the network entity, one or more of a SIB, an RRC message, a multicast message, or a broadcast message indicating the configuration for the second downlink BWP.

Some examples of the method, apparatuses, and non-transitory computer-readable medium described herein may further include operations, features, means, or instructions for performing a BWP switching procedure from the first downlink BWP to the second downlink BWP based on transitioning from the first operating mode to the second operating mode, where monitoring the second set of control resources within the second downlink BWP may be based on performing the BWP switching procedure.

Some examples of the method, apparatuses, and non-transitory computer-readable medium described herein may further include operations, features, means, or instructions for performing, using CORESETs and SS sets within the first downlink BWP or using CORESETs and SS sets within the second downlink BWP, one or more procedures associated with the first operating mode of the UE or the second operating mode of the UE, the one or more procedures including a system information acquisition procedure, a system information update procedure, a mobility procedure, a paging operation, a random access procedure, a small data transfer procedure, an on-demand system information transmission request procedure, or a combination thereof.

In some examples of the method, apparatuses, and non-transitory computer-readable medium described herein, the first operating mode and the second operating mode correspond to an RRC idle state or an RRC inactive state of the UE and the first set of control resources within the first downlink BWP and the second set of control resources within the second downlink BWP include CSS sets.

In some examples of the method, apparatuses, and non-transitory computer-readable medium described herein, the first operating mode and the second operating mode correspond to an RRC inactive state or an RRC connected state of the UE and the first set of control resources within the first downlink BWP and the second set of control resources within the second downlink BWP include UE-specific search space (USS) sets, CSS sets, or both.

In some examples of the method, apparatuses, and non-transitory computer-readable medium described herein, the first downlink BWP and the second downlink BWP correspond to different frequency ranges.

In some examples of the method, apparatuses, and non-transitory computer-readable medium described herein, the first downlink BWP includes a first CSS configured for cell selection procedures or cell re-selection procedures by UEs in an RRC idle state or an RRC inactive state and the second downlink BWP includes at least a second CSS configured for random access procedures or paging operations by UEs in an RRC idle state or an RRC inactive state.

In some examples of the method, apparatuses, and non-transitory computer-readable medium described herein, the first downlink BWP includes one or more CSSs configured for system information acquisition procedures, system information update procedures, mobility procedures, or paging operations by UEs in an RRC idle state or an RRC inactive state.

In some examples of the method, apparatuses, and non-transitory computer-readable medium described herein, receiving the one or more control messages may include operations, features, means, or instructions for receiving a SIB indicating one or more of an AL, a monitoring periodicity, or a monitoring occasion configuration for CSS sets within the second downlink BWP based on the capability of the UE.

Some examples of the method, apparatuses, and non-transitory computer-readable medium described herein may further include operations, features, means, or instructions for receiving, by the UE in the first operating mode, a CD-SSB, a system information message, a message of a paging operation, a PEI message, a random access message, or a combination thereof from the network entity via the first set of control resources within the first downlink BWP associated with the first operating mode of the UE.

In some examples of the method, apparatuses, and non-transitory computer-readable medium described herein, receiving the one or more control messages may include operations, features, means, or instructions for receiving, from the network entity, a SIB indicating a first DCI size alignment for PDCCH messages in SS sets of the first downlink BWP, a second DCI size alignment for PDCCH messages in SS sets of the second downlink BWP, or both.

Some examples of the method, apparatuses, and non-transitory computer-readable medium described herein may further include operations, features, means, or instructions for receiving one or more of a random access message, a system information message, a multicast message, a broadcast message, a message of a paging operation, an SDT, or an NCD-SSB from the network entity via the second set of control resources within the second downlink BWP.

In some examples of the method, apparatuses, and non-transitory computer-readable medium described herein, receiving the one or more control messages may include operations, features, means, or instructions for receiving control signaling indicating a quantity of PRBs within the second downlink BWP, where the quantity of PRBs may be based on a CCE AL of CORESETs within the second downlink BWP, a time duration of CORESETs within the second downlink BWP, a total quantity of CORESETs within the second downlink BWP, an RRC state of the UE, or a combination thereof.

In some examples of the method, apparatuses, and non-transitory computer-readable medium described herein, receiving the one or more control messages may include operations, features, means, or instructions for receiving one or more of a system information message, an RRC message, a broadcast message, or a multicast message indicating a CCE AL for SS sets within the second downlink BWP, a quantity of blind decoding candidates for SS sets within the second downlink BWP, or both.

A method for wireless communications at a network entity is described. The method may include transmitting one or more control messages that indicate a configuration for a first downlink BWP associated with a first operating mode of a UE, a second downlink BWP associated with a second operating mode of the UE, a first set of control resources within the first downlink BWP, and a second set of control resources within the second downlink BWP, where at least a portion of the configuration corresponds to a capability of the UE, transmitting a first set of messages via the first set of control resources within the first downlink BWP in accordance with the configuration and based on the capability of the UE, and transmitting a second set of messages via the second set of control resources within the second downlink BWP in accordance with the configuration and based on the capability of the UE.

An apparatus for wireless communications at a network entity is described. The apparatus may include at least one processor and memory coupled (e.g., operatively, communicatively, functionally, electronically, and/or electrically) with the at least one processor, the memory storing instructions executable by the at least one processor to cause the apparatus to transmit one or more control messages that indicate a configuration for a first downlink BWP associated with a first operating mode of a UE, a second downlink BWP associated with a second operating mode of the UE, a first set of control resources within the first downlink BWP, and a second set of control resources within the second downlink BWP, where at least a portion of the configuration corresponds to a capability of the UE, transmit a first set of messages via the first set of control resources within the first downlink BWP in accordance with the configuration and based on the capability of the UE, and transmit a second set of messages via the second set of control resources within the second downlink BWP in accordance with the configuration and based on the capability of the UE.

Another apparatus for wireless communications at a network entity is described. The apparatus may include means for transmitting one or more control messages that indicate a configuration for a first downlink BWP associated with a first operating mode of a UE, a second downlink BWP associated with a second operating mode of the UE, a first set of control resources within the first downlink BWP, and a second set of control resources within the second downlink BWP, where at least a portion of the configuration corresponds to a capability of the UE, means for transmitting a first set of messages via the first set of control resources within the first downlink BWP in accordance with the configuration and based on the capability of the UE, and means for transmitting a second set of messages via the second set of control resources within the second downlink BWP in accordance with the configuration and based on the capability of the UE.

A non-transitory computer-readable medium storing code for wireless communications at a network entity is described. The code may include instructions executable by at least one processor to transmit one or more control messages that indicate a configuration for a first downlink BWP associated with a first operating mode of a UE, a second downlink BWP associated with a second operating mode of the UE, a first set of control resources within the first downlink BWP, and a second set of control resources within the second downlink BWP, where at least a portion of the configuration corresponds to a capability of the UE, transmit a first set of messages via the first set of control resources within the first downlink BWP in accordance with the configuration and based on the capability of the UE, and transmit a second set of messages via the second set of control resources within the second downlink BWP in accordance with the configuration and based on the capability of the UE.

Some examples of the method, apparatuses, and non-transitory computer-readable medium described herein may further include operations, features, means, or instructions for determining a quantity of control resources within the second downlink BWP based on a quantity of control resources within the first downlink BWP and transmitting, to the UE, an indication of the quantity of control resources within the second downlink BWP.

Some examples of the method, apparatuses, and non-transitory computer-readable medium described herein may further include operations, features, means, or instructions for determining a quantity of control resources within the second downlink BWP based on a quantity of control resources within the first downlink BWP and a summation of control resources within different downlink BWPs of the UE and transmitting, to the UE, an indication of the quantity of control resources within the second downlink BWP.

Some examples of the method, apparatuses, and non-transitory computer-readable medium described herein may further include operations, features, means, or instructions for determining a quantity of SS sets within the second downlink BWP based on a quantity of SS sets within the first downlink BWP, a summation of SS sets within different downlink BWPs of the UE, and a threshold quantity of SS sets related to capabilities of UEs that may be permitted to connect with the network entity and transmitting, to the UE, an indication of the quantity of control resources within the second downlink BWP.

In some examples of the method, apparatuses, and non-transitory computer-readable medium described herein, transmitting the one or more control messages may include operations, features, means, or instructions for transmitting control signaling indicating one or both of a first set of parameters related to the first downlink BWP or a second set of parameters related to the second downlink BWP, the first set of parameters including a bandwidth, an initial PRB location, a numerology, or a combination thereof associated with the first downlink BWP, the second set of parameters including a bandwidth, an initial PRB location, a numerology, or a combination thereof associated with the second downlink BWP, where the first set of parameters may be different from the second set of parameters.

In some examples of the method, apparatuses, and non-transitory computer-readable medium described herein, transmitting the one or more control messages may include operations, features, means, or instructions for transmitting, to the UE, a MIB indicating the configuration for the first downlink BWP and transmitting, to the UE, one or more of a SIB, a dedicated RRC message, a multicast message, or a broadcast message indicating the configuration for the second downlink BWP.

In some examples of the method, apparatuses, and non-transitory computer-readable medium described herein, the first operating mode and the second operating mode correspond to an RRC idle state or an RRC inactive state of the UE and the first set of control resources within the first downlink BWP and the second set of control resources within the second downlink BWP include CSS sets.

In some examples of the method, apparatuses, and non-transitory computer-readable medium described herein, the first operating mode and the second operating mode correspond to an RRC inactive state or an RRC connected state of the UE and the first set of control resources within the first downlink BWP and the second set of control resources within the second downlink BWP include USS sets, CSS sets, or both.

In some examples of the method, apparatuses, and non-transitory computer-readable medium described herein, the first downlink BWP and the second downlink BWP correspond to different frequency ranges.

In some examples of the method, apparatuses, and non-transitory computer-readable medium described herein, the first downlink BWP includes a first CSS configured for cell selection procedures or cell re-selection procedures by UEs in an RRC idle state or an RRC inactive state and the second downlink BWP includes at least a second CSS configured for random access procedures or paging operations by UEs in an RRC idle state or an RRC inactive state.

In some examples of the method, apparatuses, and non-transitory computer-readable medium described herein, the first downlink BWP includes one or more CSSs configured for system information acquisition procedures, system information update procedures, mobility procedures, or paging operations by UEs in an RRC idle state or an RRC inactive state.

In some examples of the method, apparatuses, and non-transitory computer-readable medium described herein, transmitting the one or more control messages may include operations, features, means, or instructions for transmitting a SIB indicating one or more of an AL, a monitoring periodicity, or a monitoring occasion configuration for CSS sets within the second downlink BWP based on the capability of the UE.

Some examples of the method, apparatuses, and non-transitory computer-readable medium described herein may further include operations, features, means, or instructions for transmitting a CD-SSB, a system information message, a message of a paging operation, a random access message, or a combination thereof from the network entity via the first set of control resources within the first downlink BWP associated with the first operating mode of the UE.

In some examples of the method, apparatuses, and non-transitory computer-readable medium described herein, transmitting the one or more control messages may include operations, features, means, or instructions for transmitting a SIB indicating a first DCI size alignment for PDCCH messages in SS sets of the first downlink BWP, a second DCI size alignment for PDCCH messages in SS sets of the second downlink BWP, or both.

Some examples of the method, apparatuses, and non-transitory computer-readable medium described herein may further include operations, features, means, or instructions for transmitting one or more of a random access message, a system information message, a multicast message, a broadcast message, a message of a paging operation, a SDT, or an NCD-SSB via the second set of control resources within the second downlink BWP.

In some examples of the method, apparatuses, and non-transitory computer-readable medium described herein, transmitting the one or more control messages may include operations, features, means, or instructions for transmitting control signaling indicating a quantity of PRBs within the second downlink BWP, where the quantity of PRBs may be based on a CCE AL of CORESETs within the second downlink BWP, a time duration of CORESETs within the second downlink BWP, a total quantity of CORESETs within the second downlink BWP, an RRC state of the UE, or a combination thereof.

In some examples of the method, apparatuses, and non-transitory computer-readable medium described herein, transmitting the one or more control messages may include operations, features, means, or instructions for transmitting one or more of a system information message, an RRC message, a broadcast message, or a multicast message indicating a CCE AL for SS sets within the second downlink BWP, a quantity of blind decoding candidates for SS sets within the second downlink BWP, or both.

A method for wireless communications at a UE is described. The method may include receiving, from a network entity, one or more control messages that indicate a configuration for a first downlink BWP associated with a first operating mode of the UE, a second downlink BWP associated with a second operating mode of the UE, a first set of resources within the first downlink BWP, and a second set of resources within the second downlink BWP, where at least a portion of the configuration corresponds to a capability of the UE, receiving, by the UE in the first operating mode, one or more messages via the first set of resources within the first downlink BWP in accordance with the configuration and based on the capability of the UE, and receiving, by the UE in the second operating mode, one or both of a system information message or a PWS message via the second set of resources within the second downlink BWP in accordance with the configuration and based on the capability of the UE.

An apparatus for wireless communications at a UE is described. The apparatus may include at least one processor and memory coupled (e.g., operatively, communicatively, functionally, electronically, and/or electrically) with the at least one processor, the memory storing instructions executable by the at least one processor to cause the apparatus to receive, from a network entity, one or more control messages that indicate a configuration for a first downlink BWP associated with a first operating mode of the UE, a second downlink BWP associated with a second operating mode of the UE, a first set of resources within the first downlink BWP, and a second set of resources within the second downlink BWP, where at least a portion of the configuration corresponds to a capability of the UE, receive, by the UE in the first operating mode, one or more messages via the first set of resources within the first downlink BWP in accordance with the configuration and based on the capability of the UE, and receive, by the UE in the second operating mode, one or both of a system information message or a PWS message via the second set of resources within the second downlink BWP in accordance with the configuration and based on the capability of the UE.

Another apparatus for wireless communications at a UE is described. The apparatus may include means for receiving, from a network entity, one or more control messages that indicate a configuration for a first downlink BWP associated with a first operating mode of the UE, a second downlink BWP associated with a second operating mode of the UE, a first set of resources within the first downlink BWP, and a second set of resources within the second downlink BWP, where at least a portion of the configuration corresponds to a capability of the UE, means for receiving, by the UE in the first operating mode, one or more messages via the first set of resources within the first downlink BWP in accordance with the configuration and based on the capability of the UE, and means for receiving, by the UE in the second operating mode, one or both of a system information message or a PWS message via the second set of resources within the second downlink BWP in accordance with the configuration and based on the capability of the UE.

A non-transitory computer-readable medium storing code for wireless communications at a UE is described. The code may include instructions executable by at least one processor to receive, from a network entity, one or more control messages that indicate a configuration for a first downlink BWP associated with a first operating mode of the UE, a second downlink BWP associated with a second operating mode of the UE, a first set of resources within the first downlink BWP, and a second set of resources within the second downlink BWP, where at least a portion of the configuration corresponds to a capability of the UE, receive, by the UE in the first operating mode, one or more messages via the first set of resources within the first downlink BWP in accordance with the configuration and based on the capability of the UE, and receive, by the UE in the second operating mode, one or both of a system information message or a PWS message via the second set of resources within the second downlink BWP in accordance with the configuration and based on the capability of the UE.

Some examples of the method, apparatuses, and non-transitory computer-readable medium described herein may further include operations, features, means, or instructions for performing a random access procedure with the network entity via the second set of resources within the second downlink BWP.

In some examples of the method, apparatuses, and non-transitory computer-readable medium described herein, receiving one or both of the system information message or the PWS message may include operations, features, means, or instructions for receiving a random access message from the network entity via the second set of resources within the second downlink BWP in accordance with the random access procedure, the random access message indicating one or both of the system information message or the PWS message.

In some examples of the method, apparatuses, and non-transitory computer-readable medium described herein, receiving one or both of the system information message or the PWS message may include operations, features, means, or instructions for receiving a random access message from the network entity via the second set of resources within the second downlink BWP based on identifying that the second downlink BWP does not include a CSS configured for paging operations, the random access message indicating one or both of the system information message or the PWS message.

In some examples of the method, apparatuses, and non-transitory computer-readable medium described herein, receiving one or both of the system information message or the PWS message may include operations, features, means, or instructions for receiving a message of a paging operation from the network entity via the second set of resources within the second downlink BWP based on identifying that the second downlink BWP includes a CSS configured for paging operations, the message of the paging operation indicating one or both of the system information message or the PWS message.

In some examples of the method, apparatuses, and non-transitory computer-readable medium described herein, receiving one or both of the system information message or the PWS message may include operations, features, means, or instructions for receiving a message of a paging operation from the network entity via the second set of resources within the second downlink BWP, the message of the paging operation scheduling a downlink SDT from the network entity and monitoring the second set of resources within the second downlink BWP for the downlink SDT from the network entity in accordance with the message of the paging operation, the downlink SDT indicating one or both of the system information message or the PWS message.

In some examples of the method, apparatuses, and non-transitory computer-readable medium described herein, receiving one or both of the system information message or the PWS message may include operations, features, means, or instructions for receiving a PDCCH transmission from the network entity via the second set of resources within the second downlink BWP, the PDCCH transmission scheduling a broadcast or multicast physical downlink shared channel (PDSCH) transmission from the network entity and monitoring the second set of resources for the broadcast or multicast PDSCH transmission from the network entity in accordance with the PDCCH transmission, the broadcast or multicast PDSCH transmission indicating one or both of the system information message or the PWS message.

A method for wireless communications at a network entity is described. The method may include transmitting one or more control messages that indicate a configuration for a first downlink BWP associated with a first operating mode of a UE, a second downlink BWP associated with a second operating mode of the UE, a first set of resources within the first downlink BWP, and a second set of resources within the second downlink BWP, where at least a portion of the configuration corresponds to a capability of the UE, transmitting one or more messages via the first set of resources within the first downlink BWP in accordance with the configuration and based on the capability of the UE, and transmitting one or both of a system information message or a PWS message via the second set of resources within the second downlink BWP in accordance with the configuration and based on the capability of the UE.

An apparatus for wireless communications at a network entity is described. The apparatus may include at least one processor and memory coupled (e.g., operatively, communicatively, functionally, electronically, and/or electrically) with the at least one processor, the memory storing instructions executable by the at least one processor to cause the apparatus to transmit one or more control messages that indicate a configuration for a first downlink BWP associated with a first operating mode of a UE, a second downlink BWP associated with a second operating mode of the UE, a first set of resources within the first downlink BWP, and a second set of resources within the second downlink BWP, where at least a portion of the configuration corresponds to a capability of the UE, transmit one or more messages via the first set of resources within the first downlink BWP in accordance with the configuration and based on the capability of the UE, and transmit one or both of a system information message or a PWS message via the second set of resources within the second downlink BWP in accordance with the configuration and based on the capability of the UE.

Another apparatus for wireless communications at a network entity is described. The apparatus may include means for transmitting one or more control messages that indicate a configuration for a first downlink BWP associated with a first operating mode of a UE, a second downlink BWP associated with a second operating mode of the UE, a first set of resources within the first downlink BWP, and a second set of resources within the second downlink BWP, where at least a portion of the configuration corresponds to a capability of the UE, means for transmitting one or more messages via the first set of resources within the first downlink BWP in accordance with the configuration and based on the capability of the UE, and means for transmitting one or both of a system information message or a PWS message via the second set of resources within the second downlink BWP in accordance with the configuration and based on the capability of the UE.

A non-transitory computer-readable medium storing code for wireless communications at a network entity is described. The code may include instructions executable by at least one processor to transmit one or more control messages that indicate a configuration for a first downlink BWP associated with a first operating mode of a UE, a second downlink BWP associated with a second operating mode of the UE, a first set of resources within the first downlink BWP, and a second set of resources within the second downlink BWP, where at least a portion of the configuration corresponds to a capability of the UE, transmit one or more messages via the first set of resources within the first downlink BWP in accordance with the configuration and based on the capability of the UE, and transmit one or both of a system information message or a PWS message via the second set of resources within the second downlink BWP in accordance with the configuration and based on the capability of the UE.

Some examples of the method, apparatuses, and non-transitory computer-readable medium described herein may further include operations, features, means, or instructions for performing a random access procedure with the UE via the second set of resources within the second downlink BWP.

In some examples of the method, apparatuses, and non-transitory computer-readable medium described herein, transmitting one or both of the system information message or the PWS message may include operations, features, means, or instructions for transmitting a random access message to the UE via the second set of resources within the second downlink BWP in accordance with the random access procedure, the random access message indicating one or both of the system information message or the PWS message.

In some examples of the method, apparatuses, and non-transitory computer-readable medium described herein, transmitting one or both of the system information message or the PWS message may include operations, features, means, or instructions for transmitting a random access message to the UE via the second set of resources within the second downlink BWP based on identifying that the second downlink BWP does not include a CSS configured for paging operations, the random access message indicating one or both of the system information message or the PWS message.

In some examples of the method, apparatuses, and non-transitory computer-readable medium described herein, transmitting one or both of the system information message or the PWS message may include operations, features, means, or instructions for transmitting a message of a paging operation to the UE via the second set of resources within the second downlink BWP based on identifying that the second downlink BWP includes a CSS configured for paging operations, the message of the paging operation indicating one or both of the system information message or the PWS message.

In some examples of the method, apparatuses, and non-transitory computer-readable medium described herein, transmitting one or both of the system information message or the PWS message may include operations, features, means, or instructions for transmitting a message of a paging operation to the UE via the second set of resources within the second downlink BWP, the message of the paging operation scheduling a downlink SDT from the network entity and transmitting the downlink SDT to the UE via the second set of resources in accordance with the message of a paging operation, the downlink SDT indicating one or both of the system information message or the PWS message.

In some examples of the method, apparatuses, and non-transitory computer-readable medium described herein, transmitting one or both of the system information message or the PWS message may include operations, features, means, or instructions for transmitting a PDCCH transmission to the UE via the second set of resources within the second downlink BWP, the PDCCH transmission scheduling a broadcast or multicast PDSCH transmission from the network entity and transmitting the broadcast or multicast PDSCH transmission via the second set of resources in accordance with the PDCCH transmission, the broadcast or multicast PDSCH transmission indicating one or both of the system information message or the PWS message.

DETAILED DESCRIPTION

Figure 1:
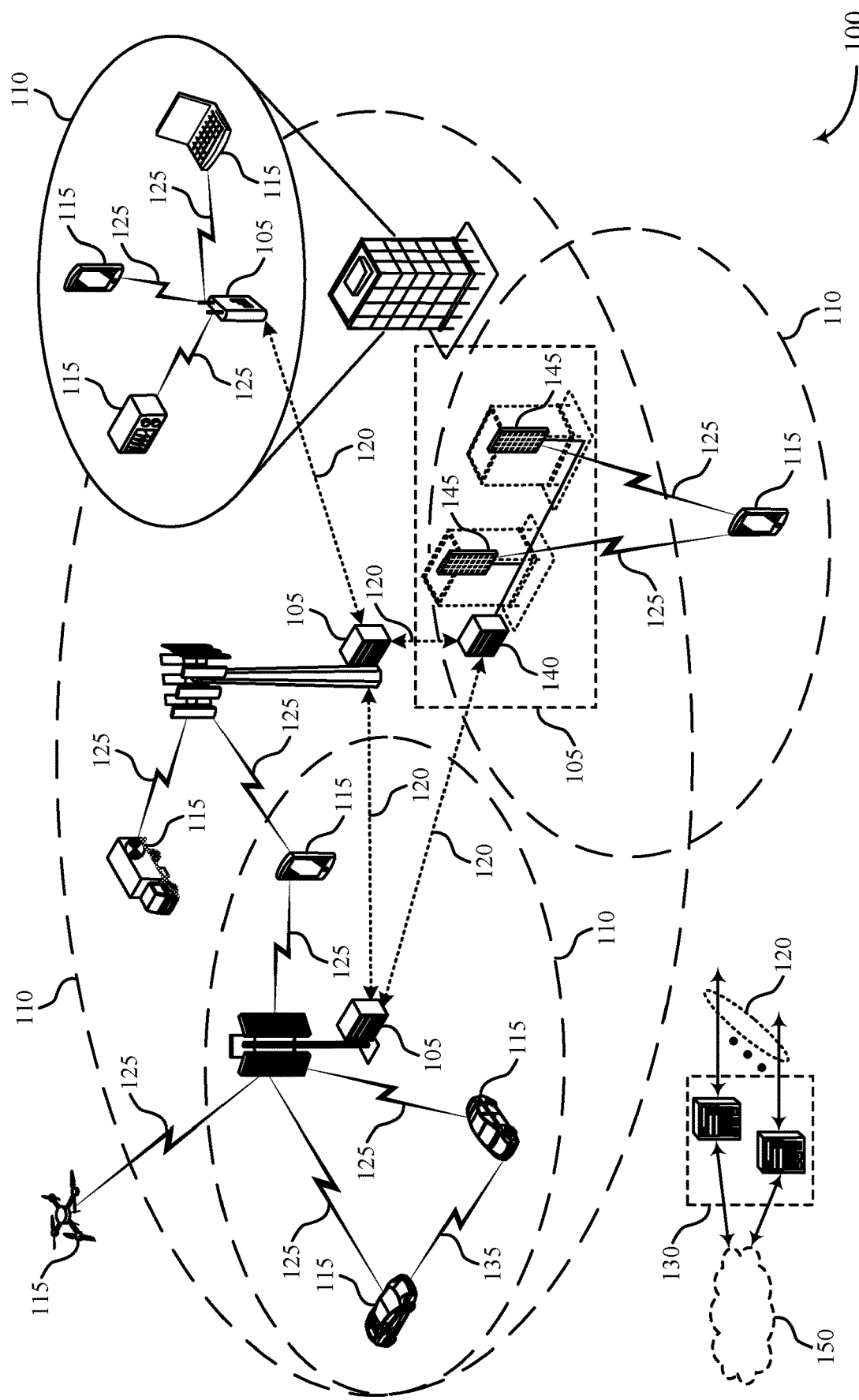
FIGS. 1 and 2 illustrate examples of wireless communications systems that support downlink control channel monitoring in multiple downlink bandwidth parts (BWPs) in accordance with aspects of the present disclosure.

In comparison to other user equipments (UEs), a reduced capability (RedCap) UE may be associated with reduced processing capabilities, higher battery life, and lower overall cost. As such, RedCap UEs may be suitable for internet of things (IoT), augmented reality (AR), virtual reality (VR), and vehicle-to-everything (V2X) applications, among other examples. In some cases, a RedCap UE in an idle mode or an inactive mode may be configured to monitor a first downlink bandwidth part (BWP) for system information updates, paging messages (for example, messages of paging operations), or cell-defined (CD) synchronization signal blocks (SSB) from a network entity. The RedCap UE may also be configured with a second initial downlink BWP, which may be specific to RedCap UEs. The RedCap UE may monitor the second downlink BWP for random access messages, paging messages, or non-cell-defined (NCD) SSBs from the network entity.

If, however, the first downlink BWP and the second downlink BWP correspond to different frequency bands, monitoring both the first downlink BWP and the second downlink BWP may result in greater power consumption and decreased processing efficiency at the RedCap UE. For example, the RedCap UE may perform a relatively large number of blind decoding operations (e.g., monitoring downlink channels for notifications and scheduling information) on resources within the first downlink BWP and resources within the second downlink BWP, even if the RedCap UE is not scheduled to receive any downlink transmissions from the network entity on these resources.

To reduce the processing costs and power consumption associated with downlink monitoring procedures for idle or inactive RedCap UEs, the total number of control resources in the first downlink BWP and the second downlink BWP (e.g., the downlink BWP configured for RedCap UEs) may be constrained to a threshold number of control resource sets (CORESET) and a threshold number of search spaces (SS). For example, the network entity may configure the first downlink BWP and the second downlink BWP such that a total number of CORESETs and SSs in the first downlink BWP and the second downlink BWP is less than a threshold. In some examples, the total number of CORESETs and SSs in the first downlink BWP and the second downlink BWP may depend on a capability of non-RedCap UEs.

The network entity (e.g., a base station) may configure the RedCap UE with the first downlink BWP and the second downlink BWP via system information or radio resource control (RRC) signaling. After the network entity configures the RedCap UE with the first downlink BWP and the second downlink BWP, the RedCap UE may monitor both the first downlink BWP and the second downlink BWP in accordance with information provided by the network entity. In some examples, the network entity may transmit a system information update or a public warning system (PWS) notification to the RedCap UE via resources within the second downlink BWP.

Aspects of the present disclosure may be implemented to realize one or more of the following advantages. The described techniques may support greater processing efficiency and reduced power consumption at a RedCap UE, among other benefits. For example, the techniques described herein may reduce the number of control resources (e.g., CORESETs, SSs) that a RedCap UE is configured to monitor while operating in an idle or inactive mode, which may reduce the processing costs and power consumption associated with idle or inactive physical downlink control channel (PDCCH) monitoring activities performed by the RedCap UE. Specifically, the described techniques may reduce the number of blind decoding operations performed by the RedCap UE, which may enable the RedCap UE to perform idle or inactive mode operations with greater processing efficiency (e.g., using fewer processing resources) and reduced power consumption.

Aspects of the disclosure are initially described in the context of wireless communications systems, resource diagrams, and process flows. Aspects of the disclosure are further illustrated by and described with reference to apparatus diagrams, system diagrams, and flowcharts that relate to downlink control channel monitoring in multiple downlink BWPs.

FIG. 1 illustrates an example of a wireless communications system 100 that supports downlink control channel monitoring in multiple downlink BWPs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a device such as a cellular phone, a smart phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or an MTC device, which may be implemented in various articles such as appliances, drones, robots, vehicles, or meters.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more SS sets, and each SS set may include one or multiple control channel candidates in one or more aggregation levels (ALs) arranged in a cascaded manner. An AL for a control channel candidate may refer to a number of control channel resources (e.g., control channel elements (CCEs)) associated with encoded information for a control information format having a given payload size. SS sets may include common search space (CSS) sets configured for sending control information to multiple UEs 115 and USS sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs 115. MTC or IoT UEs 115 may include MTC/enhanced MTC (eMTC, also referred to as category (CAT)-M, CAT M1) UEs, NB-IoT (also referred to as CAT NB1) UEs 115, as well as other types of UEs 115. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, a D2D communication link may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each of the access network transmission entities 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In comparison to other eMBB and URLLC devices, a RedCap UE 115 may be associated with lower cost and lower complexity. For example, a RedCap UE 115 may have a reduced bandwidth capability or a reduced minimum number of receive branches. Additionally, or alternatively, a RedCap UE 115 may be configured with a lower maximum number of downlink MIMO layers, a lower maximum modulation order, or reduced duplex operational capabilities. As an example, a maximum bandwidth of a frequency range 1 (FR1) RedCap UE 115 during and after initial access may be 20 MHz, and a maximum bandwidth of a frequency range 2 (FR2) RedCap UE 115 during and after initial access may be 100 MHz. In some cases, a RedCap UE 115 may or may not support carrier aggregation and dual connectivity. A RedCap UE 115 may support a standalone mode or single connectivity for operations in a single frequency band at a time.

For frequency bands in which other UEs 115 are equipped with a minimum of 2 receive antenna ports, the minimum number of receive branches supported by a RedCap UE 115 may be set to 1. However, some RedCap UEs 115 may support 2 receive branches in these frequency bands. For frequency bands in which other UEs 115 (e.g., other than vehicular UEs 115 with 2 receive branches) are equipped with a minimum of 4 receive antenna ports, the minimum number of receive branches supported by a RedCap UE 115 may also be set to 1. However, some RedCap UEs 115 may support 2 receive branches in these frequency bands as well. In some cases, a base station 105 may be capable of determining the number of receive branches supported by a UE 115.

A RedCap UE 115 with 1 receive branch may be capable of supporting 1 downlink MIMO layer. Likewise, a RedCap UE 115 with 2 receive branches may be capable of supporting 2 downlink MIMO layers. Support for 256QAM in downlink may be optional (e.g., not mandatory) for an FR1 RedCap UE 115. Some RedCap UEs 115 may support half-duplex or frequency division duplex (FDD) type A communications. Other RedCap UEs 115 may also support full-duplex FDD and time division duplexing (TDD).

Some examples of RedCap UEs 115 may include wearable devices, connected industry devices, and smart city devices. Wearable devices may include smart watches, AR or VR glasses, or eHealth and medical monitoring devices, among other examples. Wearable devices may have downlink-heavy reference rates (e.g., 5-50 Mbps for downlink, 2-5 Mbps for uplink), a peak downlink rate of 150 Mbps, and a peak uplink data rate of 50 Mbps. Wearable devices may have latency and reliability constraints that generally correspond to the latency and reliability constraints used for eMBB. The battery life of a wearable device generally lasts multiple days (e.g., up to 1 or 2 weeks).

Connected industry devices may include pressure sensors, humidity sensors, motion sensors, thermal sensors, accelerometers, and actuators, among other examples. Connected industry devices may have uplink-heavy reference rates (e.g., 2 Mbps), less than 100 ms of latency (e.g., 5-10 ms for safety-related sensors), a reliability of approximately 99.99%, and a battery life of at least a few years. Smarty city devices may be used for video surveillance. Smart city devices may have uplink-heavy reference rates (e.g., 2-4 Mbps for economy devices, 7.5-25 Mbps for high-end devices), less than 500 ms of latency, and a relatively high reliability (e.g., between 99% and 99.9%). The reduced complexity of RedCap devices may enable device designs with compact form factors. RedCap devices may support all TDD and FDD frequency bands configured for 5G NR.

The wireless communications system 100 may support SSB transmission in an initial downlink BWP. In FR1, a RedCap UE 115 may be configured with a first downlink BWP that includes resources allocated for CD-SSB reception and all of CORESET #0 (e.g., a default initial downlink BWP for non-RedCap UEs). The RedCap UE 115 may also be configured with a second downlink BWP (e.g., separate from the first downlink BWP). If the second downlink BWP is configured for random access but is not configured for paging in idle or inactive modes, the RedCap UE 115 may not expect the second downlink BWP to include resources allocated for SSB reception, CORESET #0, or resources allocated for system information block (SIB) reception.

If, for example, the RedCap UE 115 performs random access in the second downlink BWP, the RedCap UE 115 may not be configured to monitor for paging messages in the first downlink BWP that includes CORESET #0. If the second downlink BWP is configured for paging, the RedCap UE 115 may expect the second downlink BWP to include resources allocated for receiving NCD-SSB from a serving cell of the RedCap UE, but may not expect the second downlink BWP to include CORESET #0 or resources allocated for SIB reception. If, for example, the second downlink BWP (e.g., a separate, SIB-configured, initial downlink BWP for RedCap UEs) includes all of CORESET #0, the RedCap UE 115 may use the bandwidth and location of CORESET #0 in downlink during initial access.

The periodicity of NCD-SSBs in the second downlink BWP may be the same or different from a periodicity of CD-SSBs in the first downlink BWP. However, the periodicity of NCD-SSBs may not be less than the periodicity of CD-SSBs. If the second downlink BWP (e.g., a separate initial configured downlink BWP) is configured to include all of CORESET #0, the RedCap UE 115 may expect to receive CD-SSBs in the second downlink BWP. In some examples, a network entity may determine to configure SSB resources, master information block (MIB)-configured CORESET #0, or SIB1 resources such that these resources are located within the second downlink BWP. For some SSB and CORESET #0 multiplexing patterns, if the second downlink BWP (e.g., a separate initial configured downlink BWP) is configured to include all of CORESET #0, the RedCap UE 115 may expect to receive CD-SSBs in the second downlink BWP.

The wireless communications system 100 may support greater processing efficiency and reduced power consumption at a RedCap UE 115, among other benefits. For example, the techniques described herein may reduce the number of control resources (e.g., CORESETs, SSs) that a RedCap UE 115 is configured to monitor while operating in an idle or inactive mode, which may reduce the processing costs and power consumption associated with idle or inactive physical downlink control channel (PDCCH) monitoring activities performed by the RedCap UE 115. Specifically, the described techniques may reduce the number of blind decoding operations performed by the RedCap UE 115, which may enable the RedCap UE 115 to perform idle or inactive mode operations with greater processing efficiency (e.g., using fewer processing resources) and reduced power consumption.

Figure 2:
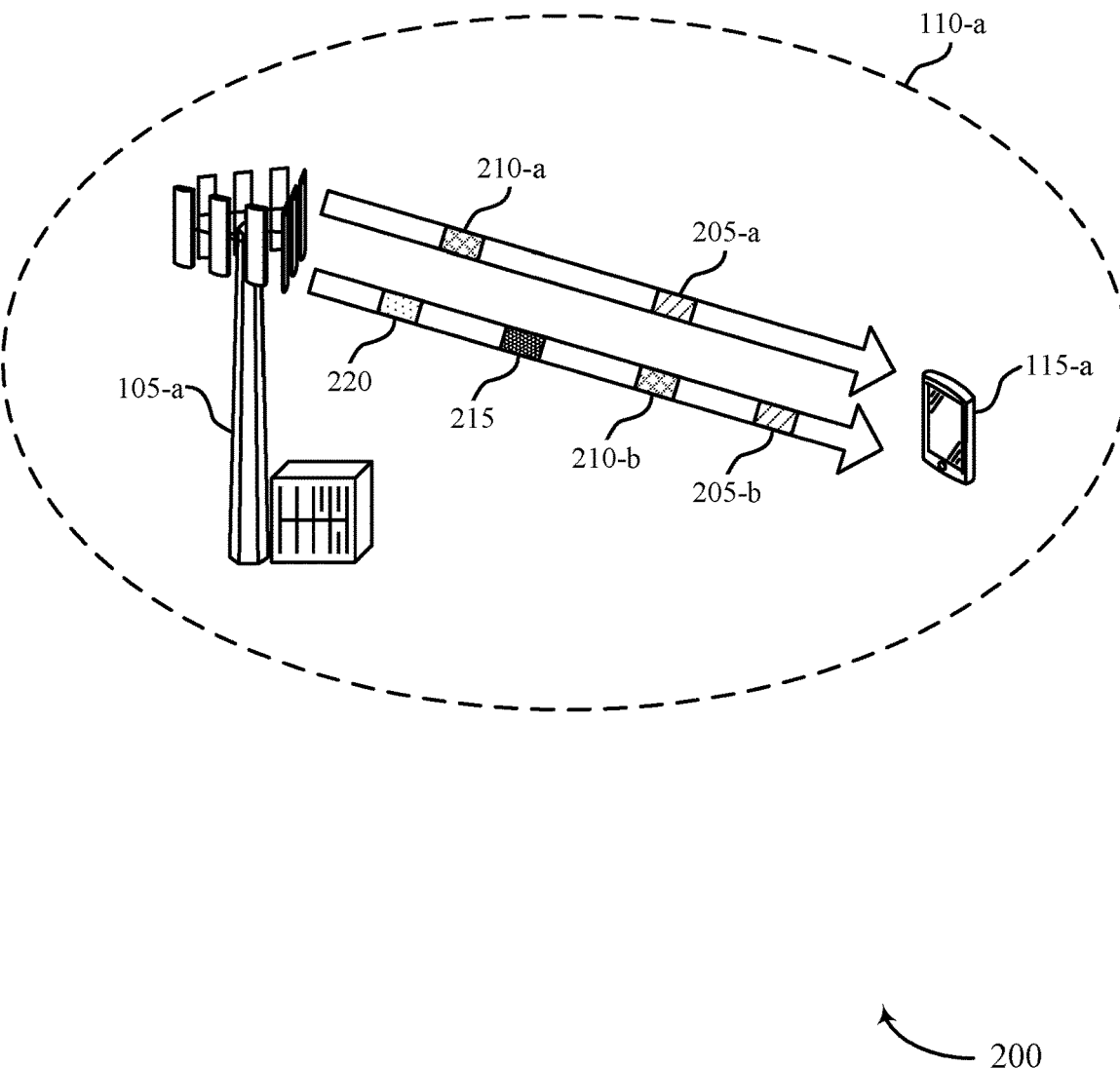

FIG. 2 illustrates an example of a wireless communications system 200 that supports downlink control channel monitoring in multiple downlink BWPs in accordance with aspects of the present disclosure. The wireless communications system 200 may implement or be implemented by aspects of wireless communications system 100. For example, the wireless communications system 200 may include a base station 105-a and a UE 115-a, which may be examples of corresponding devices described with reference to FIG. 1. The base station 105-a (e.g., a network entity) and the UE 115-a (e.g., a RedCap UE) may communicate within a geographic coverage area 110-a, which may be an example of a geographic coverage area 110 described with reference to FIG. 1. In the wireless communications system 200, the UE 115-a may switch between a first downlink BWP and a second BWP while performing various idle or inactive mode operations.

In both FR1 and FR2, a separate initial downlink BWP can be configured (e.g., via SIB) for idle or inactive RedCap UEs. This separate initial downlink BWP may be constrained by the maximum bandwidth supported by RedCap UEs. CD-SSB resources and MIB-configured CORESET #0 may or may not be located within this separate initial downlink BWP configured for RedCap UEs. If the RedCap-specific initial downlink BWP does not include the entire CORESET #0 configured by MIB, separate common CORESETs and SS sets may be configured within the RedCap-specific initial downlink BWP. For cell search and system information acquisition, an idle or inactive RedCap UE may monitor CORESET #0 and CSS sets for SIB1 and other system information (OSI). Common CORESETs and SS sets for other idle or inactive mode procedures can be configured in the RedCap-specific initial downlink BWP or within the bandwidth of CORESET #0.

In accordance with various rules specified for non-RedCap UEs, each downlink BWP can be provided via higher layer signaling with P<3 CORESETs if coresetPoolIndex is not provided or if coresetPoolIndex is provided and a value of coresetPoolIndex is same for all CORESETs, P<5 CORESETs if coresetPoolIndex is not provided for a first CORESET, or if coresetPoolIndex is provided and a value of coresetPoolIndex is 0 for a first CORESET and 1 for a second CORESET, and S≤10 search space sets (determined based on an association between SS set index and CORESET index).

In contrast to a SIB1-configured initial downlink BWP for non-RedCap UEs, the RedCap-specific initial downlink BWP configured via SIB may not include CORESET #0. Therefore, the CORESET and SS set configuration rules may be modified for idle or inactive RedCap UEs. To attain an appropriate balance between UE complexity reduction and co-existence between different UE types, the described techniques provide improved PDCCH monitoring procedures for RedCap UEs in idle or inactive modes that are configured to switch between CORESET #0 and a RedCap-specific initial downlink BWP to perform various idle or inactive mode procedures.

The wireless communications system 200 may support a CORESET and SS set configuration that improves the efficiency of downlink channel monitoring for idle or inactive RedCap UEs. For an idle or inactive RedCap UEs configured with a separate initial downlink BWP (e.g., different from a downlink BWP that includes CORESET #0), the bandwidth of the separate initial downlink BWP may be no less than 6*Q physical resource blocks (PRB), where a reference numerology for the separate initial downlink BWP can be configured separate from a reference numerology used for CORESET #0. The variable Q may defined by Equation 1, shown below, where $P_{redcap}$ denotes the total number of CORESETs configured in the separate initial downlink BWP of the RedCap UE.

$$Q = \max_{1 \le p \le P_{redcap}} \left[ \frac{AL \text{ of CORESET } p \text{ configured in separate initial } DL\ BWP \text{ of } RedCap\ UE}{\text{time duration of CORESET } p} \right] \quad (1)$$

For RedCap UEs in an idle state, $P_{redcap}$ includes the number of CORESETs associated with CSS sets. For RedCap UEs in inactive state, $P_{redcap}$ includes the number of CORESETs associated with CSS sets and UE-specific search space (USS) sets. CORESETs and SS sets associated with idle or inactive mode procedures can be jointly configured in CORESET #0 as well as in the separate initial downlink BWP for RedCap UEs.

Examples of idle or inactive mode procedures include SIB1 or OSI acquisition, on-demand transmission of RedCap-specific system information, paging operations, paging early indication (PEI) reception, mobility procedures, random access procedures (e.g., Type 1 or Type 2 random access procedures), small uplink data transfers based on a configured grant or in accordance with a random access procedure (e.g., a Type 1 or a Type 2 random access procedure), or small downlink data transfers triggered by paging messages, multicast messages, or broadcast messages, among other examples. A PEI may be an example of a PDCCH message that can provide UE power savings in paging operations. As described herein, mobility procedures may include cell-level mobility procedures (e.g., cell selection, cell re-selection, handover) and TRP-level or beam-level mobility procedures.

CORESETs and SS sets for idle mode procedures and inactive mode procedures can be configured within the same downlink BWP, or distributed across different downlink BWPs. For example, a random access CSS for idle RedCap UEs may be configured in a RedCap-specific initial downlink BWP, while a random access CSS for inactive RedCap UEs may be configured within CORESET #0. Additionally, or alternatively, CSS sets for system information acquisition or paging reception by idle or inactive UEs may be configured within CORESET #0.

The total number of CORESETs and SS sets configured in the MIB-configured CORESET #0 (e.g., $P_{CORESET0}$, $S_{CORESET0}$) and SIB-configured separate initial downlink BWP (e.g., $P_{Redcap}$, $S_{Redcap}$) may be upper-bounded by $P_0$ and $S_0$, where $P_0$ and $S_0$ correspond to the total number of CORESETs and SS sets configured in a downlink BWP of a non-RedCap UE. Specifically, the total number of CORESETs in CORESET #0 and the separate initial downlink BWP may be determined according to the inequality $P_{CORESET0} + P_{RedCap} \le P_0$ (e.g. $P_0 \le 3$), and the total number of SS sets in CORESET #0 and the separate initial downlink BWP may be determined according to the inequality $S_{CORESET0} + S_{RedCap} \le S_0$ (e.g. $S_0 \le 10$).

The control channel element (CCE) aggregation level (AL) and the number of blind decoding candidates for SS sets configured in the RedCap-specific initial downlink BWP may be explicitly provided to a RedCap UE via system information (e.g., for idle and inactive RedCap UEs) or RRC signaling (e.g., for inactive RedCap UEs). the AL for CSS sets configured in the separate initial downlink BWP may be less than a maximum value (e.g., 4, a minimum AL for CSS sets configured by SIB1 within CORESET #0). The downlink control information (DCI) size alignment for PDCCH transmissions in SS sets of CORESET #0 and the separate initial downlink BWP can be enabled or disabled via SIB.

In the example of FIG. 2, the base station 105-a may transmit one or more control messages 205 to the UE 115-a. The one or more control messages may indicate a configuration for a first downlink BWP associated with a first operating mode of the UE 115-a, a second downlink BWP associated with a second operating mode of the UE 115-a, a first set of resources within the first downlink BWP, and a second set of resources within the second downlink BWP. In some examples, the base station 105-a may transmit one or more control messages 205-a to the UE 115-a via the first set of resources within the first downlink BWP. Additionally, or alternatively, the base station 105-a may transmit one or more control messages 205-b to the UE 115-a via the second set of resources within the second downlink BWP.

The base station 105-a may also transmit SSBs 210 to the UE 115-a via the first set of resources within the first downlink BWP and the second set of resources within the second downlink BWP. For example, the base station 105-a may transmit a CD-SSB 210-a to the UE 115-a via the first set of resources within the first downlink BWP (e.g., while the UE 115-a is in the first operating mode), and may transmit an NCD-SSB 210-b to the UE 115-a via the second set of resources within the second downlink BWP (e.g., while the UE 115-a is in the second operating mode). If, for example, the UE 115-a transitions from the first operating mode to the second operating mode, the UE 115-a may perform a BWP switching procedure from the first downlink BWP to the second downlink BWP.

In some examples, the UE 115-a may receive a PWS notification 215 from the base station 105-a via the second set of resources within the second downlink BWP. Likewise, the UE 115-a may receive a system information update 220 from the base station 105-a via the second set of resources within the second downlink BWP. The base station 105-a may indicate the PWS notification 215 or the system information update 220 via a random access message (e.g., msgB or msg4), a paging message, a paging-triggered downlink small data transmission (SDT), or a PDCCH-triggered multicast or broadcast physical downlink shared channel (PDSCH) transmission, among other examples.

The wireless communications system 200 may support greater processing efficiency and reduced power consumption at the UE 115-a (e.g., a RedCap UE), among other benefits. For example, the techniques described herein may reduce the number of control resources (e.g., CORESETs, SSs) that the UE 115-a is configured to monitor while operating in an idle or inactive mode, which may reduce the processing costs and power consumption associated with idle or inactive physical downlink control channel (PDCCH) monitoring activities performed by the UE 115-a. Specifically, the described techniques may reduce the number of blind decoding operations performed by the UE 115-a, which may enable the UE 115-a to perform idle or inactive mode operations with greater processing efficiency (e.g., using fewer processing resources) and reduced power consumption.

Figure 3A:
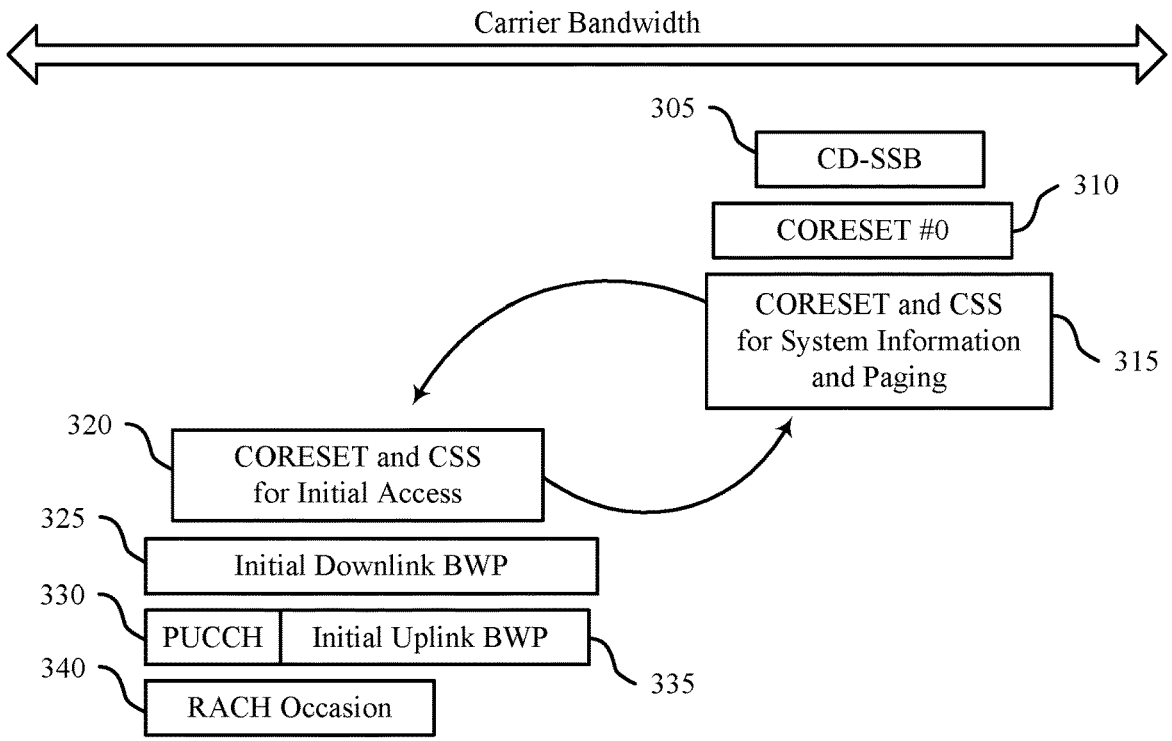
FIGS. 3A and 3B illustrate examples of resource diagrams that support downlink control channel monitoring in multiple downlink BWPs in accordance with aspects of the present disclosure.
Figure 3B:
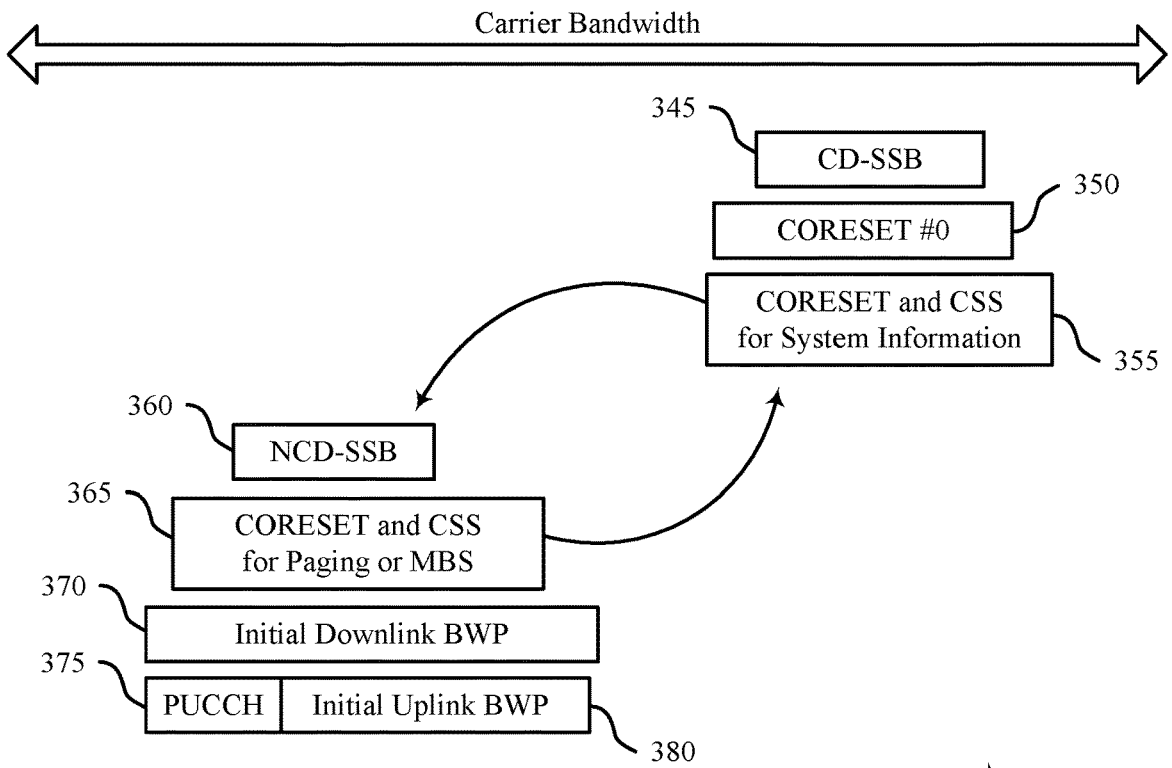

FIGS. 3A and 3B illustrate examples of a resource diagram 300 and a resource diagram 301 that support downlink control channel monitoring in multiple downlink BWPs in accordance with aspects of the present disclosure. The resource diagram 300 and the resource diagram 301 may implement or be implemented by aspects of the wireless communications system 100 or the wireless communications system 200. For example, the resource diagram 300 and the resource diagram 301 may implement or be implemented by a UE 115 (e.g., a RedCap UE) or a base station 105 (e.g., a network entity), which may be examples of corresponding devices described with reference to FIGS. 1 and 2. In the resource diagram 300 and the resource diagram 301, a RedCap UE in an idle or inactive mode may switch between a first downlink BWP and a second downlink BWP to monitor for downlink messages from a network entity.

The resource diagram 300 and the resource diagram 301 may support system information updates and PWS notifications for idle and inactive RedCap UEs. For an idle or inactive RedCap UE performing a random access procedure in a separate initial downlink BWP, PWS notifications and system information updates for the RedCap UE can be indicated via msg4 (e.g., in a Type-1 random access procedure) or msgB (e.g., in a Type-2 random access procedure) if a paging CSS is not configured within the separate initial downlink BWP. If, however, a paging CSS is configured within the separate initial downlink BWP for idle and inactive RedCap UEs, PWS notifications and system information updates for RedCap UEs can be indicated via paging messages (e.g., a short message or a paging message). Additionally, or alternatively, a PWS notification or a system information update can be delivered within the separate initial downlink BWP via a paging-triggered downlink small data transmission. PWS notifications and system information updates can also be delivered via a broadcast or multicast PDSCH transmission scheduled by a PDCCH transmission associated with searchSpaceBroadcast (which is configured within the separate initial downlink BWP).

In the example of FIG. 3A, an idle RedCap UE may camp on CORESET #0 of a serving cell to receive a CD-SSB, system information, paging messages, or a combination thereof. Accordingly, the idle RedCap UE may switch to a separate initial downlink BWP to perform random access or to initiate a transfer to connected mode. The idle RedCap UE performing random access in the separate initial BWP may refrain from monitoring for paging messages in CORESET #0 prior to establishing an RRC connection with a network entity. System information updates and PWS notifications for the RedCap UE may be delivered via msg4 or msgB transmissions scheduled in the RedCap-specific initial downlink BWP.

The idle RedCap UE may be configured to monitor a first downlink BWP for a CD-SSB 305. The first downlink BWP may include CORESET #0 310 and one or more CORESETs and CSSs 315 configured for system information acquisition procedures and system information update procedures. For example, the idle RedCap UE may receive SIB1 or OSI from a network entity via the one or more CORESETs and CSSs 315. In some examples, the idle RedCap UE may perform a BWP switching procedure from the first downlink BWP to the second downlink BWP based on transitioning from a first operating mode to a second operating mode. The second downlink BWP may include one or more CORESETs and CSSs 320 configured for initial access, an initial downlink BWP 325 configured for RedCap UEs, one or more physical uplink shared channel (PUCCH) resources 330, an initial uplink BWP 335, and one or more random access channel (RACH) occasions 340.

In the example of FIG. 3B, an idle or inactive RedCap UE may receive a CD-SSB and system information in CORESET #0. The idle or inactive RedCap UE may also receive an NCD-SSB and monitor for paging messages in a separate initial downlink BWP. An indication of a system information update or a PWS notification can be delivered to the idle or inactive RedCap UE via a paging message or a short message. Additionally, or alternatively, system information updates and PWS notifications can be delivered to the idle or inactive RedCap UE via downlink small data transmissions triggered by paging messages. The idle or inactive RedCap UE may also receive system information updates and PWS notifications via one or more broadcast transmissions, multicast transmissions, PDCCH transmissions, or PDSCH transmissions associated with searchSpaceBroadcast, which may be configured in the separate initial downlink BWP.

The idle or inactive RedCap UE may be configured to monitor a first downlink BWP for a CD-SSB 345. The first downlink BWP may include CORESET #0 350 and one or more CORESETs and CSSs 355 configured for system information acquisition procedures and system information update procedures. For example, the idle or inactive RedCap UE may receive SIB1 or OSI from a network entity via the one or more CORESETs and CSSs 355. In some examples, the idle or inactive RedCap UE may perform a BWP switching procedure from the first downlink BWP to the second downlink BWP based on transitioning from a first operating mode to a second operating mode. The idle or inactive RedCap UE may be configured to monitor the second downlink BWP for an NCD-SSB 360. The second downlink BWP may include one or more CORESETs and CSSs 365 configured for paging and multicast broadcast services (MBS), an initial downlink BWP 370 configured for RedCap UEs, one or more PUCCH resources 375, and an initial uplink BWP 380.

The resource diagram 300 and the resource diagram 301 may support greater processing efficiency and reduced power consumption at a RedCap UE, among other benefits. For example, the techniques described herein may reduce the number of control resources (e.g., CORESETs, SSs) that a RedCap UE is configured to monitor while operating in an idle or inactive mode, which may reduce the processing costs and power consumption associated with idle or inactive physical downlink control channel (PDCCH) monitoring activities performed by the RedCap UE. Specifically, the described techniques may reduce the number of blind decoding operations performed by the RedCap UE, which may enable the RedCap UE to perform idle or inactive mode operations with greater processing efficiency (e.g., using fewer processing resources) and reduced power consumption.

Figure 4:
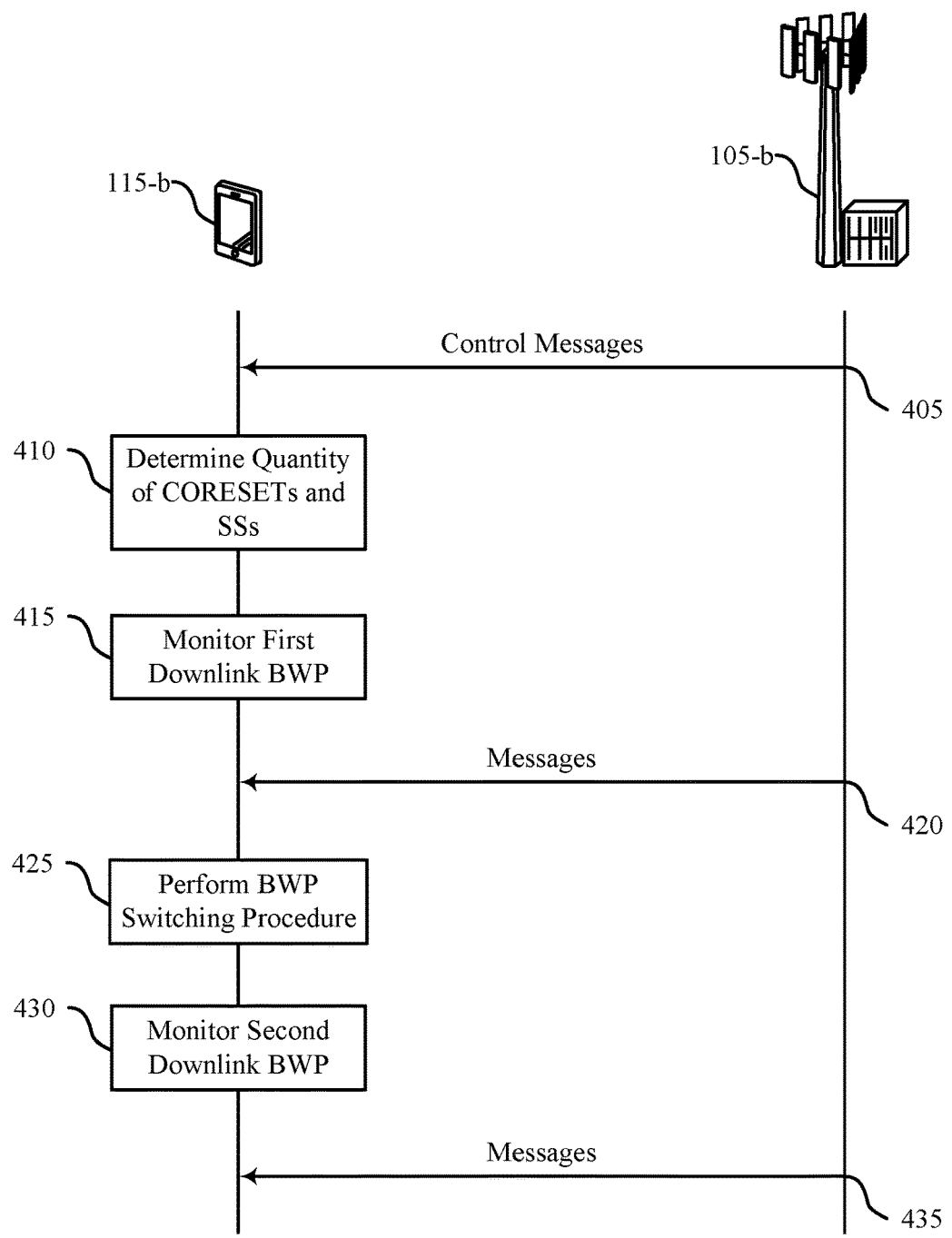
FIGS. 4 and 5 illustrate examples of process flows that support downlink control channel monitoring in multiple downlink BWPs in accordance with aspects of the present disclosure.

FIG. 4 illustrates an example of a process flow 400 that supports downlink control channel monitoring in multiple downlink BWPs in accordance with aspects of the present disclosure. The process flow 400 may implement or be implemented by aspects of the wireless communications system 100 or the wireless communications system 200. For example, the process flow 400 may include a base station 105-*b* (e.g., a network entity) and a UE 115-*b* (e.g., a RedCap UE), which may be examples of corresponding devices described with reference to FIGS. 1 and 2. In the following description of the process flow 400, operations between the base station 105-*b* and the UE 115-*b* may be performed in a different order or at a different time than as shown. Additionally, or alternatively, some operations may be omitted from the process flow 400, and other operations may be added to the process flow 400. In the example of FIG. 4, the UE 115-*b* (e.g., an idle or inactive RedCap UE) may be configured to monitor a first downlink BWP and a second downlink BWP for downlink messages from the base station 105-*b*.

At 405, the UE 115-*b* may receive, from the base station 105-*b*, one or more control messages that indicate a configuration for a first downlink BWP associated with a first operating mode of the UE 115-*b*, a second downlink BWP associated with a second operating mode of the UE 115-*b*, a first set of control resources within the first downlink BWP, and a second set of control resources within the second downlink BWP. For example, the UE 115-*b* may receive a MIB indicating a configuration for the first downlink BWP and the first set of control resources. Similarly, the UE 115-*b* may receive a SIB, a dedicated RRC message, a multicast message, or a broadcast message indicating a configuration for the second downlink BWP and the second set of control resources. In some examples, the first downlink BWP and the second downlink BWP may correspond to different frequency ranges (e.g., within a carrier bandwidth).

At least a portion of the configuration may correspond to a capability of the UE 115-*b* or an operating mode of the UE 115-*b*. In some examples, both the first operating mode of the UE 115-*b* and the second operating mode of the UE 115-*b* may correspond to the same RRC state. For example, the first operating mode of the UE 115-*b* and the second operating mode of the UE 115-*b* may correspond to an RRC idle state (RRC_IDLE) or an RRC inactive state (RRC_INACTIVE) of the UE 115-*b*. In such examples, the first set of control resources within the first downlink BWP and the second set of control resources within the second downlink BWP may include CSSs, and may exclude other SSs. In other examples, the first operating mode of the UE 115-*b* and the second operating mode of the UE 115-*b* may correspond to an RRC inactive state (RRC_INACTIVE) or an RRC connected state (RRC_CONNECTED) of the UE 115-*b*. In such examples, the first set of control resources within the first downlink BWP and the second set of control resources within the second downlink BWP may include CSSs, USSs, or both.

The one or more control messages may also indicate one or both of a first set of parameters related to the first downlink BWP or a second set of parameters related to the second downlink BWP. The first set of parameters may include a bandwidth, an initial PRB location, a numerology, or a combination thereof associated with the first downlink BWP, and the second set of parameters may include a bandwidth, an initial PRB location, a numerology, or a combination thereof associated with the second downlink BWP. In some examples, the first set of parameters may be different from the second set of parameters. Additionally, or alternatively, the one or more control messages may indicate a quantity of PRBs within the second downlink BWP, which may be based on a CCE AL of CORESETs within the second downlink BWP, a time duration of CORESETs within the second downlink BWP, a total quantity of CORESETs within the second downlink BWP, an RRC state of the UE 115-*b*, or a combination thereof. The one or more control messages may also include a system information message, an RRC message, a broadcast message, or a multicast message that indicate a CCE AL for SS sets within the second downlink BWP, a quantity of blind decoding candidates for SS sets within the second downlink BWP, or both.

At 410, the UE 115-*b* may determine a quantity of control resources (e.g., CORESETs, SSs) within the second downlink BWP based on a quantity of control resources in the first downlink BWP, a summation of control resources in different downlink BWPs of the UE 115-*b*, and a threshold quantity of control resources related to the capability of the UE 115-*b*. In some examples, the first downlink BWP may include a first CSS configured for cell selection procedures or cell re-selection procedures by UEs in an RRC idle state or an RRC inactive state. The first downlink BWP may also include one or more CSSs configured for system information acquisition procedures, system information update procedures, mobility procedures, or paging reception procedures by UEs in an RRC idle state or an RRC inactive state. Additionally, or alternatively, the second downlink BWP may include a second CSS configured for random access procedures or paging reception procedures by UEs in an RRC idle state or an RRC inactive state.

At 415, the UE 115-*b* may monitor the first set of control resources within the first downlink BWP while the UE 115-*b* is in the first operating mode. The UE 115-*b* may monitor the first set of control resources in accordance with the configuration and based on the capability of the UE 115-*b*. In some examples, the UE 115-*b* may perform, using CORESETs and SSs within the first downlink BWP, one or more procedures associated with the first operating mode of the UE 115-*b*. For example, the UE 115-*b* may perform one or more of a system information update procedure, a mobility procedure, a paging reception procedure (also referred to as a paging operation), a random access procedure, a small data transfer procedure, or an on-demand system information transmission request procedure using the first set of control resources within the first downlink BWP.

At 420, the UE 115-*b* may receive one or more messages from the base station 105-*b* via the first set of control resources within the first downlink BWP. For example, the UE 115-*b* may receive a SIB indicating one or more of an AL, a monitoring periodicity, or a monitoring occasion configuration for CSS sets within the second downlink BWP based on the capability of the UE 115-*b*. Additionally, or alternatively, the UE 115-*b* may receive (while in the first operating mode) a CD-SSB, a system information message, a paging message, a PEI message, a random access message, or a combination thereof from the base station 105-*b* via the first set of control resources within the first downlink BWP associated with the first operating mode of the UE 115-*b*. The UE 115-*b* may also receive a SIB indicating a first DCI size alignment for PDCCH messages in SSs of the first downlink BWP, a second DCI size alignment for PDCCH messages in SSs of the second downlink BWP, or both.

At 425, the UE 115-*b* may perform a BWP switching procedure from the first downlink BWP to the second BWP based on transitioning from the first operating mode to the second operating mode. At 430, the UE 115-*b* may monitor the second set of control resources within the second downlink BWP while the UE 115-*b* is in the second operating mode. The UE 115-*b* may monitor the second set of control resources in accordance with the configuration and based on the capability of the UE 115-*b*. In some examples, the UE 115-*b* may perform, using CORESETs and SSs within the second downlink BWP, one or more procedures associated with the second operating mode of the UE 115-*b*. For example, the UE 115-*b* may perform one or more of a system information update procedure, a mobility procedure, a paging reception procedure, a random access procedure, a small data transfer procedure, or an on-demand system information transmission request procedure using the second set of control resources within the second downlink BWP.

At 435, the UE 115-*b* may receive one or more messages from the base station 105-*b* via the second set of control resources within the second downlink BWP. For example, the UE 115-*b* may receive one or more of a random access message, a system information message, a multicast message, a broadcast message, a paging message, an SDT (e.g., uplink or downlink), or an NCD-SSB from the base station 105-*b* via the second set of control resources within the second downlink BWP. As described with reference to FIG. 5, the UE 115-*b* may also receive a system information update or a PWS notification from the base station 105-*b* via the second set of control resources within the second downlink BWP.

The process flow 400 may support greater processing efficiency and reduced power consumption at the UE 115-*b* (e.g., a RedCap UE), among other benefits. For example, the techniques described herein may reduce the number of control resources (e.g., CORESETs, SSs) that the UE 115-*b* is configured to monitor while operating in an idle or inactive mode, which may reduce the processing costs and power consumption associated with idle or inactive physical downlink control channel (PDCCH) monitoring activities performed by the UE 115-*b*. Specifically, the described techniques may reduce the number of blind decoding operations performed by the UE 115-*b*, which may enable the UE 115-*b* to perform idle or inactive mode operations with greater processing efficiency (e.g., using fewer processing resources) and reduced power consumption.

Figure 5:
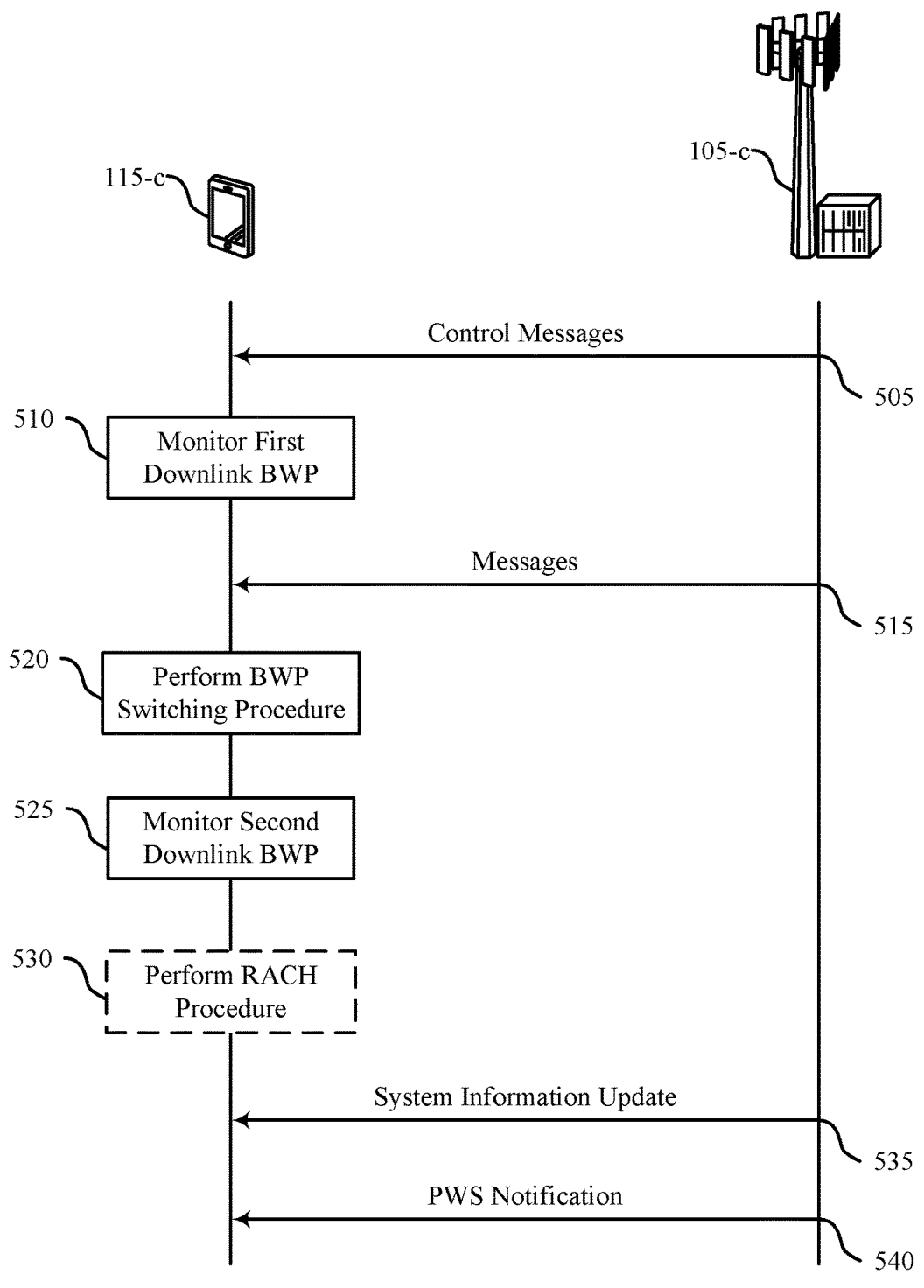

FIG. 5 illustrates an example of a process flow 500 that supports downlink control channel monitoring in multiple downlink BWPs in accordance with aspects of the present disclosure. The process flow 500 may implement or be implemented by aspects of the wireless communications system 100 or the wireless communications system 200. For example, the process flow 500 may include a base station 105-*c* (e.g., a network entity) and a UE 115-*c* (e.g., a RedCap UE), which may be examples of corresponding devices described with reference to FIGS. 1 and 2. In the following description of the process flow 500, operations between the base station 105-*c* and the UE 115-*c* may be performed in a different order or at a different time than as shown. Additionally, or alternatively, some operations may be omitted from the process flow 500, and other operations may be added to the process flow 500. In the example of FIG. 5, the UE 115-*c* may receive a system information update or a PWS notification from the base station 105-*c* via resources in a downlink BWP configured for idle or inactive RedCap UEs.

At 505, the UE 115-*c* may receive one or more control messages from the base station 105-*c*. The one or more control messages may indicate a configuration for a first downlink BWP associated with a first operating mode of the UE, a second downlink BWP associated with a second operating mode of the UE, a first set of resources within the first downlink BWP, and a second set of resources within the second downlink BWP. At least a portion of the configuration may correspond to a capability of the UE 115-*c*. At 510, the UE 115-*c* may monitor the first set of resources within the first downlink BWP while the UE 115-*c* is in the first operating mode. The UE 115-*c* may monitor the first set of resources in accordance with the configuration (indicated by the one or more control messages) and based on the capability of the UE 115-*c*. At 515, the UE 115-*c* may receive one or more messages from the base station 105-*c* via the first set of resources within the first downlink BWP. The UE 115-*c* may receive the one or more messages in accordance with the configuration and based on the capability of the UE 115-*c*.

At 520, the UE 115-*c* may perform a BWP switching procedure from the first downlink BWP to the second downlink BWP based on transitioning from the first operating mode to the second operating mode. In some examples, the first operating mode and the second operating mode may correspond to the same RRC state. For example, the first operating mode and the second operating mode may correspond to an RRC idle state (e.g., RRC_IDLE) or an RRC inactive state (RRC_INACTIVE). In other words, the UE 115-*c* may transition between different operating modes while remaining in the same RRC state. These different operating modes may be associated with different downlink BWPs. At 525, the UE 115-*c* may monitor the second set of resources within the second downlink BWP (e.g., while the UE 115-*c* is in the second operating mode). The UE 115-*c* may monitor the second set of resources within the second downlink BWP in accordance with the configuration and based on the capability of the UE 115-*c*.

In some examples, the UE 115-*c* may perform a random access procedure with the base station 105-*c* at 530 (while in the second operating mode). The UE 115-*c* may perform the random access procedure via the second set of resources within the second downlink BWP. At 535, the UE 115-*c* may receive a system information update from the base station 105-*c* via the second set of resources within the second downlink BWP. At 540, the UE 115-*c* may receive a PWS notification from the base station 105-*c* via the second set of resources within the second downlink BWP. In some examples, the UE 115-*c* may receive the system information update or the PWS notification via a random access message (e.g., msgB or msg4), which the base station 105-*c* may transmit during a random access procedure (e.g., via the second set of resources within the second downlink BWP).

The base station 105-*c* may transmit the system information update or the PWS notification via a random access message if, for example, the second downlink BWP does not include a CSS configured for paging operations. If the second downlink BWP does include a CSS configured for paging operations, the base station 105-*c* may indicate the system information update or the PWS notification via a paging message. In other examples, the base station 105-*c* may indicate the system information update or the PWS notification via a paging-triggered SDT. For example, the base station 105-*c* may transmit (e.g., via the second set of resources within the second downlink BWP) a paging message that schedules a downlink SDT from the base station 105-*c*. The base station 105-*c* may transmit the downlink SDT in accordance with the paging message, and may include the system information update or the PWS notification in the downlink SDT. Similarly, the base station 105-*c* may transmit a PDCCH message (e.g., via the second set of resources within the second downlink BWP) that schedules a broadcast or multicast PDSCH message from the base station 105-*c*. The base station 105-*c* may transmit the broadcast or multicast PDSCH message in accordance with the PDCCH message, and may include the system information update or the PWS notification in the broadcast or multicast PDSCH message.

The process flow 500 may support greater processing efficiency and reduced power consumption at the UE 115-*c* (e.g., a RedCap UE), among other benefits. For example, the techniques described herein may reduce the number of control resources (e.g., CORESETs, SSs) that the UE 115-*c* is configured to monitor while operating in an idle or inactive mode, which may reduce the processing costs and power consumption associated with idle or inactive physical downlink control channel (PDCCH) monitoring activities performed by the UE 115-*c*. Specifically, the described techniques may reduce the number of blind decoding operations performed by the UE 115-*c*, which may enable the UE 115-*c* to perform idle or inactive mode operations with greater processing efficiency (e.g., using fewer processing resources) and reduced power consumption.

Figure 6:
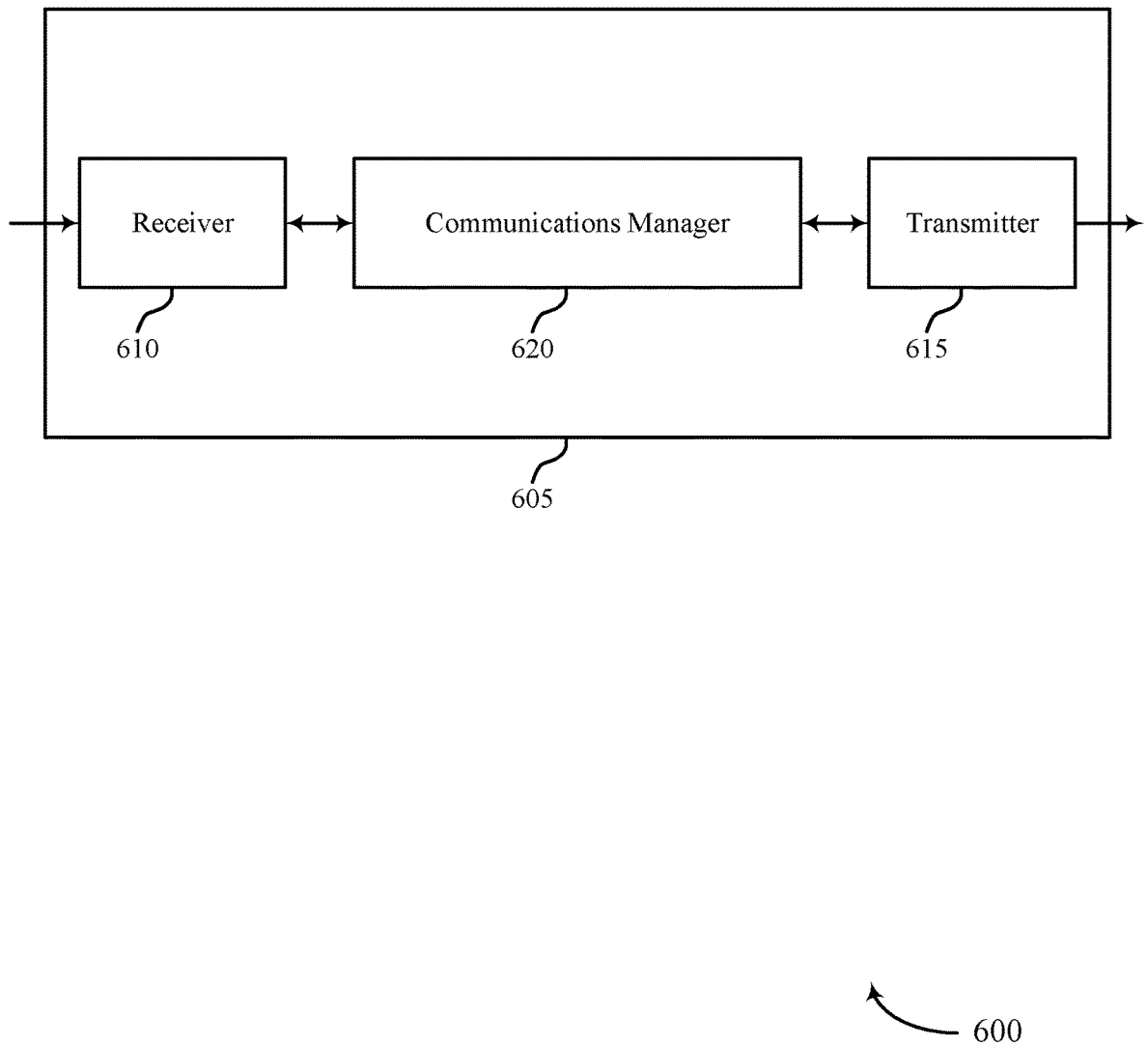
FIGS. 6 and 7 show block diagrams of devices that support downlink control channel monitoring in multiple downlink BWPs in accordance with aspects of the present disclosure.

FIG. 6 shows a block diagram 600 of a device 605 that supports downlink control channel monitoring in multiple downlink BWPs in accordance with aspects of the present disclosure. The device 605 may be an example of aspects of a UE 115 (e.g., a RedCap UE) as described herein. The device 605 may include a receiver 610, a transmitter 615, and a communications manager 620. The device 605 may also include at least one processor. Each of these components may be in communication with one another (e.g., via one or more buses).

The receiver 610 may provide a means for receiving information such as packets, user data, control information, or any combination thereof associated with various information channels (e.g., control channels, data channels, information channels related to downlink control channel monitoring in multiple downlink BWPs). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to downlink control channel monitoring in multiple downlink BWPs). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of downlink control channel monitoring in multiple downlink BWPs as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include at least one processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, at least one processor and memory coupled (e.g., operatively, communicatively, functionally, electronically, and/or electrically) with the at least one processor may be configured to perform one or more of the functions described herein (e.g., by executing, by the at least one processor, instructions stored in the memory).

Additionally, or alternatively, in some examples, the communications manager 620, the receiver 610, the transmitter 615, or various combinations or components thereof may be implemented in hardware, software (e.g., executed by at least one processor, or any combination thereof. If implemented in software executed by at least one processor, the functions of the communications manager 620, the receiver 610, the transmitter 615, or various combinations or components thereof may be performed by a general-purpose processor, a DSP, a central processing unit (CPU), a graphics processing unit (GPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at the device 605 in accordance with examples disclosed herein. For example, the communications manager 620 may be configured as or otherwise support a means for receiving, from a network entity, one or more control messages that indicate a configuration for a first downlink BWP associated with a first operating mode of the device 605, a second downlink BWP associated with a second operating mode of the device 605, a first set of control resources within the first downlink BWP, and a second set of control resources within the second downlink BWP, where at least a portion of the configuration corresponds to a capability of the device 605. The communications manager 620 may be configured as or otherwise support a means for monitoring, by the device 605 in the first operating mode, the first set of control resources within the first downlink BWP in accordance with the configuration and based on the capability of the device 605. The communications manager 620 may be configured as or otherwise support a means for monitoring, by the device 605 in the second operating mode, the second set of control resources within the second downlink BWP in accordance with the configuration and based on the capability of the device 605.

Additionally, or alternatively, the communications manager 620 may support wireless communications at the device 605 in accordance with examples disclosed herein. For example, the communications manager 620 may be configured as or otherwise support a means for receiving, from a network entity, one or more control messages that indicate a configuration for a first downlink BWP associated with a first operating mode of the device 605, a second downlink BWP associated with a second operating mode of the device 605, a first set of resources within the first downlink BWP, and a second set of resources within the second downlink BWP, where at least a portion of the configuration corresponds to a capability of the device 605. The communications manager 620 may be configured as or otherwise support a means for receiving, by the device 605 in the first operating mode, one or more messages via the first set of resources within the first downlink BWP in accordance with the configuration and based on the capability of the device 605. The communications manager 620 may be configured as or otherwise support a means for receiving, by the device 605 in the second operating mode, one or both of a system information message or a PWS message via the second set of resources within the second downlink BWP in accordance with the configuration and based on the capability of the device 605.

By including or configuring the communications manager 620 in accordance with examples as described herein, the device 605 (e.g., at least one processor controlling or otherwise coupled (e.g., operatively, communicatively, functionally, electronically, and/or electrically) to the receiver 610, the transmitter 615, the communications manager 620, or a combination thereof) may support techniques for reduced processing and reduced power consumption. For example, the techniques described herein may improve the processing efficiency and power consumption associated with downlink channel monitoring procedures at the device 605 by reducing the number of resources that the device 605 is configured to monitor while in an idle or inactive mode.

Figure 7:
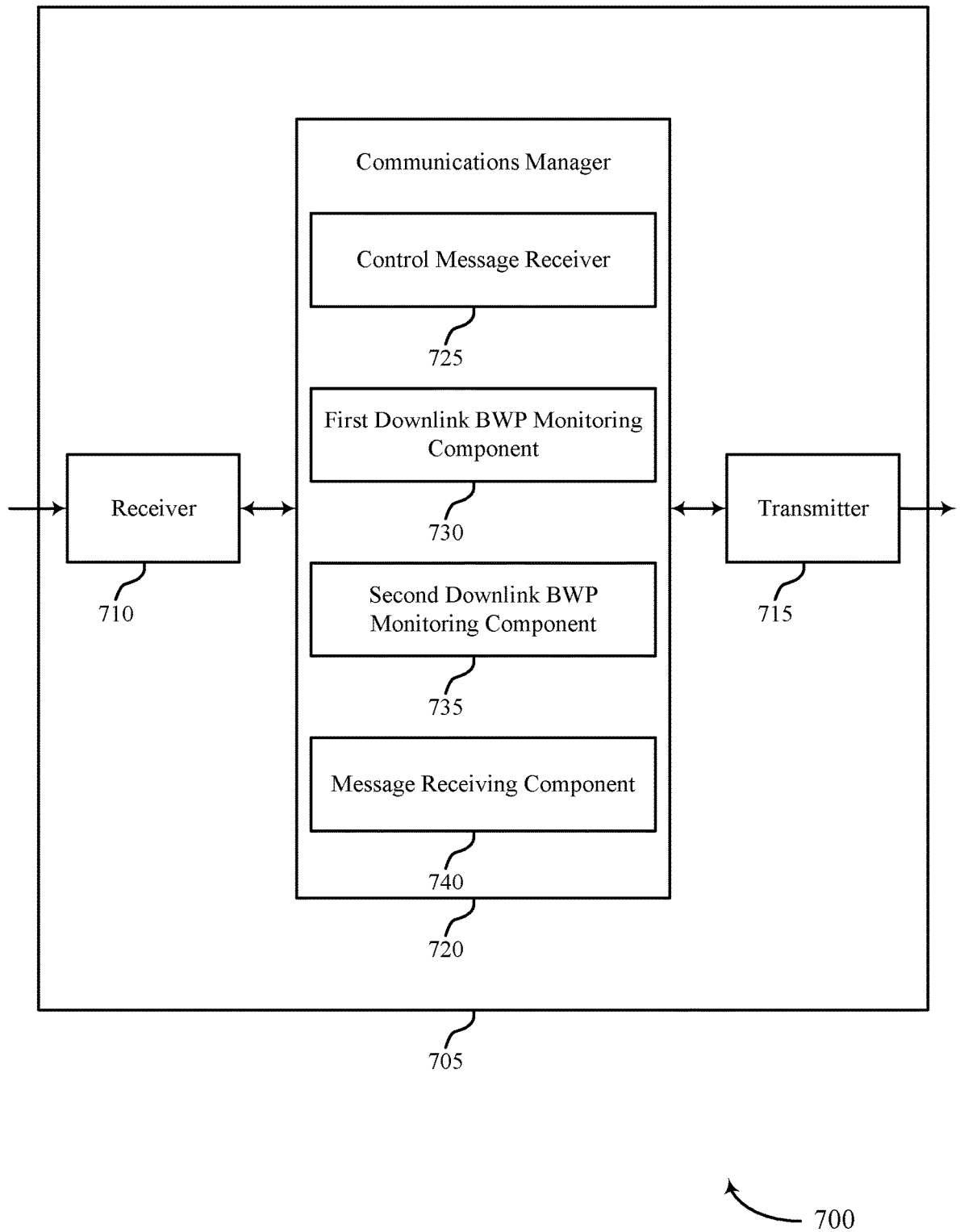

FIG. 7 shows a block diagram 700 of a device 705 that supports downlink control channel monitoring in multiple downlink BWPs in accordance with aspects of the present disclosure. The device 705 may be an example of aspects of a device 605 or a UE 115 (e.g., a RedCap UE) as described herein. The device 705 may include a receiver 710, a transmitter 715, and a communications manager 720. The device 705 may also include at least one processor. Each of these components may be in communication with one another (e.g., via one or more buses).

The receiver 710 may provide a means for receiving information such as packets, user data, control information, or any combination thereof associated with various information channels (e.g., control channels, data channels, information channels related to downlink control channel monitoring in multiple downlink BWPs). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to downlink control channel monitoring in multiple downlink BWPs). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of downlink control channel monitoring in multiple downlink BWPs as described herein. For example, the communications manager 720 may include a control message receiver 725, a first downlink BWP monitoring component 730, a second downlink BWP monitoring component 735, a message receiving component 740, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at the device 705 in accordance with examples disclosed herein. The control message receiver 725 may be configured as or otherwise support a means for receiving, from a network entity, one or more control messages that indicate a configuration for a first downlink BWP associated with a first operating mode of the device 705, a second downlink BWP associated with a second operating mode of the device 705, a first set of control resources within the first downlink BWP, and a second set of control resources within the second downlink BWP, where at least a portion of the configuration corresponds to a capability of the device 705. The first downlink BWP monitoring component 730 may be configured as or otherwise support a means for monitoring, by the device 705 in the first operating mode, the first set of control resources within the first downlink BWP in accordance with the configuration and based on the capability of the device 705. The second downlink BWP monitoring component 735 may be configured as or otherwise support a means for monitoring, by the device 705 in the second operating mode, the second set of control resources within the second downlink BWP in accordance with the configuration and based on the capability of the device 705.

Additionally, or alternatively, the communications manager 720 may support wireless communications at the device 705 in accordance with examples disclosed herein. The control message receiver 725 may be configured as or otherwise support a means for receiving, from a network entity, one or more control messages that indicate a configuration for a first downlink BWP associated with a first operating mode of the device 705, a second downlink BWP associated with a second operating mode of the device 705, a first set of resources within the first downlink BWP, and a second set of resources within the second downlink BWP, where at least a portion of the configuration corresponds to a capability of the device 705. The message receiving component 740 may be configured as or otherwise support a means for receiving, by the device 705 in the first operating mode, one or more messages via the first set of resources within the first downlink BWP in accordance with the configuration and based on the capability of the device 705. The message receiving component 740 may be configured as or otherwise support a means for receiving, by the device 705 in the second operating mode, one or both of a system information message or a PWS message via the second set of resources within the second downlink BWP in accordance with the configuration and based on the capability of the device 705.

Figure 8:
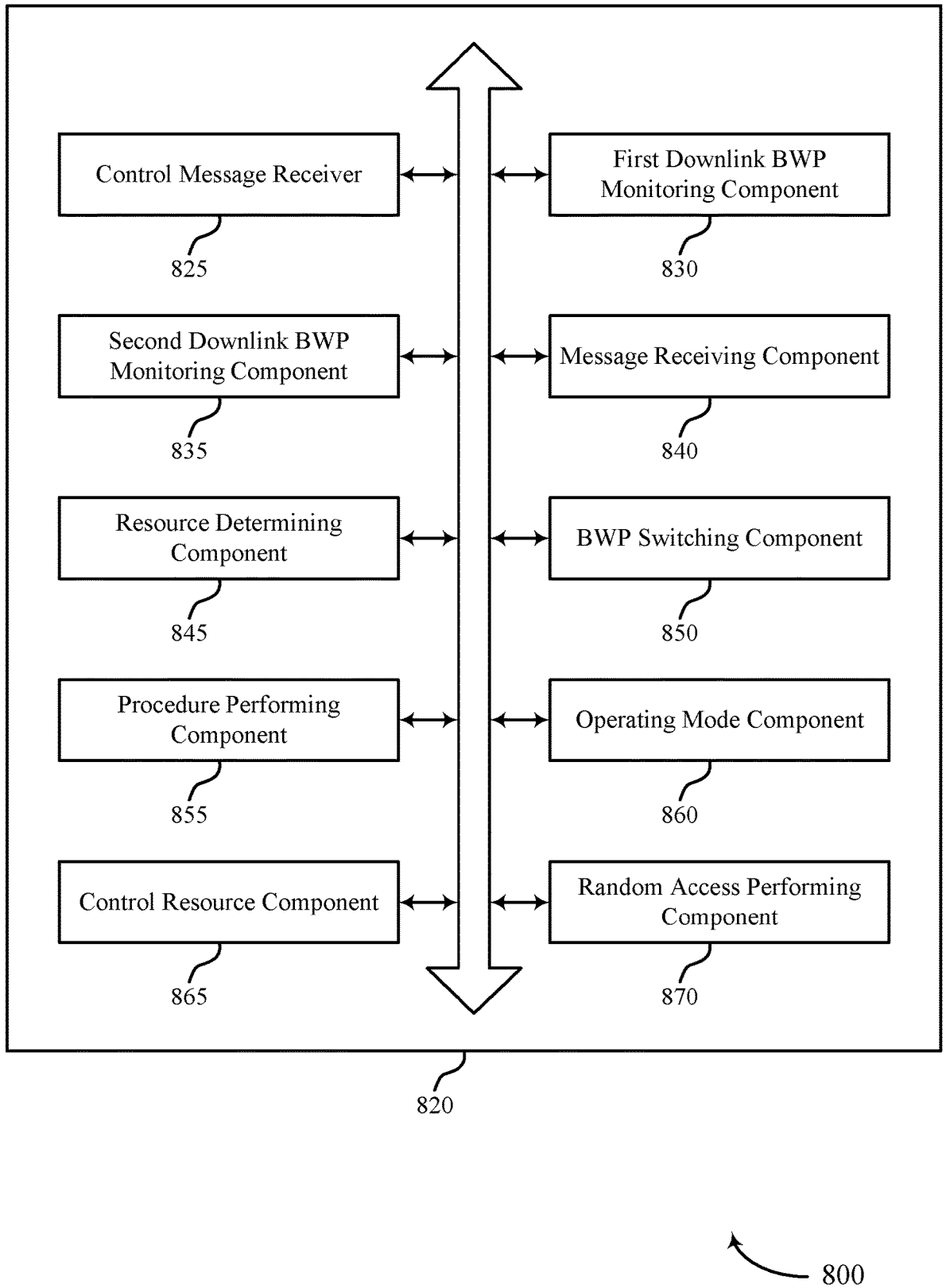
FIG. 8 shows a block diagram of a communications manager that supports downlink control channel monitoring in multiple downlink BWPs in accordance with aspects of the present disclosure.

FIG. 8 shows a block diagram 800 of a communications manager 820 that supports downlink control channel monitoring in multiple downlink BWPs in accordance with aspects of the present disclosure. The communications manager 820 may be an example of aspects of a communications manager 620, a communications manager 720, or both, as described herein. The communications manager 820, or various components thereof, may be an example of means for performing various aspects of downlink control channel monitoring in multiple downlink BWPs as described herein. For example, the communications manager 820 may include a control message receiver 825, a first downlink BWP monitoring component 830, a second downlink BWP monitoring component 835, a message receiving component 840, a resource determining component 845, a BWP switching component 850, a procedure performing component 855, an operating mode component 860, a control resource component 865, a random access performing component 870, or any combination thereof. Each of these components may communicate, directly or indirectly, with one another (e.g., via one or more buses).

The communications manager 820 may support wireless communications at a UE (e.g., a RedCap UE) in accordance with examples disclosed herein. The control message receiver 825 may be configured as or otherwise support a means for receiving, from a network entity, one or more control messages that indicate a configuration for a first downlink BWP associated with a first operating mode of the UE, a second downlink BWP associated with a second operating mode of the UE, a first set of control resources within the first downlink BWP, and a second set of control resources within the second downlink BWP, where at least a portion of the configuration corresponds to a capability of the UE. The first downlink BWP monitoring component 830 may be configured as or otherwise support a means for monitoring, by the UE in the first operating mode, the first set of control resources within the first downlink BWP in accordance with the configuration and based on the capability of the UE. The second downlink BWP monitoring component 835 may be configured as or otherwise support a means for monitoring, by the UE in the second operating mode, the second set of control resources within the second downlink BWP in accordance with the configuration and based on the capability of the UE.

In some examples, the first downlink BWP monitoring component 830 may be configured as or otherwise support a means for monitoring, by the UE in the first operating mode, the first set of control resources within the first downlink BWP. In some examples, the control message receiver 825 may be configured as or otherwise support a means for receiving, from the network entity and via the first set of control resources, the one or more control messages that indicate the configuration for the second downlink BWP and the second set of control resources within the second downlink BWP. In some examples, the resource determining component 845 may be configured as or otherwise support a means for determining a quantity of control resources within the second downlink BWP based on a quantity of control resources within the first downlink BWP.

In some examples, the resource determining component 845 may be configured as or otherwise support a means for determining a quantity of control resources within the second downlink BWP based on a quantity of control resources within the first downlink BWP, a summation of control resources within different downlink BWPs of the UE, and a threshold quantity of control resources corresponding to the capability of the UE.

In some examples, the resource determining component 845 may be configured as or otherwise support a means for determining a quantity of SS sets within the second downlink BWP based on a quantity of SS sets within the first downlink BWP, a summation of SS sets within different downlink BWPs of the UE, and a threshold quantity of SS sets corresponding to the capability of the UE.

In some examples, to support receiving the one or more control messages, the control message receiver 825 may be configured as or otherwise support a means for receiving control signaling indicating one or both of a first set of parameters related to the first downlink BWP or a second set of parameters related to the second downlink BWP, the first set of parameters including a bandwidth, an initial PRB location, a numerology, or a combination thereof associated with the first downlink BWP, the second set of parameters including a bandwidth, an initial PRB location, a numerology, or a combination thereof associated with the second downlink BWP, where the first set of parameters is different from the second set of parameters.

In some examples, to support receiving the one or more control messages, the control message receiver 825 may be configured as or otherwise support a means for receiving, from the network entity, a master information block indicating the configuration for the first downlink BWP. In some examples, to support receiving the one or more control messages, the control message receiver 825 may be configured as or otherwise support a means for receiving, from the network entity, one or more of a SIB, a dedicated RRC message, a multicast message, or a broadcast message indicating the configuration for the second downlink BWP.

In some examples, the BWP switching component 850 may be configured as or otherwise support a means for performing a BWP switching procedure from the first downlink BWP to the second downlink BWP based on transitioning from the first operating mode to the second operating mode, where monitoring the second set of control resources within the second downlink BWP is based on performing the BWP switching procedure.

In some examples, the procedure performing component 855 may be configured as or otherwise support a means for performing, using CORESETs and SS sets within the first downlink BWP or using CORESETs and SS sets within the second downlink BWP, one or more procedures associated with the first operating mode of the UE or the second operating mode of the UE, the one or more procedures including a system information acquisition procedure, a system information update procedure, a mobility procedure, a paging operation, a random access procedure, a small data transfer procedure, an on-demand system information transmission request procedure, or a combination thereof.

In some examples, the first operating mode and the second operating mode correspond to an RRC idle state or an RRC inactive state of the UE. In some examples, the first set of control resources within the first downlink BWP and the second set of control resources within the second downlink BWP include CSS sets.

In some examples, the first operating mode and the second operating mode correspond to an RRC inactive state or an RRC connected state of the UE. In some examples, the first set of control resources within the first downlink BWP and the second set of control resources within the second downlink BWP include USS sets, CSS sets, or both. In some examples, the first downlink BWP and the second downlink BWP correspond to different frequency ranges.

In some examples, the first downlink BWP includes a first CSS configured for cell selection procedures or cell reselection procedures by UEs in an RRC idle state or an RRC inactive state. In some examples, the second downlink BWP includes at least a second CSS configured for random access procedures or paging operations by UEs in an RRC idle state or an RRC inactive state.

In some examples, the first downlink BWP includes one or more CSSs configured for system information acquisition procedures, system information update procedures, mobility procedures, or paging operations by UEs in an RRC idle state or an RRC inactive state.

In some examples, to support receiving the one or more control messages, the control message receiver 825 may be configured as or otherwise support a means for receiving a SIB indicating one or more of an AL, a monitoring periodicity, or a monitoring occasion configuration for CSS sets within the second downlink BWP based on the capability of the UE.

In some examples, the message receiving component 840 may be configured as or otherwise support a means for receiving, by the UE in the first operating mode, a CD-SSB, a system information message, a paging message, a PEI message, a random access message, or a combination thereof from the network entity via the first set of control resources within the first downlink BWP associated with the first operating mode of the UE.

In some examples, to support receiving the one or more control messages, the message receiving component 840 may be configured as or otherwise support a means for receiving, from the network entity, a SIB indicating a first DCI size alignment for PDCCH messages in SS sets of the first downlink BWP, a second DCI size alignment for PDCCH messages in SS sets of the second downlink BWP, or both.

In some examples, the message receiving component 840 may be configured as or otherwise support a means for receiving one or more of a random access message, a system information message, a multicast message, a broadcast message, a paging message, an SDT, or an NCD-SSB from the network entity via the second set of control resources within the second downlink BWP.

In some examples, to support receiving the one or more control messages, the control message receiver 825 may be configured as or otherwise support a means for receiving control signaling indicating a quantity of PRBs within the second downlink BWP, where the quantity of PRBs is based on a CCE AL of CORESETs within the second downlink BWP, a time duration of CORESETs within the second downlink BWP, a total quantity of CORESETs within the second downlink BWP, an RRC state of the UE, or a combination thereof.

In some examples, to support receiving the one or more control messages, the control message receiver 825 may be configured as or otherwise support a means for receiving one or more of a system information message, an RRC message, a broadcast message, or a multicast message indicating a CCE AL for SS sets within the second downlink BWP, a quantity of blind decoding candidates for SS sets within the second downlink BWP, or both.

Additionally, or alternatively, the communications manager 820 may support wireless communications at a UE in accordance with examples disclosed herein. In some examples, the control message receiver 825 may be configured as or otherwise support a means for receiving, from a network entity, one or more control messages that indicate a configuration for a first downlink BWP associated with a first operating mode of the UE, a second downlink BWP associated with a second operating mode of the UE, a first set of resources within the first downlink BWP, and a second set of resources within the second downlink BWP, where at least a portion of the configuration corresponds to a capability of the UE. The message receiving component 840 may be configured as or otherwise support a means for receiving, by the UE in the first operating mode, one or more messages via the first set of resources within the first downlink BWP in accordance with the configuration and based on the capability of the UE. In some examples, the message receiving component 840 may be configured as or otherwise support a means for receiving, by the UE in the second operating mode, one or both of a system information message or a PWS message via the second set of resources within the second downlink BWP in accordance with the configuration and based on the capability of the UE.

In some examples, the random access performing component 870 may be configured as or otherwise support a means for performing a random access procedure with the network entity via the second set of resources within the second downlink BWP.

In some examples, to support receiving one or both of the system information message or the PWS message, the message receiving component 840 may be configured as or otherwise support a means for receiving a random access message from the network entity via the second set of resources within the second downlink BWP in accordance with the random access procedure, the random access message indicating one or both of the system information message or the PWS message.

In some examples, to support receiving one or both of the system information message or the PWS message, the message receiving component 840 may be configured as or otherwise support a means for receiving a random access message from the network entity via the second set of resources within the second downlink BWP based on identifying that the second downlink BWP does not include a CSS configured for paging operations, the random access message indicating one or both of the system information message or the PWS message.

In some examples, to support receiving one or both of the system information message or the PWS message, the message receiving component 840 may be configured as or otherwise support a means for receiving a paging message from the network entity via the second set of resources within the second downlink BWP based on identifying that the second downlink BWP includes a CSS configured for paging operations, the paging message indicating one or both of the system information message or the PWS message.

In some examples, to support receiving one or both of the system information message or the PWS message, the message receiving component 840 may be configured as or otherwise support a means for receiving a paging message from the network entity via the second set of resources within the second downlink BWP, the paging message scheduling a downlink SDT from the network entity. In some examples, to support receiving one or both of the system information message or the PWS message, the second downlink BWP monitoring component 835 may be configured as or otherwise support a means for monitoring the second set of resources within the second downlink BWP for the downlink SDT from the network entity in accordance with the paging message, the downlink SDT indicating one or both of the system information message or the PWS message.

In some examples, to support receiving one or both of the system information message or the PWS message, the control message receiver 825 may be configured as or otherwise support a means for receiving a PDCCH transmission from the network entity via the second set of resources within the second downlink BWP, the PDCCH transmission scheduling a broadcast or multicast PDSCH transmission from the network entity. In some examples, to support receiving one or both of the system information message or the PWS message, the second downlink BWP monitoring component 835 may be configured as or otherwise support a means for monitoring the second set of resources for the broadcast or multicast PDSCH transmission from the network entity in accordance with the PDCCH transmission, the broadcast or multicast PDSCH transmission indicating one or both of the system information message or the PWS message.

Figure 9:
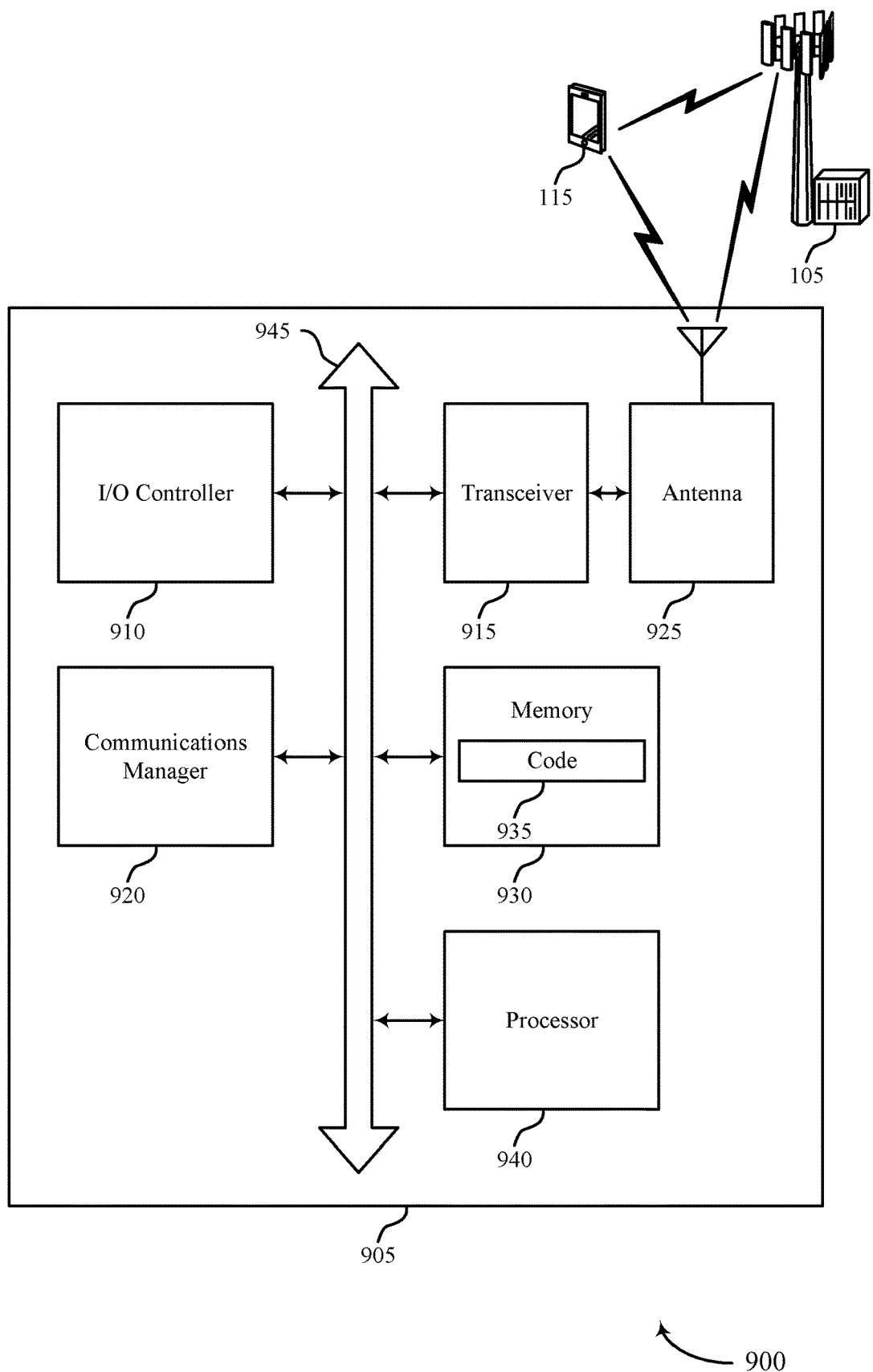
FIG. 9 shows a diagram of a system including a device that supports downlink control channel monitoring in multiple downlink BWPs in accordance with aspects of the present disclosure.

FIG. 9 shows a diagram of a system 900 including a device 905 that supports downlink control channel monitoring in multiple downlink BWPs in accordance with aspects of the present disclosure. The device 905 may be an example of or include the components of a device 605, a device 705, or a UE 115 (e.g., a RedCap UE) as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting downlink control channel monitoring in multiple downlink BWPs). For example, the device 905 or a component of the device 905 may include a processor 940 and memory 930 coupled (e.g., operatively, communicatively, functionally, electronically, and/or electrically) with or to the processor 940, the processor 940 and memory 930 configured to perform various functions described herein.

The communications manager 920 may support wireless communications at the device 905 in accordance with examples disclosed herein. For example, the communications manager 920 may be configured as or otherwise support a means for receiving, from a network entity, one or more control messages that indicate a configuration for a first downlink BWP associated with a first operating mode of the device 905, a second downlink BWP associated with a second operating mode of the device 905, a first set of control resources within the first downlink BWP, and a second set of control resources within the second downlink BWP, where at least a portion of the configuration corresponds to a capability of the device 905. The communications manager 920 may be configured as or otherwise support a means for monitoring, by the device 905 in the first operating mode, the first set of control resources within the first downlink BWP in accordance with the configuration and based on the capability of the device 905. The communications manager 920 may be configured as or otherwise support a means for monitoring, by the device 905 in the second operating mode, the second set of control resources within the second downlink BWP in accordance with the configuration and based on the capability of the device 905.

Additionally, or alternatively, the communications manager 920 may support wireless communications at the device 905 in accordance with examples disclosed herein. For example, the communications manager 920 may be configured as or otherwise support a means for receiving, from a network entity, one or more control messages that indicate a configuration for a first downlink BWP associated with a first operating mode of the device 905, a second downlink BWP associated with a second operating mode of the device 905, a first set of resources within the first downlink BWP, and a second set of resources within the second downlink BWP, where at least a portion of the configuration corresponds to a capability of the device 905. The communications manager 920 may be configured as or otherwise support a means for receiving, by the device 905 in the first operating mode, one or more messages via the first set of resources within the first downlink BWP in accordance with the configuration and based on the capability of the device 905. The communications manager 920 may be configured as or otherwise support a means for receiving, by the device 905 in the second operating mode, one or both of a system information message or a PWS message via the second set of resources within the second downlink BWP in accordance with the configuration and based on the capability of the device 905.

By including or configuring the communications manager 920 in accordance with examples as described herein, the device 905 (e.g., a RedCap UE) may support techniques for improved downlink channel monitoring. For example, if the device 905 is configured to monitor different downlink BWPs while operating in an idle or inactive state, the techniques described herein may provide for reducing the total number of CORESETs and SSs in the different downlink BWPs. As a result, the device 905 may monitor fewer control resources, which may enable the device 905 to perform downlink channel monitoring with lower processing overhead and reduced power consumption, among other benefits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of downlink control channel monitoring in multiple downlink BWPs as described herein, or the processor 940 and the memory 930 may be otherwise configured to perform or support such operations.

Figure 10:
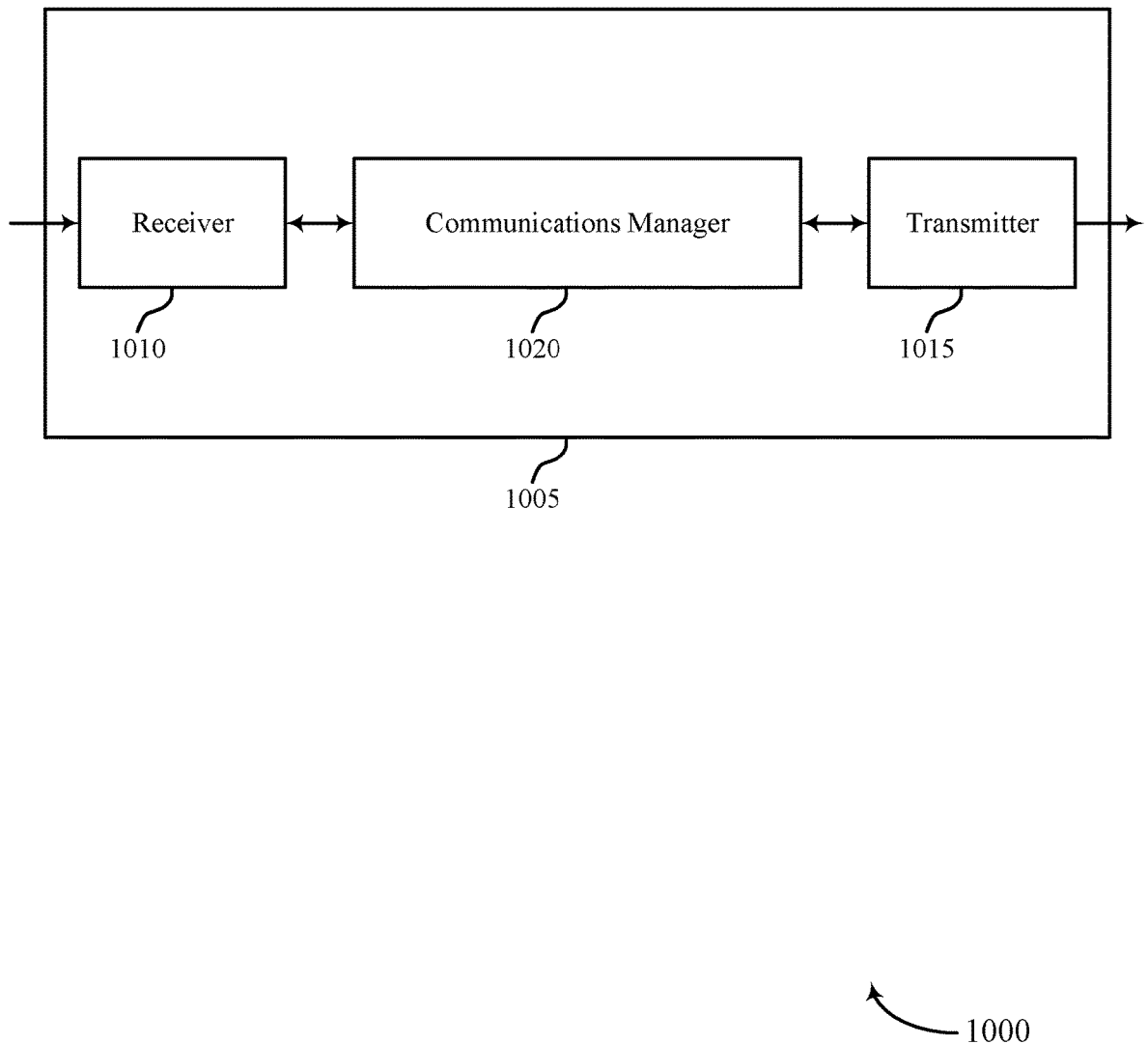
FIGS. 10 and 11 show block diagrams of devices that support downlink control channel monitoring in multiple downlink BWPs in accordance with aspects of the present disclosure.

FIG. 10 shows a block diagram 1000 of a device 1005 that supports downlink control channel monitoring in multiple downlink BWPs in accordance with aspects of the present disclosure. The device 1005 may be an example of aspects of a base station 105 (e.g., a network entity) as described herein. The device 1005 may include a receiver 1010, a transmitter 1015, and a communications manager 1020. The device 1005 may also include at least one processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to downlink control channel monitoring in multiple downlink BWPs). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to downlink control channel monitoring in multiple downlink BWPs). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of downlink control channel monitoring in multiple downlink BWPs as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include at least one processor, a DSP, an ASIC, an FPGA or other programmable logic device, a discrete gate or transistor logic, discrete hardware components, or any combination thereof configured as or otherwise supporting a means for performing the functions described in the present disclosure. In some examples, at least one processor and memory coupled (e.g., operatively, communicatively, functionally, electronically, and/or electrically) with the at least one processor may be configured to perform one or more of the functions described herein (e.g., by executing, by the at least one processor, instructions stored in the memory).

Additionally, or alternatively, in some examples, the communications manager 1020, the receiver 1010, the transmitter 1015, or various combinations or components thereof may be implemented in hardware, software (e.g., executed by at least one processor), or any combination thereof. If implemented in software executed by at least one processor, the functions of the communications manager 1020, the receiver 1010, the transmitter 1015, or various combinations or components thereof may be performed by a general-purpose processor, a DSP, a CPU, a GPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at the device 1005 in accordance with examples disclosed herein. For example, the communications manager 1020 may be configured as or otherwise support a means for transmitting one or more control messages that indicate a configuration for a first downlink BWP associated with a first operating mode of a UE, a second downlink BWP associated with a second operating mode of the UE, a first set of control resources within the first downlink BWP, and a second set of control resources within the second downlink BWP, where at least a portion of the configuration corresponds to a capability of the UE. The communications manager 1020 may be configured as or otherwise support a means for transmitting a first set of messages via the first set of control resources within the first downlink BWP in accordance with the configuration and based on the capability of the UE. The communications manager 1020 may be configured as or otherwise support a means for transmitting a second set of messages via the second set of control resources within the second downlink BWP in accordance with the configuration and based on the capability of the UE.

Additionally, or alternatively, the communications manager 1020 may support wireless communications at the device 1005 in accordance with examples disclosed herein. For example, the communications manager 1020 may be configured as or otherwise support a means for transmitting one or more control messages that indicate a configuration for a first downlink BWP associated with a first operating mode of a UE, a second downlink BWP associated with a second operating mode of the UE, a first set of resources within the first downlink BWP, and a second set of resources within the second downlink BWP, where at least a portion of the configuration corresponds to a capability of the UE. The communications manager 1020 may be configured as or otherwise support a means for transmitting one or more messages via the first set of resources within the first downlink BWP in accordance with the configuration and based on the capability of the UE. The communications manager 1020 may be configured as or otherwise support a means for transmitting one or both of a system information message or a PWS message via the second set of resources within the second downlink BWP in accordance with the configuration and based on the capability of the UE.

By including or configuring the communications manager 1020 in accordance with examples as described herein, the device 1005 (e.g., at least one processor controlling or otherwise coupled (e.g., operatively, communicatively, functionally, electronically, and/or electrically) to the receiver 1010, the transmitter 1015, the communications manager 1020, or a combination thereof) may support techniques for reduced processing and reduced power consumption. For example, the techniques described herein may support constraining the total number of CORESETs and SSs in various downlink BWPs configured by the device 1005. Constraining the total number of control resources in these downlink BWPs may improve the efficiency of communications between the device 1005 and idle or inactive RedCap UEs associated with the device 1005.

Figure 11:
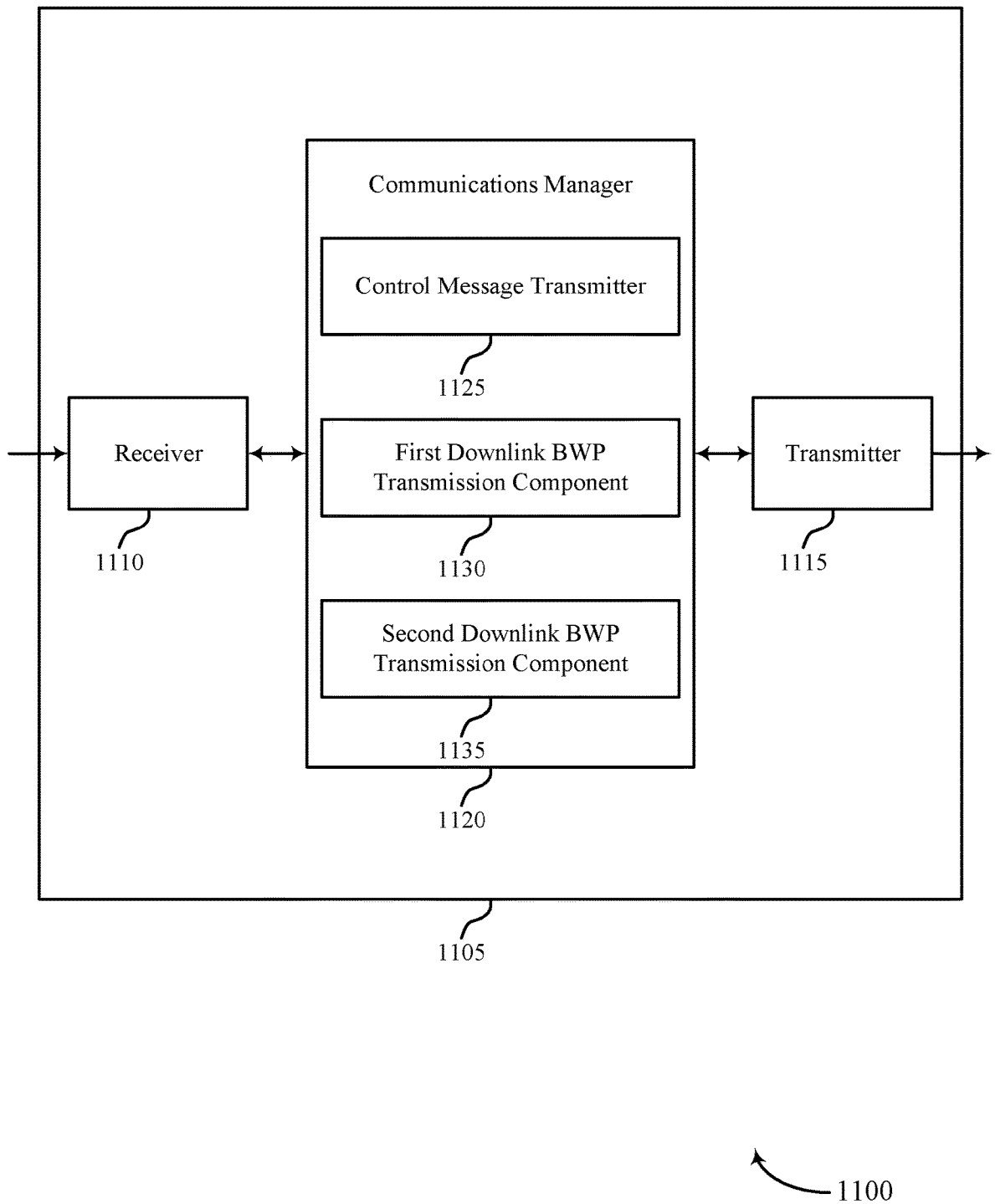

FIG. 11 shows a block diagram 1100 of a device 1105 that supports downlink control channel monitoring in multiple downlink BWPs in accordance with aspects of the present disclosure. The device 1105 may be an example of aspects of a device 1005 or a base station 105 (e.g., a network entity) as described herein. The device 1105 may include a receiver 1110, a transmitter 1115, and a communications manager 1120. The device 1105 may also include at least one processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to downlink control channel monitoring in multiple downlink BWPs). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to downlink control channel monitoring in multiple downlink BWPs). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of downlink control channel monitoring in multiple downlink BWPs as described herein. For example, the communications manager 1120 may include a control message transmitter 1125, a first downlink BWP transmission component 1130, a second downlink BWP transmission component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at the device 1105 in accordance with examples disclosed herein. The control message transmitter 1125 may be configured as or otherwise support a means for transmitting one or more control messages that indicate a configuration for a first downlink BWP associated with a first operating mode of a UE, a second downlink BWP associated with a second operating mode of the UE, a first set of control resources within the first downlink BWP, and a second set of control resources within the second downlink BWP, where at least a portion of the configuration corresponds to a capability of the UE. The first downlink BWP transmission component 1130 may be configured as or otherwise support a means for transmitting a first set of messages via the first set of control resources within the first downlink BWP in accordance with the configuration and based on the capability of the UE. The second downlink BWP transmission component 1135 may be configured as or otherwise support a means for transmitting a second set of messages via the second set of control resources within the second downlink BWP in accordance with the configuration and based on the capability of the UE.

Additionally, or alternatively, the communications manager 1120 may support wireless communications at the device 1105 in accordance with examples disclosed herein. The control message transmitter 1125 may be configured as or otherwise support a means for transmitting one or more control messages that indicate a configuration for a first downlink BWP associated with a first operating mode of a UE, a second downlink BWP associated with a second operating mode of the UE, a first set of resources within the first downlink BWP, and a second set of resources within the second downlink BWP, where at least a portion of the configuration corresponds to a capability of the UE. The first downlink BWP transmission component 1130 may be configured as or otherwise support a means for transmitting one or more messages via the first set of resources within the first downlink BWP in accordance with the configuration and based on the capability of the UE. The second downlink BWP transmission component 1135 may be configured as or otherwise support a means for transmitting one or both of a system information message or a PWS message via the second set of resources within the second downlink BWP in accordance with the configuration and based on the capability of the UE.

Figure 12:
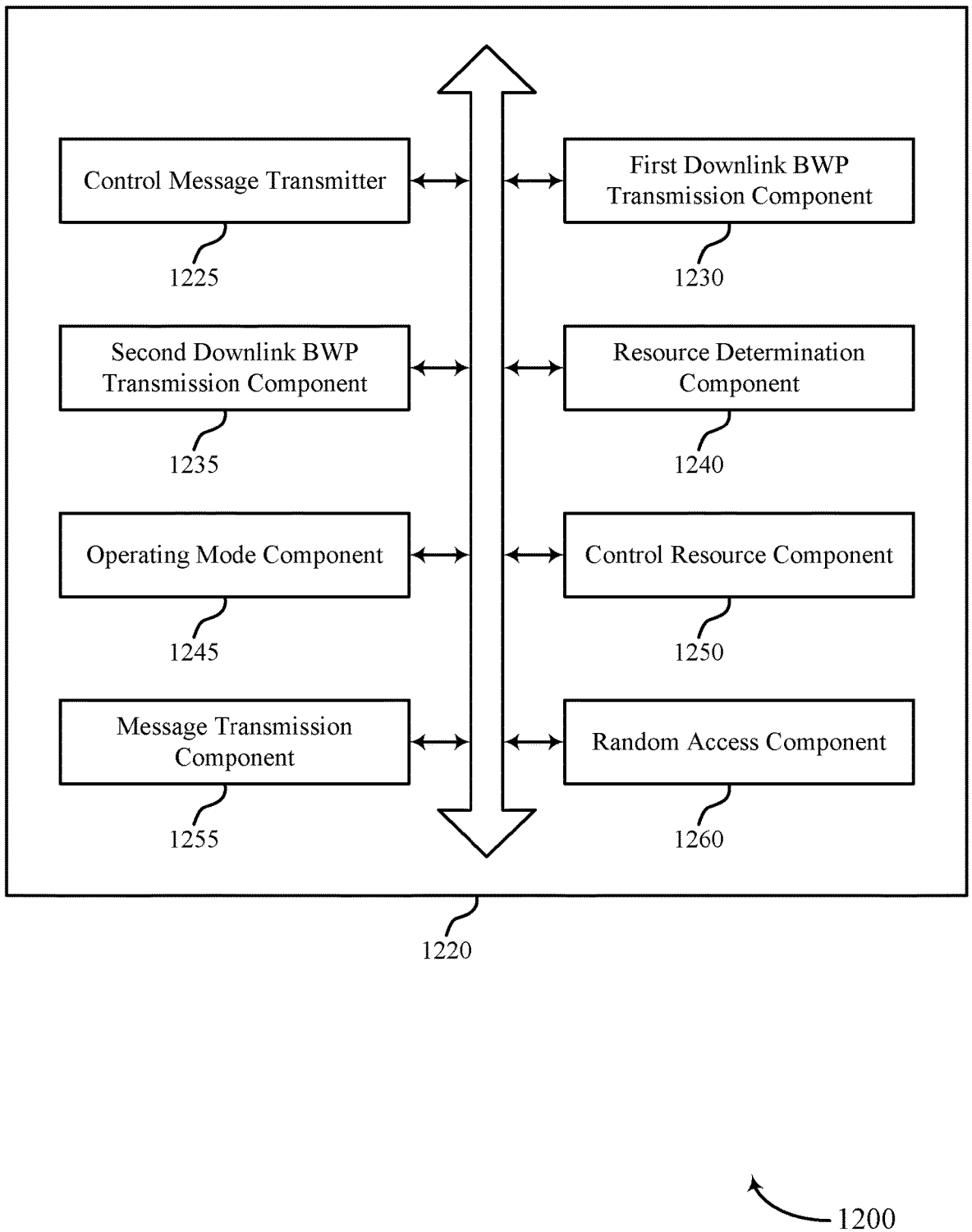
FIG. 12 shows a block diagram of a communications manager that supports downlink control channel monitoring in multiple downlink BWPs in accordance with aspects of the present disclosure.

FIG. 12 shows a block diagram 1200 of a communications manager 1220 that supports downlink control channel monitoring in multiple downlink BWPs in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of downlink control channel monitoring in multiple downlink BWPs as described herein. For example, the communications manager 1220 may include a control message transmitter 1225, a first downlink BWP transmission component 1230, a second downlink BWP transmission component 1235, a resource determination component 1240, an operating mode component 1245, a control resource component 1250, a message transmission component 1255, a random access component 1260, or any combination thereof. Each of these components may communicate, directly or indirectly, with one another (e.g., via one or more buses).

The communications manager 1220 may support wireless communications at a network entity in accordance with examples disclosed herein. The control message transmitter 1225 may be configured as or otherwise support a means for transmitting one or more control messages that indicate a configuration for a first downlink BWP associated with a first operating mode of a UE, a second downlink BWP associated with a second operating mode of the UE, a first set of control resources within the first downlink BWP, and a second set of control resources within the second downlink BWP, where at least a portion of the configuration corresponds to a capability of the UE. The first downlink BWP transmission component 1230 may be configured as or otherwise support a means for transmitting a first set of messages via the first set of control resources within the first downlink BWP in accordance with the configuration and based on the capability of the UE. The second downlink BWP transmission component 1235 may be configured as or otherwise support a means for transmitting a second set of messages via the second set of control resources within the second downlink BWP in accordance with the configuration and based on the capability of the UE.

In some examples, the resource determination component 1240 may be configured as or otherwise support a means for determining a quantity of control resources within the second downlink BWP based on a quantity of control resources within the first downlink BWP. In some examples, the control message transmitter 1225 may be configured as or otherwise support a means for transmitting, to the UE, an indication of the quantity of control resources within the second downlink BWP.

In some examples, the resource determination component 1240 may be configured as or otherwise support a means for determining a quantity of control resources within the second downlink BWP based on a quantity of control resources within the first downlink BWP and a summation of control resources within different downlink BWPs of the UE. In some examples, the control message transmitter 1225 may be configured as or otherwise support a means for transmitting, to the UE, an indication of the quantity of control resources within the second downlink BWP.

In some examples, the resource determination component 1240 may be configured as or otherwise support a means for determining a quantity of SS sets within the second downlink BWP based on a quantity of SS sets within the first downlink BWP, a summation of SS sets within different downlink BWPs of the UE, and a threshold quantity of SS sets related to capabilities of UEs that are permitted to connect with the network entity. In some examples, the control message transmitter 1225 may be configured as or otherwise support a means for transmitting, to the UE, an indication of the quantity of control resources within the second downlink BWP.

In some examples, to support transmitting the one or more control messages, the control message transmitter 1225 may be configured as or otherwise support a means for transmitting control signaling indicating one or both of a first set of parameters related to the first downlink BWP or a second set of parameters related to the second downlink BWP, the first set of parameters including a bandwidth, an initial PRB location, a numerology, or a combination thereof associated with the first downlink BWP, the second set of parameters including a bandwidth, an initial PRB location, a numerology, or a combination thereof associated with the second downlink BWP, where the first set of parameters is different from the second set of parameters.

In some examples, to support transmitting the one or more control messages, the control message transmitter 1225 may be configured as or otherwise support a means for transmitting, to the UE, a MIB indicating the configuration for the first downlink BWP. In some examples, to support transmitting the one or more control messages, the control message transmitter 1225 may be configured as or otherwise support a means for transmitting, to the UE, one or more of a SIB, a dedicated RRC message, a multicast message, or a broadcast message indicating the configuration for the second downlink BWP.

In some examples, the first operating mode and the second operating mode correspond to an RRC idle state or an RRC inactive state of the UE. In some examples, the first set of control resources within the first downlink BWP and the second set of control resources within the second downlink BWP include CSS sets.

In some examples, the first operating mode and the second operating mode correspond to an RRC inactive state or an RRC connected state of the UE. In some examples, the first set of control resources within the first downlink BWP and the second set of control resources within the second downlink BWP include USS sets, CSS sets, or both. In some examples, the first downlink BWP and the second downlink BWP correspond to different frequency ranges.

In some examples, the first downlink BWP includes a first CSS configured for cell selection procedures or cell re-selection procedures by UEs in an RRC idle state or an RRC inactive state. In some examples, the second downlink BWP includes at least a second CSS configured for random access procedures or paging operations by UEs in an RRC idle state or an RRC inactive state.

In some examples, the first downlink BWP includes one or more CSSs configured for system information acquisition procedures, system information update procedures, mobility procedures, or paging operations by UEs in an RRC idle state or an RRC inactive state.

In some examples, to support transmitting the one or more control messages, the control message transmitter 1225 may be configured as or otherwise support a means for transmitting a SIB indicating one or more of an AL, a monitoring periodicity, or a monitoring occasion configuration for CSS sets within the second downlink BWP based on the capability of the UE.

In some examples, the message transmission component 1255 may be configured as or otherwise support a means for transmitting a CD-SSB, a system information message, a paging message, a PEI message, a random access message, or a combination thereof from the network entity via the first set of control resources within the first downlink BWP associated with the first operating mode of the UE.

In some examples, to support transmitting the one or more control messages, the message transmission component 1255 may be configured as or otherwise support a means for transmitting a SIB indicating a first DCI size alignment for PDCCH messages in SS sets of the first downlink BWP, a second DCI size alignment for PDCCH messages in SS sets of the second downlink BWP, or both.

In some examples, the message transmission component 1255 may be configured as or otherwise support a means for transmitting one or more of a random access message, a system information message, a multicast message, a broadcast message, a paging message, an SDT, or an NCD-SSB via the second set of control resources within the second downlink BWP.

In some examples, to support transmitting the one or more control messages, the control message transmitter 1225 may be configured as or otherwise support a means for transmitting control signaling indicating a quantity of PRBs within the second downlink BWP, where the quantity of PRBs is based on a CCE AL of CORESETs within the second downlink BWP, a time duration of CORESETs within the second downlink BWP, a total quantity of CORESETs within the second downlink BWP, an RRC state of the UE, or a combination thereof.

In some examples, to support transmitting the one or more control messages, the control message transmitter 1225 may be configured as or otherwise support a means for transmitting one or more of a system information message, an RRC message, a broadcast message, or a multicast message indicating a CCE AL for SS sets within the second downlink BWP, a quantity of blind decoding candidates for SS sets within the second downlink BWP, or both.

Additionally, or alternatively, the communications manager 1220 may support wireless communications at a network entity in accordance with examples disclosed herein. In some examples, the control message transmitter 1225 may be configured as or otherwise support a means for transmitting one or more control messages that indicate a configuration for a first downlink BWP associated with a first operating mode of a UE, a second downlink BWP associated with a second operating mode of the UE, a first set of resources within the first downlink BWP, and a second set of resources within the second downlink BWP, where at least a portion of the configuration corresponds to a capability of the UE. In some examples, the first downlink BWP transmission component 1230 may be configured as or otherwise support a means for transmitting one or more messages via the first set of resources within the first downlink BWP in accordance with the configuration and based on the capability of the UE. In some examples, the second downlink BWP transmission component 1235 may be configured as or otherwise support a means for transmitting one or both of a system information message or a PWS message via the second set of resources within the second downlink BWP in accordance with the configuration and based on the capability of the UE.

In some examples, the random access component 1260 may be configured as or otherwise support a means for performing a random access procedure with the UE via the second set of resources within the second downlink BWP.

In some examples, to support transmitting one or both of the system information message or the PWS message, the second downlink BWP transmission component 1235 may be configured as or otherwise support a means for transmitting a random access message to the UE via the second set of resources within the second downlink BWP in accordance with the random access procedure, the random access message indicating one or both of the system information message or the PWS message.

In some examples, to support transmitting one or both of the system information message or the PWS message, the second downlink BWP transmission component 1235 may be configured as or otherwise support a means for transmitting a random access message to the UE via the second set of resources within the second downlink BWP based on identifying that the second downlink BWP does not include a CSS configured for paging operations, the random access message indicating one or both of the system information message or the PWS message.

In some examples, to support transmitting one or both of the system information message or the PWS message, the second downlink BWP transmission component 1235 may be configured as or otherwise support a means for transmitting a paging message to the UE via the second set of resources within the second downlink BWP based on identifying that the second downlink BWP includes a CSS configured for paging operations, the paging message indicating one or both of the system information message or the PWS message.

In some examples, to support transmitting one or both of the system information message or the PWS message, the second downlink BWP transmission component 1235 may be configured as or otherwise support a means for transmitting a paging message to the UE via the second set of resources within the second downlink BWP, the paging message scheduling a downlink SDT from the network entity. In some examples, to support transmitting one or both of the system information message or the PWS message, the second downlink BWP transmission component 1235 may be configured as or otherwise support a means for transmitting the downlink SDT to the UE via the second set of resources in accordance with the paging message, the downlink SDT indicating one or both of the system information message or the PWS message.

In some examples, to support transmitting one or both of the system information message or the PWS message, the second downlink BWP transmission component 1235 may be configured as or otherwise support a means for transmitting a PDCCH transmission to the UE via the second set of resources within the second downlink BWP, the PDCCH transmission scheduling a broadcast or multicast PDSCH transmission from the network entity. In some examples, to support transmitting one or both of the system information message or the PWS message, the second downlink BWP transmission component 1235 may be configured as or otherwise support a means for transmitting the broadcast or multicast PDSCH transmission via the second set of resources in accordance with the PDCCH transmission, the broadcast or multicast PDSCH transmission indicating one or both of the system information message or the PWS message.

Figure 13:
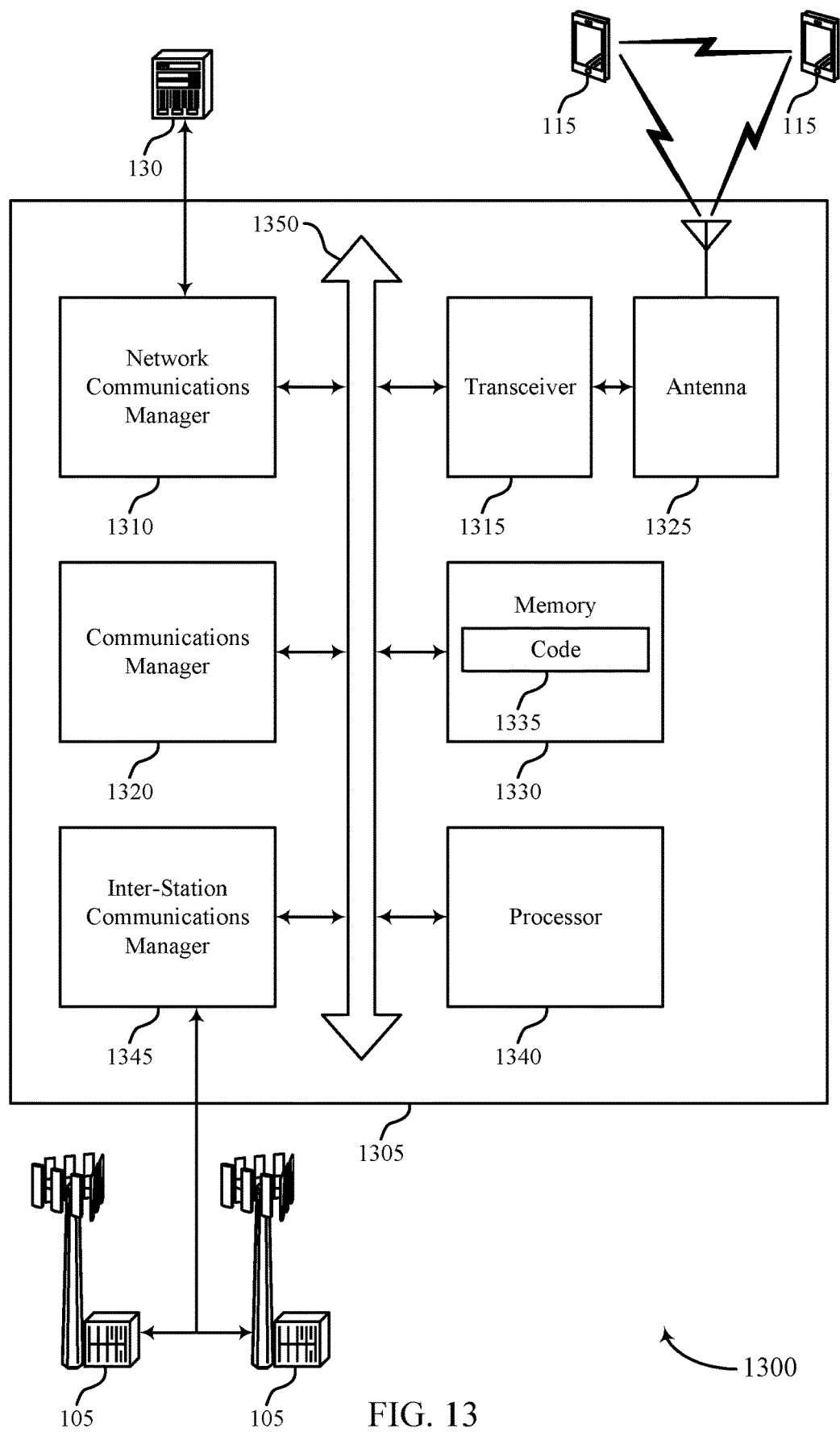
FIG. 13 shows a diagram of a system including a device that supports downlink control channel monitoring in multiple downlink BWPs in accordance with aspects of the present disclosure.

FIG. 13 shows a diagram of a system 1300 including a device 1305 that supports downlink control channel monitoring in multiple downlink BWPs in accordance with aspects of the present disclosure. The device 1305 may be an example of or include the components of a device 1005, a device 1105, or a base station 105 (e.g., a network entity) as described herein. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting downlink control channel monitoring in multiple downlink BWPs). For example, the device 1305 or a component of the device 1305 may include a processor 1340 and memory 1330 coupled (e.g., operatively, communicatively, functionally, electronically, and/or electrically) with or to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communications at the device 1305 in accordance with examples disclosed herein. For example, the communications manager 1320 may be configured as or otherwise support a means for transmitting one or more control messages that indicate a configuration for a first downlink BWP associated with a first operating mode of a UE, a second downlink BWP associated with a second operating mode of the UE, a first set of control resources within the first downlink BWP, and a second set of control resources within the second downlink BWP, where at least a portion of the configuration corresponds to a capability of the UE. The communications manager 1320 may be configured as or otherwise support a means for transmitting a first set of messages via the first set of control resources within the first downlink BWP in accordance with the configuration and based on the capability of the UE. The communications manager 1320 may be configured as or otherwise support a means for transmitting a second set of messages via the second set of control resources within the second downlink BWP in accordance with the configuration and based on the capability of the UE.

Additionally, or alternatively, the communications manager 1320 may support wireless communications at the device 1305 in accordance with examples disclosed herein. For example, the communications manager 1320 may be configured as or otherwise support a means for transmitting one or more control messages that indicate a configuration for a first downlink BWP associated with a first operating mode of a UE, a second downlink BWP associated with a second operating mode of the UE, a first set of resources within the first downlink BWP, and a second set of resources within the second downlink BWP, where at least a portion of the configuration corresponds to a capability of the UE. The communications manager 1320 may be configured as or otherwise support a means for transmitting one or more messages via the first set of resources within the first downlink BWP in accordance with the configuration and based on the capability of the UE. The communications manager 1320 may be configured as or otherwise support a means for transmitting one or both of a system information message or a PWS message via the second set of resources within the second downlink BWP in accordance with the configuration and based on the capability of the UE.

By including or configuring the communications manager 1320 in accordance with examples as described herein, the device 1305 may support techniques for improved idle or inactive mode procedures at the device 1305. For example, the techniques described herein may improve the efficiency (e.g., processing efficiency, power efficiency) of paging procedures, system information acquisition procedures, system information update procedures, SDT procedures, or MBS procedures performed by the device 1305.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of downlink control channel monitoring in multiple downlink BWPs as described herein, or the processor 1340 and the memory 1330 may be otherwise configured to perform or support such operations.

Figure 14:
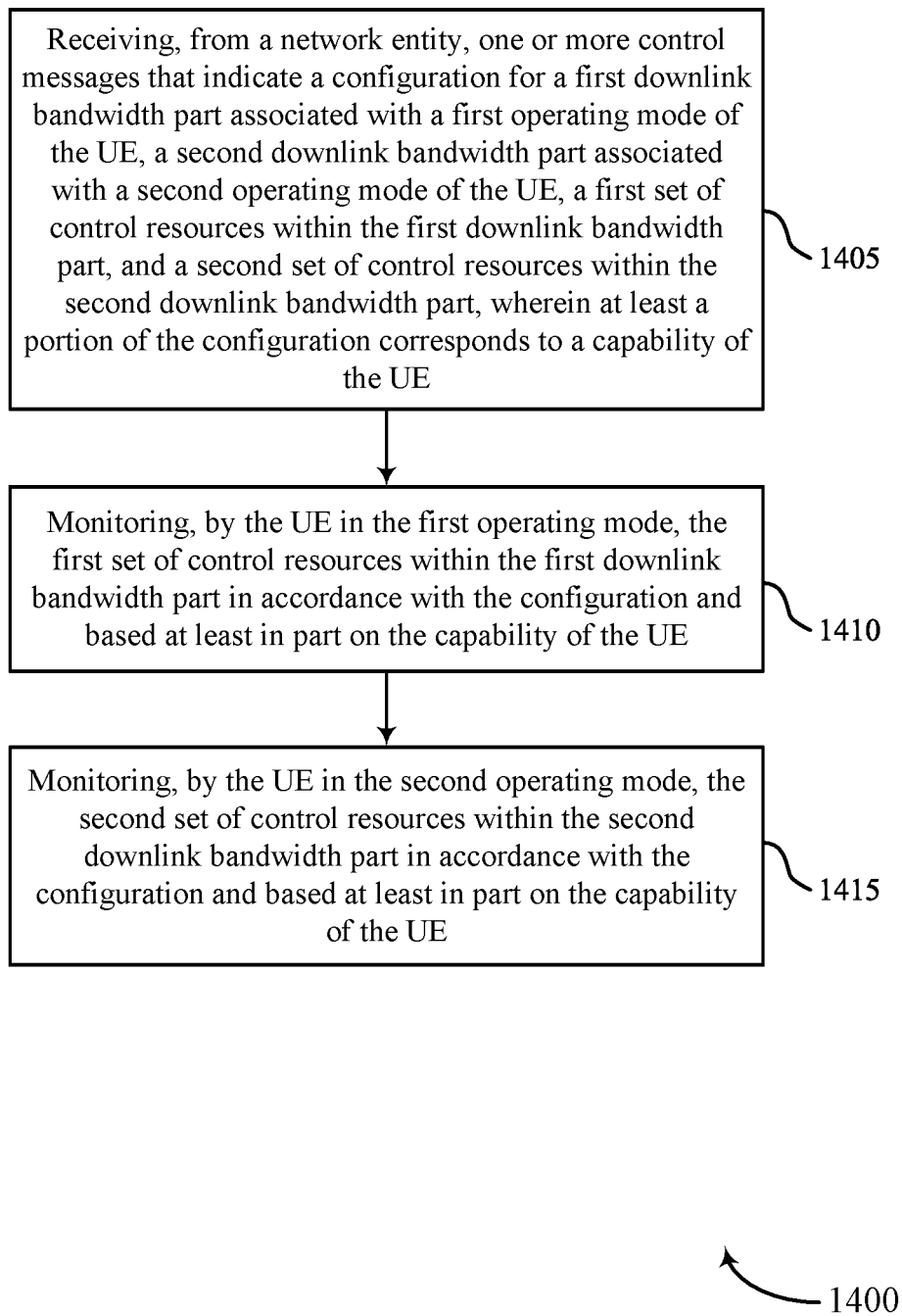
FIGS. 14 through 19 show flowcharts illustrating methods that support downlink control channel monitoring in multiple downlink BWPs in accordance with aspects of the present disclosure.

FIG. 14 shows a flowchart illustrating a method 1400 that supports downlink control channel monitoring in multiple downlink BWPs in accordance with aspects of the present disclosure. The operations of the method 1400 may be implemented by a UE (e.g., a RedCap UE) or components thereof. For example, the operations of the method 1400 may be performed by a UE 115, as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving, from a network entity, one or more control messages that indicate a configuration for a first downlink bandwidth part associated with a first operating mode of the UE, a second downlink bandwidth part associated with a second operating mode of the UE, a first set of control resources within the first downlink bandwidth part, and a second set of control resources within the second downlink bandwidth part, wherein at least a portion of the configuration corresponds to a capability of the UE. The operations of 1405 may be performed in accordance with examples disclosed herein. In some examples, aspects of the operations of 1405 may be performed by a control message receiver 825, as described with reference to FIG. 8.

At 1410, the method may include monitoring, by the UE in the first operating mode, the first set of control resources within the first downlink bandwidth part in accordance with the configuration and based at least in part on the capability of the UE. The operations of 1410 may be performed in accordance with examples disclosed herein. In some examples, aspects of the operations of 1410 may be performed by a first downlink BWP monitoring component 830, as described with reference to FIG. 8.

At 1415, the method may include monitoring, by the UE in the second operating mode, the second set of control resources within the second downlink bandwidth part in accordance with the configuration and based at least in part on the capability of the UE. The operations of 1415 may be performed in accordance with examples disclosed herein. In some examples, aspects of the operations of 1415 may be performed by a second downlink BWP monitoring component 835, as described with reference to FIG. 8.

Figure 15:
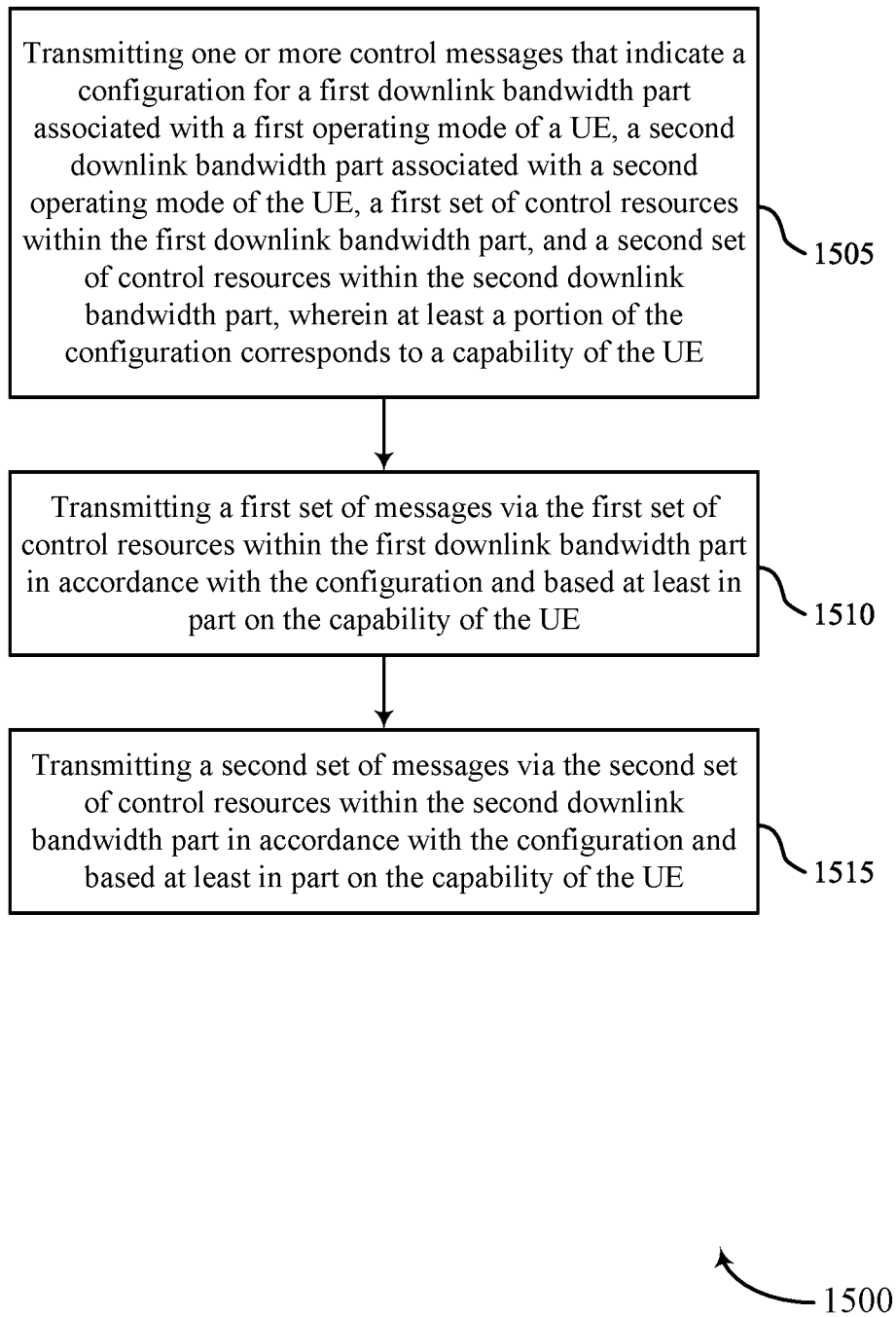

FIG. 15 shows a flowchart illustrating a method 1500 that supports downlink control channel monitoring in multiple downlink BWPs in accordance with aspects of the present disclosure. The operations of the method 1500 may be implemented by a network entity or components thereof. For example, the operations of the method 1500 may be performed by a base station 105, as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1505, the method may include transmitting one or more control messages that indicate a configuration for a first downlink bandwidth part associated with a first operating mode of a UE, a second downlink bandwidth part associated with a second operating mode of the UE, a first set of control resources within the first downlink bandwidth part, and a second set of control resources within the second downlink bandwidth part, wherein at least a portion of the configuration corresponds to a capability of the UE. The operations of 1505 may be performed in accordance with examples disclosed herein. In some examples, aspects of the operations of 1505 may be performed by a control message transmitter 1225, as described with reference to FIG. 12.

At 1510, the method may include transmitting a first set of messages via the first set of control resources within the first downlink bandwidth part in accordance with the configuration and based at least in part on the capability of the UE. The operations of 1510 may be performed in accordance with examples disclosed herein. In some examples, aspects of the operations of 1510 may be performed by a first downlink BWP transmission component 1230, as described with reference to FIG. 12.

At 1515, the method may include transmitting a second set of messages via the second set of control resources within the second downlink bandwidth part in accordance with the configuration and based at least in part on the capability of the UE. The operations of 1515 may be performed in accordance with examples disclosed herein. In some examples, aspects of the operations of 1515 may be performed by a second downlink BWP transmission component 1235, as described with reference to FIG. 12.

Figure 16:
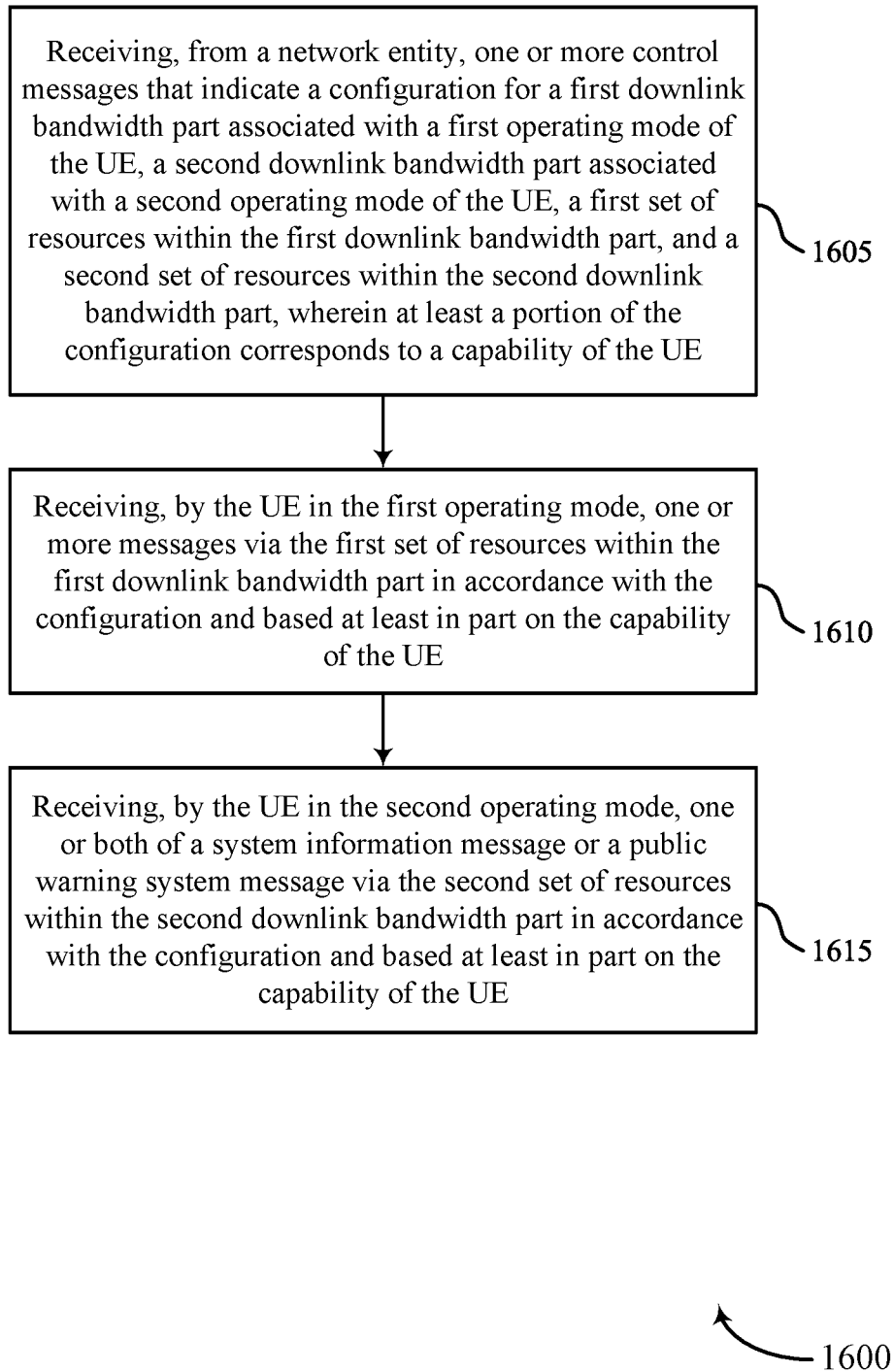

FIG. 16 shows a flowchart illustrating a method 1600 that supports downlink control channel monitoring in multiple downlink BWPs in accordance with aspects of the present disclosure. The operations of the method 1600 may be implemented by a UE (e.g., a RedCap UE) or components thereof. For example, the operations of the method 1600 may be performed by a UE 115, as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include receiving, from a network entity, one or more control messages that indicate a configuration for a first downlink bandwidth part associated with a first operating mode of the UE, a second downlink bandwidth part associated with a second operating mode of the UE, a first set of resources within the first downlink bandwidth part, and a second set of resources within the second downlink bandwidth part, wherein at least a portion of the configuration corresponds to a capability of the UE. The operations of 1605 may be performed in accordance with examples disclosed herein. In some examples, aspects of the operations of 1605 may be performed by a control message receiver 825, as described with reference to FIG. 8.

At 1610, the method may include receiving, by the UE in the first operating mode, one or more messages via the first set of resources within the first downlink bandwidth part in accordance with the configuration and based at least in part on the capability of the UE. The operations of 1610 may be performed in accordance with examples disclosed herein. In some examples, aspects of the operations of 1610 may be performed by a message receiving component 840, as described with reference to FIG. 8.

At 1615, the method may include receiving, by the UE in the second operating mode, one or both of a system information message or a public warning system message via the second set of resources within the second downlink bandwidth part in accordance with the configuration and based at least in part on the capability of the UE. The operations of 1615 may be performed in accordance with examples disclosed herein. In some examples, aspects of the operations of 1615 may be performed by a message receiving component 840, as described with reference to FIG. 8.

Figure 17:
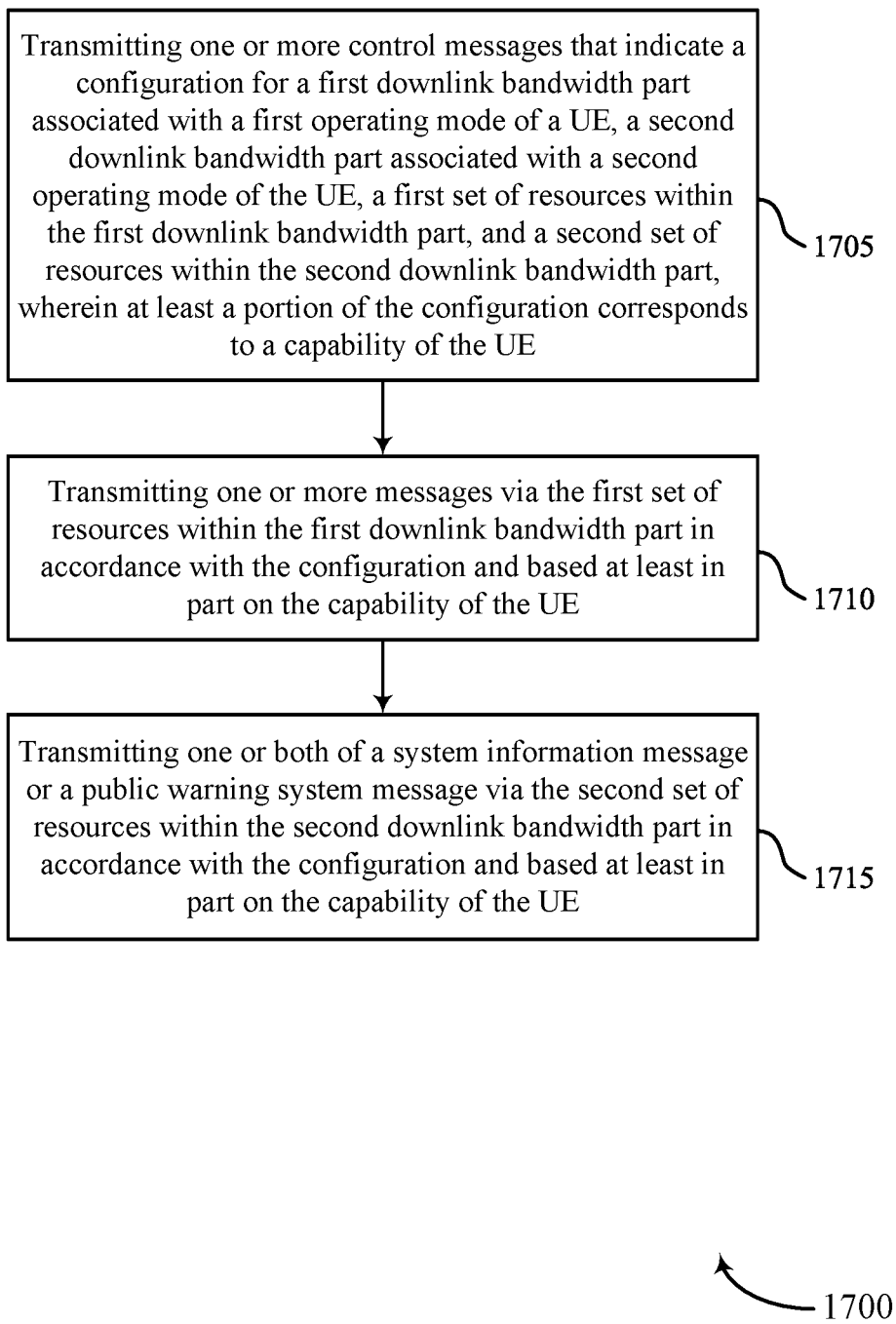

FIG. 17 shows a flowchart illustrating a method 1700 that supports downlink control channel monitoring in multiple downlink BWPs in accordance with aspects of the present disclosure. The operations of the method 1700 may be implemented by a network entity or components thereof. For example, the operations of the method 1700 may be performed by a base station 105, as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting one or more control messages that indicate a configuration for a first downlink bandwidth part associated with a first operating mode of a UE, a second downlink bandwidth part associated with a second operating mode of the UE, a first set of resources within the first downlink bandwidth part, and a second set of resources within the second downlink bandwidth part, wherein at least a portion of the configuration corresponds to a capability of the UE. The operations of 1705 may be performed in accordance with examples disclosed herein. In some examples, aspects of the operations of 1705 may be performed by a control message transmitter 1225, as described with reference to FIG. 12.

At 1710, the method may include transmitting one or more messages via the first set of resources within the first downlink bandwidth part in accordance with the configuration and based at least in part on the capability of the UE. The operations of 1710 may be performed in accordance with examples disclosed herein. In some examples, aspects of the operations of 1710 may be performed by a first downlink BWP transmission component 1230, as described with reference to FIG. 12.

At 1715, the method may include transmitting one or both of a system information message or a public warning system message via the second set of resources within the second downlink bandwidth part in accordance with the configuration and based at least in part on the capability of the UE. The operations of 1715 may be performed in accordance with examples disclosed herein. In some examples, aspects of the operations of 1715 may be performed by a second downlink BWP transmission component 1235, as described with reference to FIG. 12.

Figure 18:
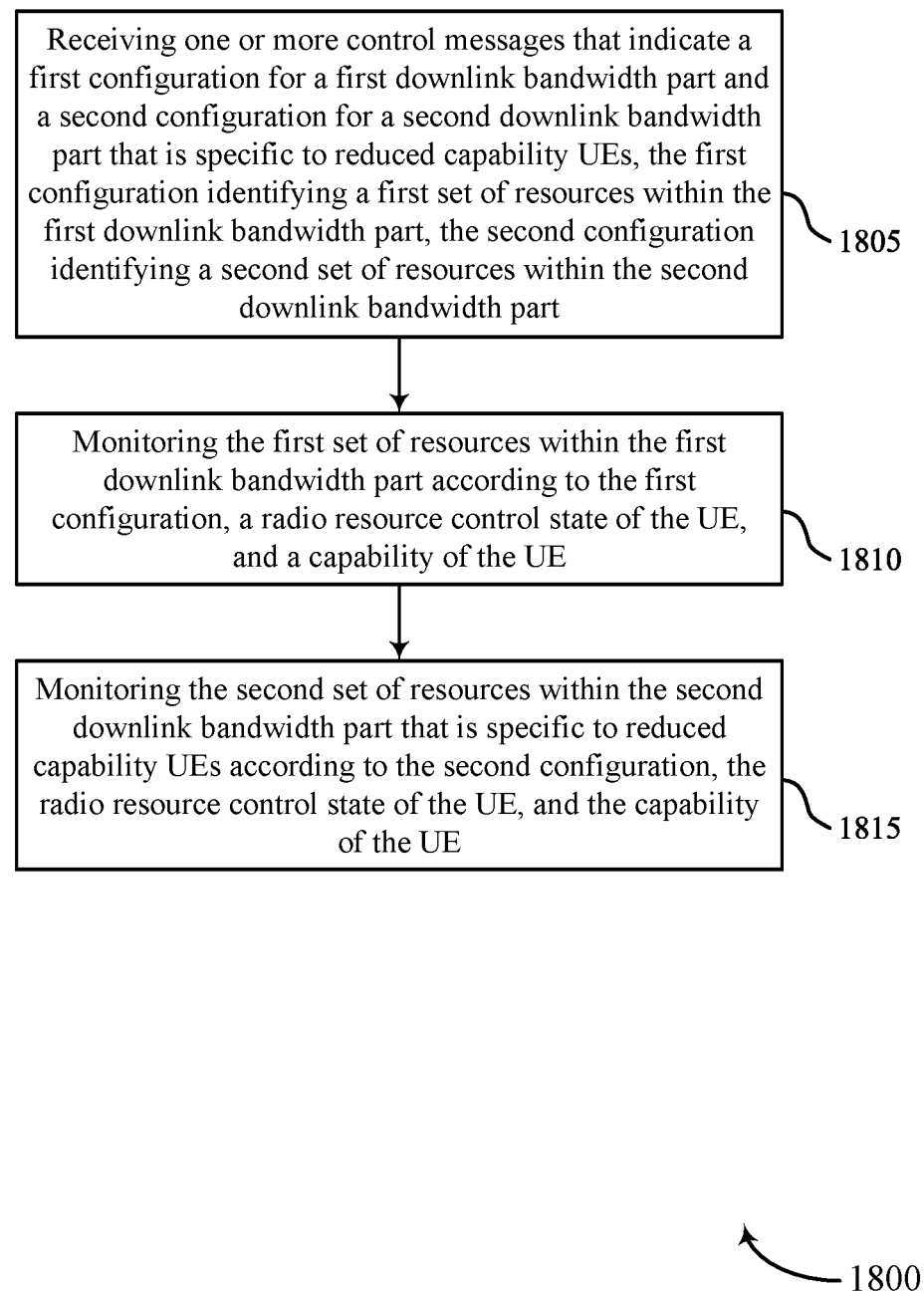

FIG. 18 illustrates a flowchart showing a method 1800 that supports downlink control channel monitoring in multiple downlink BWPs in accordance with one or more aspects of the present disclosure. The operations of the method 1800 may be implemented by a UE or components thereof. For example, the operations of the method 1800 may be performed by a UE 115, as described with reference to FIGS. 1 through 6. In some examples, a UE may execute a set of instructions to control the functional elements of the UE to perform the described functions. Additionally, or alternatively, the UE may perform aspects of the described functions using special-purpose hardware.

At 1805, the method may include receiving one or more control messages that indicate a first configuration for a first downlink bandwidth part and a second configuration for a second downlink bandwidth part that is specific to reduced capability UEs, the first configuration identifying a first set of resources within the first downlink bandwidth part, the second configuration identifying a second set of resources within the second downlink bandwidth part. The operations of 1805 may be performed in accordance with examples disclosed herein. In some examples, aspects of the operations of 1805 may be performed by a control message receiver 825, as described with reference to FIG. 8.

At 1810, the method may include monitoring the first set of resources within the first downlink bandwidth part according to the first configuration, a radio resource control state of the UE, and a capability of the UE. The operations of 1810 may be performed in accordance with examples disclosed herein. In some examples, aspects of the operations of 1810 may be performed by a first downlink BWP monitoring component 830, as described with reference to FIG. 8.

At 1815, the method may include monitoring the second set of resources within the second downlink bandwidth part that is specific to reduced capability UEs according to the second configuration, the radio resource control state of the UE, and the capability of the UE. The operations of 1815 may be performed in accordance with examples disclosed herein. In some examples, aspects of the operations of 1815 may be performed by a second downlink BWP monitoring component 835, as described with reference to FIG. 8.

Figure 19:
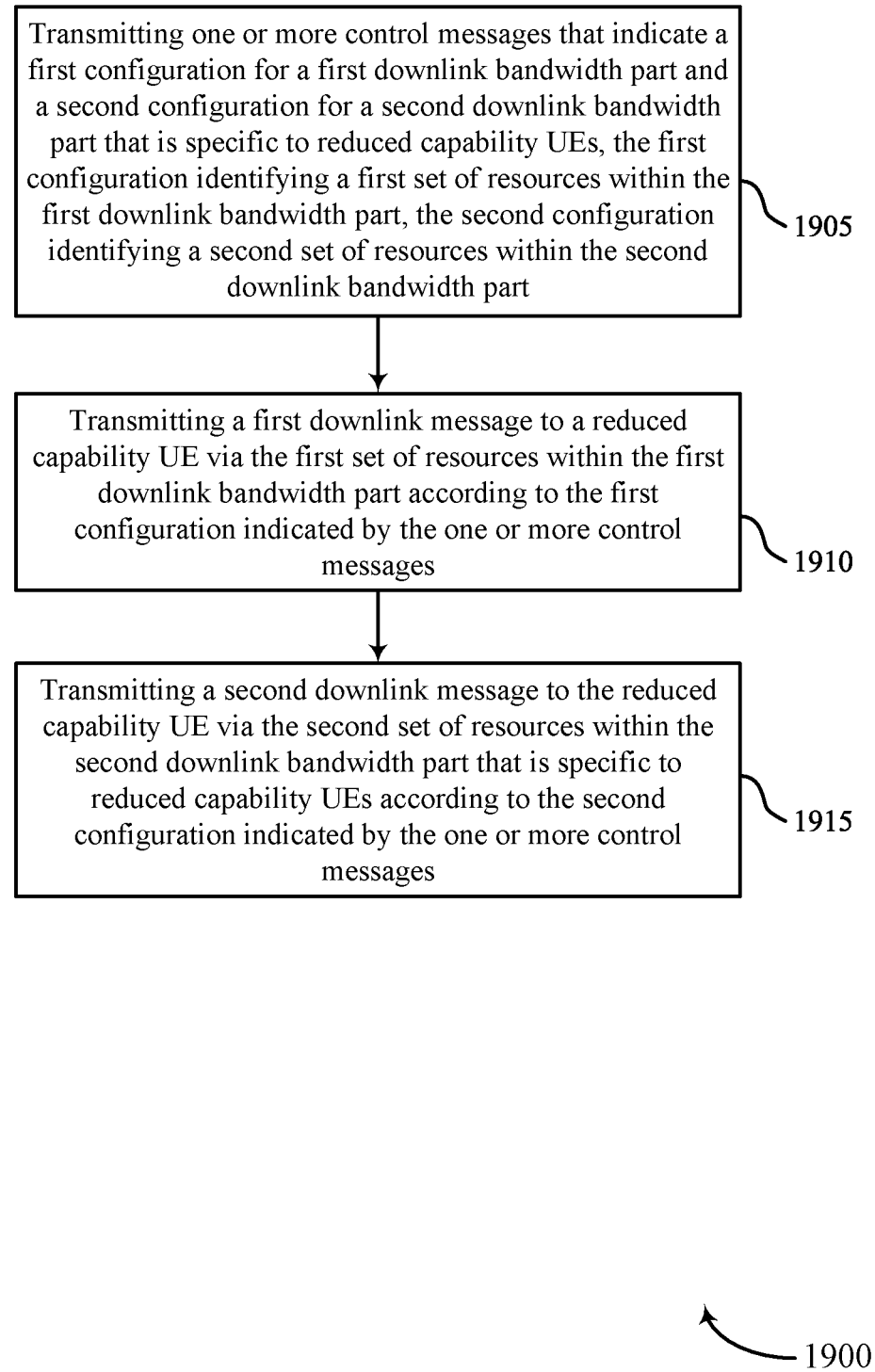

FIG. 19 illustrates a flowchart showing a method 1900 that supports downlink control channel monitoring in multiple downlink BWPs in accordance with one or more aspects of the present disclosure. The operations of the method 1900 may be implemented by a network entity or components thereof. For example, the operations of the method 1900 may be performed by an access network entity 140, as described with reference to FIGS. 1 and 2 and 7 through 10. In some examples, a network entity may execute a set of instructions to control the functional elements of the network entity to perform the described functions. Additionally, or alternatively, the network entity may perform aspects of the described functions using special-purpose hardware.

At 1905, the method may include transmitting one or more control messages that indicate a first configuration for a first downlink bandwidth part and a second configuration for a second downlink bandwidth part that is specific to reduced capability UEs, the first configuration identifying a first set of resources within the first downlink bandwidth part, the second configuration identifying a second set of resources within the second downlink bandwidth part. The operations of 1905 may be performed in accordance with examples disclosed herein. In some examples, aspects of the operations of 1905 may be performed by a control message transmitter 1225, as described with reference to FIG. 12.

At 1910, the method may include transmitting a first downlink message to a reduced capability UE via the first set of resources within the first downlink bandwidth part according to the first configuration indicated by the one or more control messages. The operations of 1910 may be performed in accordance with examples disclosed herein. In some examples, aspects of the operations of 1910 may be performed by a first downlink BWP transmission component 1230, as described with reference to FIG. 12.

At 1915, the method may include transmitting a second downlink message to the reduced capability UE via the second set of resources within the second downlink bandwidth part that is specific to reduced capability UEs according to the second configuration indicated by the one or more control messages. The operations of 1915 may be performed in accordance with examples disclosed herein. In some examples, aspects of the operations of 1915 may be performed by a second downlink BWP transmission component 1235, as described with reference to FIG. 12.

The following provides an overview of aspects of the present disclosure:

Aspect 1: A method for wireless communication at a UE, comprising: receiving one or more control messages that indicate a first configuration for a first downlink bandwidth part and a second configuration for a second downlink bandwidth part that is specific to reduced capability UEs, the first configuration identifying a first set of resources within the first downlink bandwidth part, the second configuration identifying a second set of resources within the second downlink bandwidth part; monitoring the first set of resources within the first downlink bandwidth part according to the first configuration, a radio resource control state of the UE, and a capability of the UE; and monitoring the second set of resources within the second downlink bandwidth part that is specific to reduced capability UEs according to the second configuration, the radio resource control state of the UE, and the capability of the UE.

Aspect 2: The method of aspect 1, further comprising: determining a first set of parameters for the first downlink bandwidth part based at least in part on the first configuration, the first set of parameters comprising one or more of a cyclic prefix, a subcarrier spacing, a number of resource blocks, or a number of symbols for a control resource set within the first downlink bandwidth part; and determining a second set of parameters for the second downlink bandwidth part that is specific to reduced capability UEs based at least in part on the second configuration, the second set of parameters comprising one or more of a bandwidth, a first physical resource block, or a subcarrier spacing for the second downlink bandwidth part.

Aspect 3: The method of any of aspects 1 through 2, wherein monitoring the first set of resources comprises: receiving at least one message of a paging operation via a common search space within the first downlink bandwidth part according to the first configuration and the capability of the UE, wherein the first downlink bandwidth part includes a control resource set with an index of zero (0).

Aspect 4: The method of any of aspects 1 through 3, wherein monitoring the second set of resources comprises: receiving one or more random access messages via the second set of resources within the second downlink bandwidth part that is specific to reduced capability UEs according to the second configuration, the radio resource control state of the UE, and the capability of the UE, wherein the second downlink bandwidth part does not include a control resource set with an index of zero (0).

Aspect 5: The method of any of aspects 1 through 4, further comprising: receiving, via one or more physical downlink control channel resources within the first downlink bandwidth part, a downlink message that schedules transmission of a first system information block within the first downlink bandwidth part, wherein the first system information block indicates the second configuration of the second downlink bandwidth part that is specific to reduced capability UEs.

Aspect 6: The method of any of aspects 1 through 5, wherein monitoring the first set of resources comprises: receiving one or more cell-defined synchronization signal blocks via the first set of resources within the first downlink bandwidth part; and performing a cell selection procedure based at least in part on a measurement of the one or more cell-defined synchronization signal blocks.

Aspect 7: The method of any of aspects 1 through 6, wherein receiving the one or more control messages comprises: receiving an indication of a search space configured for downlink small data transmissions in the first downlink bandwidth part or the second downlink bandwidth part; and monitoring the search space for a downlink small data transmission in accordance with the indication.

Aspect 8: The method of any of aspects 1 through 7, wherein receiving the one or more control messages comprises: receiving a master information block that indicates the first configuration of the first downlink bandwidth part; and receiving a system information block that indicates the second configuration of the second downlink bandwidth part.

Aspect 9: The method of any of aspects 1 through 8, further comprising: receiving one or more of a system information message, a message of a paging operation, a random access message, a small data transmission, a broadcast message, a public warning system notification, or a non-cell-defined synchronization signal block via one or more control resource sets or search space sets within the first downlink bandwidth part or the second downlink bandwidth part that is specific to reduced capability UEs.

Aspect 10: The method of any of aspects 1 through 9, further comprising: receiving one or more of a cell-defined synchronization signal block, a system information message, a message of a paging operation, or a random access message via the first set of resources within the first downlink bandwidth part according to the first configuration, the radio resource control state of the UE, and the capability of the UE.

Aspect 11: The method of any of aspects 1 through 10, further comprising: transmitting one or more of a small data transmission, a random access message, UE mobility information, or a request for on-demand system information via one or more resources within an uplink bandwidth part configured for the UE.

Aspect 12: The method of any of aspects 1 through 11, further comprising: transmitting a request for on-demand system information via one or more resources within an uplink bandwidth part configured for the UE; and receiving the on-demand system information via the first set of resources within the first downlink bandwidth part or the second set of resources within the second downlink bandwidth part.

Aspect 13: The method of aspect 12, wherein the UE transmits the request for on-demand system information in accordance with a random access procedure.

Aspect 14: The method of any of aspects 1 through 13, wherein a bandwidth of the second downlink bandwidth part that is specific to reduced capability UEs is less than or equal to a maximum downlink bandwidth supported by the UE.

Aspect 15: The method of any of aspects 1 through 14, wherein the one or more control messages include a master information block, a system information block, a radio resource control message, or a combination thereof Aspect 16: The method of any of aspects 1 through 15, wherein the first downlink bandwidth part is used for reception of cell-defined synchronization signal blocks.

Aspect 17: The method of any of aspects 1 through 16, wherein the UE is a reduced capability UE; and the radio resource control state of the UE comprises an idle radio resource control state or an inactive radio resource control state.

Aspect 18: The method of any of aspects 1 through 17, wherein the first downlink bandwidth part comprises a first set of common search spaces configured for cell selection procedures or cell re-selection procedures; and the second downlink bandwidth part comprises a second set of common search spaces configured for random access procedures or paging operations.

Aspect 19: The method of any of aspects 1 through 18, wherein the first downlink bandwidth part comprises one or more common search spaces configured for system information acquisition or paging operations.

Aspect 20: The method of any of aspects 1 through 19, further comprising: determining a quantity of control resource sets within the second downlink bandwidth part based at least in part on a quantity of control resource sets within the first downlink bandwidth part, a summation of control resource sets within other downlink bandwidth parts of the UE, a threshold quantity of control resource sets supported by the UE, or a combination thereof Aspect 21: The method of any of aspects 1 through 20, further comprising: determining a quantity of search space sets within the second downlink bandwidth part based at least in part on a quantity of search space sets within the first downlink bandwidth part, a summation of search space sets within other downlink bandwidth parts of the UE, a threshold quantity of search space sets supported by the UE, or a combination thereof Aspect 22: The method of any of aspects 1 through 21, further comprising: switching from the first downlink bandwidth part to the second downlink bandwidth part after transitioning from a first operating mode associated with the first downlink bandwidth part to a second operating mode associated with the second downlink bandwidth part.

Aspect 23: The method of any of aspects 1 through 22, wherein receiving the one or more control messages comprises: receiving system information that indicates at least one of an aggregation level, a monitoring periodicity, or a monitoring occasion configuration for common search space sets within the second downlink bandwidth part that is specific to reduced capability UEs.

Aspect 24: The method of any of aspects 1 through 23, wherein receiving the one or more control messages comprises: receiving a system information block that indicates a first downlink control information size alignment for physical downlink control channel messages scheduled in search space sets of the first downlink bandwidth part, a second downlink control information size alignment for physical downlink control channel messages scheduled in search space sets of the second downlink bandwidth part, or both.

Aspect 25: The method of any of aspects 1 through 24, wherein receiving the one or more control messages comprises: receiving an indication of a quantity of physical resource blocks within the second downlink bandwidth part that is specific to reduced capability UEs, wherein the quantity of physical resource blocks is based at least in part on a control channel element aggregation level of control resource sets within the second downlink bandwidth part, a time duration of control resource sets within the second downlink bandwidth part, a total number of control resource sets within the second downlink bandwidth part, the radio resource control state of the UE, or a combination thereof.

Aspect 26: The method of any of aspects 1 through 25, wherein receiving the one or more control messages comprises: receiving one or more of a system information message, a radio resource control message, a broadcast message, or a multicast message that indicates a control channel element aggregation level for search space sets within the second downlink bandwidth part, a quantity of blind decoding candidates for search space sets within the second downlink bandwidth part, or both.

Aspect 27: A method for wireless communication at a network entity, comprising: transmitting one or more control messages that indicate a first configuration for a first downlink bandwidth part and a second configuration for a second downlink bandwidth part that is specific to reduced capability UEs, the first configuration identifying a first set of resources within the first downlink bandwidth part, the second configuration identifying a second set of resources within the second downlink bandwidth part; transmitting a first downlink message to a reduced capability UE via the first set of resources within the first downlink bandwidth part according to the first configuration indicated by the one or more control messages; and transmitting a second downlink message to the reduced capability UE via the second set of resources within the second downlink bandwidth part that is specific to reduced capability UEs according to the second configuration indicated by the one or more control messages.

Aspect 28: The method of aspect 27, wherein transmitting the first downlink message comprises: transmitting at least one message of a paging operation to the reduced capability UE via a common search space within the first downlink bandwidth part according to the first configuration, wherein the first downlink bandwidth part includes a control resource set with an index of zero (0).

Aspect 29: An apparatus for wireless communication at a UE, comprising: at least one processor; and memory coupled with the at least one processor, the memory storing instructions executable by the at least one processor to cause the UE to perform a method of any of aspects 1 through 26.

Aspect 30: An apparatus for wireless communication at a UE, comprising: at least one means for performing a method of any of aspects 1 through 26.

Aspect 31: A non-transitory computer-readable medium storing code for wireless communication at a UE, the code comprising instructions executable by at least one processor to perform a method of any of aspects 1 through 26.

Aspect 32: An apparatus for wireless communication at a network entity, comprising: at least one processor; and memory coupled with the at least one processor, the memory storing instructions executable by the at least one processor to cause the network entity to perform a method of any of aspects 27 through 28.

Aspect 33: An apparatus for wireless communication at a network entity, comprising: at least one means for performing a method of any of aspects 27 through 28.

Aspect 34: A non-transitory computer-readable medium storing code for wireless communication at a network entity, the code comprising instructions executable by at least one processor to perform a method of any of aspects 27 through 28.

Aspect 35: A method for wireless communications at a UE, comprising: receiving, from a network entity, one or more control messages that indicate a configuration for a first downlink bandwidth part associated with a first operating mode of the UE, a second downlink bandwidth part associated with a second operating mode of the UE, a first set of control resources within the first downlink bandwidth part, and a second set of control resources within the second downlink bandwidth part, wherein at least a portion of the configuration corresponds to a capability of the UE; monitoring, by the UE in the first operating mode, the first set of control resources within the first downlink bandwidth part in accordance with the configuration and based at least in part on the capability of the UE; and monitoring, by the UE in the second operating mode, the second set of control resources within the second downlink bandwidth part in accordance with the configuration and based at least in part on the capability of the UE.

Aspect 36: The method of aspect 35, further comprising: monitoring, by the UE in the first operating mode, the first set of control resources within the first downlink bandwidth part; receiving, from the network entity and via the first set of control resources, the one or more control messages that indicate the configuration for the second downlink bandwidth part and the second set of control resources within the second downlink bandwidth part; and determining a quantity of control resources within the second downlink bandwidth part based at least in part on a quantity of control resources within the first downlink bandwidth part.

Aspect 37: The method of any of aspects 35 through 36, further comprising: determining a quantity of control resources within the second downlink bandwidth part based at least in part on a quantity of control resources within the first downlink bandwidth part, a summation of control resources within different downlink bandwidth parts of the UE, and a threshold quantity of control resources corresponding to the capability of the UE.

Aspect 38: The method of any of aspects 35 through 37, further comprising: determining a quantity of search space sets within the second downlink bandwidth part based at least in part on a quantity of search space sets within the first downlink bandwidth part, a summation of search space sets within different downlink bandwidth parts of the UE, and a threshold quantity of search space sets corresponding to the capability of the UE.

Aspect 39: The method of any of aspects 35 through 38, wherein receiving the one or more control messages comprises: receiving control signaling indicating one or both of a first set of parameters related to the first downlink bandwidth part or a second set of parameters related to the second downlink bandwidth part, the first set of parameters comprising a bandwidth, an initial physical resource block location, a numerology, or a combination thereof associated with the first downlink bandwidth part, the second set of parameters comprising a bandwidth, an initial physical resource block location, a numerology, or a combination thereof associated with the second downlink bandwidth part, wherein the first set of parameters is different from the second set of parameters.

Aspect 40: The method of any of aspects 35 through 39, wherein receiving the one or more control messages comprises: receiving, from the network entity, a master information block indicating the configuration for the first downlink bandwidth part; and receiving, from the network entity, one or more of a system information block, a dedicated radio resource control message, a multicast message, or a broadcast message indicating the configuration for the second downlink bandwidth part.

Aspect 41: The method of any of aspects 35 through 40, further comprising: performing a bandwidth part switching procedure from the first downlink bandwidth part to the second downlink bandwidth part based at least in part on transitioning from the first operating mode to the second operating mode, wherein monitoring the second set of control resources within the second downlink bandwidth part is based at least in part on performing the bandwidth part switching procedure.

Aspect 42: The method of any of aspects 35 through 41, further comprising: performing, using control resource sets and search space sets within the first downlink bandwidth part or using control resource sets and search space sets within the second downlink bandwidth part, one or more procedures associated with the first operating mode of the UE or the second operating mode of the UE, the one or more procedures comprising a system information acquisition procedure, a system information update procedure, a mobility procedure, a paging operation, a random access procedure, a small data transfer procedure, an on-demand system information transmission request procedure, or a combination thereof Aspect 43: The method of any of aspects 35 through 42, wherein the first operating mode and the second operating mode correspond to a radio resource control idle state or a radio resource control inactive state of the UE; and the first set of control resources within the first downlink bandwidth part and the second set of control resources within the second downlink bandwidth part comprise common search space sets.

Aspect 44: The method of any of aspects 35 through 42, wherein the first operating mode and the second operating mode correspond to a radio resource control inactive state or a radio resource control connected state of the UE; and the first set of control resources within the first downlink bandwidth part and the second set of control resources within the second downlink bandwidth part comprise UE-specific search space sets, common search space sets, or both.

Aspect 45: The method of any of aspects 35 through 44, wherein the first downlink bandwidth part and the second downlink bandwidth part correspond to different frequency ranges.

Aspect 46: The method of any of aspects 35 through 45, wherein the first downlink bandwidth part comprises a first common search space configured for cell selection procedures or cell re-selection procedures by UEs in a radio resource control idle state or a radio resource control inactive state; and the second downlink bandwidth part comprises at least a second common search space configured for random access procedures or paging operations by UEs in a radio resource control idle state or a radio resource control inactive state.

Aspect 47: The method of any of aspects 35 through 46, wherein the first downlink bandwidth part comprises one or more common search spaces configured for system information acquisition procedures, system information update procedures, mobility procedures, or paging operations by UEs in a radio resource control idle state or a radio resource control inactive state.

Aspect 48: The method of any of aspects 35 through 47, wherein receiving the one or more control messages comprises: receiving a system information block indicating one or more of an aggregation level, a monitoring periodicity, or a monitoring occasion configuration for common search space sets within the second downlink bandwidth part based at least in part on the capability of the UE.

Aspect 49: The method of any of aspects 35 through 48, further comprising: receiving, by the UE in the first operating mode, a cell-defined synchronization signal block, a system information message, a message of a paging operation, a random access message, or a combination thereof from the network entity via the first set of control resources within the first downlink bandwidth part associated with the first operating mode of the UE.

Aspect 50: The method of any of aspects 35 through 49, wherein receiving the one or more control messages comprises: receiving, from the network entity, a system information block indicating a first downlink control information size alignment for physical downlink control channel messages in search space sets of the first downlink bandwidth part, a second downlink control information size alignment for physical downlink control channel messages in search space sets of the second downlink bandwidth part, or both.

Aspect 51: The method of any of aspects 35 through 50, further comprising: receiving one or more of a random access message, a system information message, a multicast message, a broadcast message, a message of a paging operation, a small data transmission, or a non-cell-defined synchronization signal block from the network entity via the second set of control resources within the second downlink bandwidth part.

Aspect 52: The method of any of aspects 35 through 51, wherein receiving the one or more control messages comprises: receiving control signaling indicating a quantity of physical resource blocks within the second downlink bandwidth part, wherein the quantity of physical resource blocks is based at least in part on a control channel element aggregation level of control resource sets within the second downlink bandwidth part, a time duration of control resource sets within the second downlink bandwidth part, a total quantity of control resource sets within the second downlink bandwidth part, a radio resource control state of the UE, or a combination thereof.

Aspect 53: The method of any of aspects 35 through 52, wherein receiving the one or more control messages comprises: receiving one or more of a system information message, a radio resource control message, a broadcast message, or a multicast message indicating a control channel element aggregation level for search space sets within the second downlink bandwidth part, a quantity of blind decoding candidates for search space sets within the second downlink bandwidth part, or both.

Aspect 54: A method for wireless communications at a network entity, comprising: transmitting one or more control messages that indicate a configuration for a first downlink bandwidth part associated with a first operating mode of a UE, a second downlink bandwidth part associated with a second operating mode of the UE, a first set of control resources within the first downlink bandwidth part, and a second set of control resources within the second downlink bandwidth part, wherein at least a portion of the configuration corresponds to a capability of the UE; transmitting a first set of messages via the first set of control resources within the first downlink bandwidth part in accordance with the configuration and based at least in part on the capability of the UE; and transmitting a second set of messages via the second set of control resources within the second downlink bandwidth part in accordance with the configuration and based at least in part on the capability of the UE.

Aspect 55: The method of aspect 54, further comprising: determining a quantity of control resources within the second downlink bandwidth part based at least in part on a quantity of control resources within the first downlink bandwidth part; and transmitting, to the UE, an indication of the quantity of control resources within the second downlink bandwidth part.

Aspect 56: The method of any of aspects 54 through 55, further comprising: determining a quantity of control resources within the second downlink bandwidth part based at least in part on a quantity of control resources within the first downlink bandwidth part and a summation of control resources within different downlink bandwidth parts of the UE; and transmitting, to the UE, an indication of the quantity of control resources within the second downlink bandwidth part.

Aspect 57: The method of any of aspects 54 through 56, further comprising: determining a quantity of search space sets within the second downlink bandwidth part based at least in part on a quantity of search space sets within the first downlink bandwidth part, a summation of search space sets within different downlink bandwidth parts of the UE, and a threshold quantity of search space sets related to capabilities of UEs that are permitted to connect with the network entity; and transmitting, to the UE, an indication of the quantity of control resources within the second downlink bandwidth part.

Aspect 58: The method of any of aspects 54 through 57, wherein transmitting the one or more control messages comprises: transmitting control signaling indicating one or both of a first set of parameters related to the first downlink bandwidth part or a second set of parameters related to the second downlink bandwidth part, the first set of parameters comprising a bandwidth, an initial physical resource block location, a numerology, or a combination thereof associated with the first downlink bandwidth part, the second set of parameters comprising a bandwidth, an initial physical resource block location, a numerology, or a combination thereof associated with the second downlink bandwidth part, wherein the first set of parameters is different from the second set of parameters.

Aspect 59: The method of any of aspects 54 through 58, wherein transmitting the one or more control messages comprises: transmitting, to the UE, a master information block indicating the configuration for the first downlink bandwidth part; and transmitting, to the UE, one or more of a system information block, a dedicated radio resource control message, a multicast message, or a broadcast message indicating the configuration for the second downlink bandwidth part.

Aspect 60: The method of any of aspects 54 through 59, wherein the first operating mode and the second operating mode correspond to a radio resource control idle state or a radio resource control inactive state of the UE; and the first set of control resources within the first downlink bandwidth part and the second set of control resources within the second downlink bandwidth part comprise common search space sets.

Aspect 61: The method of any of aspects 54 through 59, wherein the first operating mode and the second operating mode correspond to a radio resource control inactive state or a radio resource control connected state of the UE; and the first set of control resources within the first downlink bandwidth part and the second set of control resources within the second downlink bandwidth part comprise UE-specific search space sets, common search space sets, or both.

Aspect 62: The method of any of aspects 54 through 61, wherein the first downlink bandwidth part and the second downlink bandwidth part correspond to different frequency ranges.

Aspect 63: The method of any of aspects 54 through 62, wherein the first downlink bandwidth part comprises a first common search space configured for cell selection procedures or cell re-selection procedures by UEs in a radio resource control idle state or a radio resource control inactive state; and the second downlink bandwidth part comprises at least a second common search space configured for random access procedures or paging operations by UEs in a radio resource control idle state or a radio resource control inactive state.

Aspect 64: The method of any of aspects 54 through 63, wherein the first downlink bandwidth part comprises one or more common search spaces configured for system information acquisition procedures, system information update procedures, mobility procedures, or paging operations by UEs in a radio resource control idle state or a radio resource control inactive state.

Aspect 65: The method of any of aspects 54 through 64, wherein transmitting the one or more control messages comprises: transmitting a system information block indicating one or more of an aggregation level, a monitoring periodicity, or a monitoring occasion configuration for common search space sets within the second downlink bandwidth part based at least in part on the capability of the UE.

Aspect 66: The method of any of aspects 54 through 65, further comprising: transmitting a cell-defined synchronization signal block, a system information message, a message of a paging operation, a random access message, or a combination thereof from the network entity via the first set of control resources within the first downlink bandwidth part associated with the first operating mode of the UE.

Aspect 67: The method of any of aspects 54 through 66, wherein transmitting the one or more control messages comprises: transmitting a system information block indicating a first downlink control information size alignment for physical downlink control channel messages in search space sets of the first downlink bandwidth part, a second downlink control information size alignment for physical downlink control channel messages in search space sets of the second downlink bandwidth part, or both.

Aspect 68: The method of any of aspects 54 through 67, further comprising: transmitting one or more of a random access message, a system information message, a multicast message, a broadcast message, a message of a paging operation, a small data transmission, or a non-cell-defined synchronization signal block via the second set of control resources within the second downlink bandwidth part.

Aspect 69: The method of any of aspects 54 through 68, wherein transmitting the one or more control messages comprises: transmitting control signaling indicating a quantity of physical resource blocks within the second downlink bandwidth part, wherein the quantity of physical resource blocks is based at least in part on a control channel element aggregation level of control resource sets within the second downlink bandwidth part, a time duration of control resource sets within the second downlink bandwidth part, a total quantity of control resource sets within the second downlink bandwidth part, a radio resource control state of the UE, or a combination thereof.

Aspect 70: The method of any of aspects 54 through 69, wherein transmitting the one or more control messages comprises: transmitting one or more of a system information message, a radio resource control message, a broadcast message, or a multicast message indicating a control channel element aggregation level for search space sets within the second downlink bandwidth part, a quantity of blind decoding candidates for search space sets within the second downlink bandwidth part, or both.

Aspect 71: A method for wireless communications at a UE, comprising: receiving, from a network entity, one or more control messages that indicate a configuration for a first downlink bandwidth part associated with a first operating mode of the UE, a second downlink bandwidth part associated with a second operating mode of the UE, a first set of resources within the first downlink bandwidth part, and a second set of resources within the second downlink bandwidth part, wherein at least a portion of the configuration corresponds to a capability of the UE; receiving, by the UE in the first operating mode, one or more messages via the first set of resources within the first downlink bandwidth part in accordance with the configuration and based at least in part on the capability of the UE; and receiving, by the UE in the second operating mode, one or both of a system information message or a public warning system message via the second set of resources within the second downlink bandwidth part in accordance with the configuration and based at least in part on the capability of the UE.

Aspect 72: The method of aspect 71, further comprising: performing a random access procedure with the network entity via the second set of resources within the second downlink bandwidth part.

Aspect 73: The method of aspect 72, wherein receiving one or both of the system information message or the public warning system message comprises: receiving a random access message from the network entity via the second set of resources within the second downlink bandwidth part in accordance with the random access procedure, the random access message indicating one or both of the system information message or the public warning system message.

Aspect 74: The method of any of aspects 71 through 73, wherein receiving one or both of the system information message or the public warning system message comprises: receiving a random access message from the network entity via the second set of resources within the second downlink bandwidth part based at least in part on identifying that the second downlink bandwidth part does not include a common search space configured for paging operations, the random access message indicating one or both of the system information message or the public warning system message.

Aspect 75: The method of aspect 71, wherein receiving one or both of the system information message or the public warning system message comprises: receiving a message of a paging operation from the network entity via the second set of resources within the second downlink bandwidth part based at least in part on identifying that the second downlink bandwidth part includes a common search space configured for paging operations, the message of the paging operation indicating one or both of the system information message or the public warning system message.

Aspect 76: The method of any of aspect 71, wherein receiving one or both of the system information message or the public warning system message comprises: receiving a message of a paging operation from the network entity via the second set of resources within the second downlink bandwidth part, the message of a paging operation scheduling a downlink small data transmission from the network entity; and monitoring the second set of resources within the second downlink bandwidth part for the downlink small data transmission from the network entity in accordance with the message of a paging operation, the downlink small data transmission indicating one or both of the system information message or the public warning system message.

Aspect 77: The method of aspect 71, wherein receiving one or both of the system information message or the public warning system message comprises: receiving a physical downlink control channel transmission from the network entity via the second set of resources within the second downlink bandwidth part, the physical downlink control channel transmission scheduling a broadcast or multicast physical downlink shared channel transmission from the network entity; and monitoring the second set of resources for the broadcast or multicast physical downlink shared channel transmission from the network entity in accordance with the physical downlink control channel transmission, the broadcast or multicast physical downlink shared channel transmission indicating one or both of the system information message or the public warning system message.

Aspect 78: A method for wireless communications at a network entity, comprising: transmitting one or more control messages that indicate a configuration for a first downlink bandwidth part associated with a first operating mode of a UE, a second downlink bandwidth part associated with a second operating mode of the UE, a first set of resources within the first downlink bandwidth part, and a second set of resources within the second downlink bandwidth part, wherein at least a portion of the configuration corresponds to a capability of the UE; transmitting one or more messages via the first set of resources within the first downlink bandwidth part in accordance with the configuration and based at least in part on the capability of the UE; and transmitting one or both of a system information message or a public warning system message via the second set of resources within the second downlink bandwidth part in accordance with the configuration and based at least in part on the capability of the UE.

Aspect 79: The method of aspect 78, further comprising: performing a random access procedure with the UE via the second set of resources within the second downlink bandwidth part.

Aspect 80: The method of aspect 79, wherein transmitting one or both of the system information message or the public warning system message comprises: transmitting a random access message to the UE via the second set of resources within the second downlink bandwidth part in accordance with the random access procedure, the random access message indicating one or both of the system information message or the public warning system message.

Aspect 81: The method of any of aspects 78 through 80, wherein transmitting one or both of the system information message or the public warning system message comprises: transmitting a random access message to the UE via the second set of resources within the second downlink bandwidth part based at least in part on identifying that the second downlink bandwidth part does not include a common search space configured for paging operations, the random access message indicating one or both of the system information message or the public warning system message.

Aspect 82: The method of aspect 78, wherein transmitting one or both of the system information message or the public warning system message comprises: transmitting a message of a paging operation to the UE via the second set of resources within the second downlink bandwidth part based at least in part on identifying that the second downlink bandwidth part includes a common search space configured for paging operations, the message of a paging operation indicating one or both of the system information message or the public warning system message.

Aspect 83: The method of aspect 78, wherein transmitting one or both of the system information message or the public warning system message comprises: transmitting a message of a paging operation to the UE via the second set of resources within the second downlink bandwidth part, the message of a paging operation scheduling a downlink small data transmission from the network entity; and transmitting the downlink small data transmission to the UE via the second set of resources in accordance with the message of a paging operation, the downlink small data transmission indicating one or both of the system information message or the public warning system message.

Aspect 84: The method of aspect 78, wherein transmitting one or both of the system information message or the public warning system message comprises: transmitting a physical downlink control channel transmission to the UE via the second set of resources within the second downlink bandwidth part, the physical downlink control channel transmission scheduling a broadcast or multicast physical downlink shared channel transmission from the network entity; and transmitting the broadcast or multicast physical downlink shared channel transmission via the second set of resources in accordance with the physical downlink control channel transmission, the broadcast or multicast physical downlink shared channel transmission indicating one or both of the system information message or the public warning system message.

Aspect 85: An apparatus for wireless communications at a UE, comprising: at least one processor; and memory coupled with the at least one processor, the memory storing instructions executable by the at least one processor to cause the UE to perform a method of any of aspects 35 through 53.

Aspect 86: An apparatus for wireless communications at a UE, comprising: at least one means for performing a method of any of aspects 35 through 53.

Aspect 87: A non-transitory computer-readable medium storing code for wireless communications at a UE, the code comprising instructions executable by at least one processor to perform a method of any of aspects 35 through 53.

Aspect 88: An apparatus for wireless communications at a network entity, comprising: at least one processor; and memory coupled with the at least one processor, the memory storing instructions executable by the at least one processor to cause the network entity to perform a method of any of aspects 54 through 70.

Aspect 89: An apparatus for wireless communications at a network entity, comprising: at least one means for performing a method of any of aspects 54 through 70.

Aspect 90: A non-transitory computer-readable medium storing code for wireless communications at a network entity, the code comprising instructions executable by at least one processor to perform a method of any of aspects 54 through 70.

Aspect 91: An apparatus for wireless communications at a UE, comprising: at least one processor; and memory coupled with the at least one processor, the memory storing instructions executable by the at least one processor to cause the UE to perform a method of any of aspects 71 through 77.

Aspect 92: An apparatus for wireless communications at a UE, comprising: at least one means for performing a method of any of aspects 71 through 77.

Aspect 93: A non-transitory computer-readable medium storing code for wireless communications at a UE, the code comprising instructions executable by at least one processor to perform a method of any of aspects 71 through 77.

Aspect 94: An apparatus for wireless communications at a network entity, comprising: at least one processor; and memory coupled with the at least one processor, the memory storing instructions executable by the at least one processor to cause the network entity to perform a method of any of aspects 78 through 84.

Aspect 95: An apparatus for wireless communications at a network entity, comprising: at least one means for performing a method of any of aspects 78 through 84.

Aspect 96: A non-transitory computer-readable medium storing code for wireless communications at a network entity, the code comprising instructions executable by at least one processor to perform a method of any of aspects 78 through 84.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by at least one processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by at least one processor, the functions may be stored on or transmitted over as one or more instructions or code on a computer-readable medium. Other examples and implementations are within the scope of the disclosure and appended claims. For example, due to the nature of software, functions described herein may be implemented using software executed by at least one processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "determine" or "determining" or "identify" or "identifying" encompasses a wide variety of actions and, therefore, "determining" or "identifying" can include calculating, computing, processing, deriving, investigating, looking up (such as via looking up in a table, a database or another data structure), or ascertaining. Also, "determining" or "identifying" can include receiving (such as receiving information or signaling, e.g., receiving information or signaling for determining, receiving information or signaling for identifying) or accessing (such as accessing data in a memory, or accessing information). Also, "determining" or "identifying" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
at least one processor; and
memory coupled with the at least one processor, the memory storing instructions executable by the at least one processor to cause the UE to:
receive one or more control messages that indicate a first configuration for a first downlink bandwidth part and a second configuration for a second downlink bandwidth part specific to reduced capability UEs, the first configuration identifying a first set of resources within the first downlink bandwidth part, the second configuration identifying a second set of resources within the second downlink bandwidth part;
monitor the first set of resources within the first downlink bandwidth part according to the first configuration, a radio resource control state of the UE, and a capability of the UE; and
monitor the second set of resources within the second downlink bandwidth part specific to reduced capability UEs according to the second configuration, the radio resource control state of the UE, and the capability of the UE, wherein the second set of resources within the second downlink bandwidth part specific to reduced capability UEs is monitored for multicast broadcast services (MBS), and wherein the second downlink bandwidth part specific to reduced capability UEs includes at least one of a cell-defined synchronization signal block (CD-SSB) or a control resource set with an index of zero (0).

2. The apparatus of claim 1, wherein the instructions are further executable by the at least one processor to cause the UE to:
determine a first set of parameters for the first downlink bandwidth part based at least in part on the first configuration, the first set of parameters comprising one or more of a cyclic prefix, a subcarrier spacing, a number of resource blocks, or a number of symbols for a control resource set within the first downlink bandwidth part; and
determine a second set of parameters for the second downlink bandwidth part specific to reduced capability UEs based at least in part on the second configuration, the second set of parameters comprising one or more of a bandwidth, a first physical resource block, or a subcarrier spacing for the second downlink bandwidth part.

3. The apparatus of claim 1, wherein, to monitor the first set of resources, the instructions are executable by the at least one processor to cause the UE to:
receive at least one message of a paging operation via a common search space within the first downlink bandwidth part according to the first configuration and the capability of the UE, wherein the first downlink bandwidth part includes the control resource set with the index of zero (0).

4. The apparatus of claim 1, wherein, to monitor the second set of resources, the instructions are executable by the at least one processor to cause the UE to:
receive one or more random access messages via the second set of resources within the second downlink bandwidth part specific to reduced capability UEs according to the second configuration, the radio resource control state of the UE, and the capability of the UE, wherein the second downlink bandwidth part does not include the control resource set with the index of zero (0).

5. The apparatus of claim 1, wherein the instructions are further executable by the at least one processor to cause the UE to:
receive, via one or more physical downlink control channel resources within the first downlink bandwidth part, a downlink message that schedules transmission of a first system information block within the first downlink bandwidth part, wherein the first system information block indicates the second configuration of the second downlink bandwidth part specific to reduced capability UEs.

6. The apparatus of claim 1, wherein, to monitor the first set of resources, the instructions are executable by the at least one processor to cause the UE to:
receive one or more CD-SSBs via the first set of resources within the first downlink bandwidth part; and
perform a cell selection procedure based at least in part on a measurement of the one or more CD-SSBs.

7. The apparatus of claim 1, wherein, to receive the one or more control messages, the instructions are executable by the at least one processor to cause the UE to:
receive an indication of a search space configured for downlink small data transmissions in the first downlink bandwidth part or the second downlink bandwidth part; and
monitor the search space for a downlink small data transmission in accordance with the indication.

8. The apparatus of claim 1, wherein, to receive the one or more control messages, the instructions are executable by the at least one processor to cause the UE to:
receive a master information block that indicates the first configuration of the first downlink bandwidth part; and
receive a system information block that indicates the second configuration of the second downlink bandwidth part.

9. The apparatus of claim 1, wherein the instructions are further executable by the at least one processor to cause the UE to:
receive one or more of a system information message, a message of a paging operation, a random access message, a small data transmission, a broadcast message, a public warning system notification, or a non-cell-defined synchronization signal block via one or more control resource sets or search space sets within the first downlink bandwidth part or the second downlink bandwidth part specific to reduced capability UEs.

10. The apparatus of claim 1, wherein the instructions are further executable by the at least one processor to cause the UE to:
receive one or more CD-SSBs, a system information message, a message of a paging operation, or a random access message, or a combination thereof via the first set of resources within the first downlink bandwidth part according to the first configuration, the radio resource control state of the UE, and the capability of the UE.

11. The apparatus of claim 1, wherein the instructions are further executable by the at least one processor to cause the UE to:
transmit one or more of a small data transmission, a random access message, UE mobility information, or a request for on-demand system information via one or more resources within an uplink bandwidth part configured for the UE.

12. The apparatus of claim 1, wherein the instructions are further executable by the at least one processor to cause the UE to:
transmit a request for on-demand system information via one or more resources within an uplink bandwidth part configured for the UE; and
receive the on-demand system information via the first set of resources within the first downlink bandwidth part or the second set of resources within the second downlink bandwidth part.

13. The apparatus of claim 12, wherein the UE transmits the request for on-demand system information in accordance with a random access procedure.

14. The apparatus of claim 1, wherein a bandwidth of the second downlink bandwidth part specific to reduced capability UEs is less than or equal to a maximum downlink bandwidth supported by the UE.

15. The apparatus of claim 1, wherein the one or more control messages include a master information block, a system information block, a radio resource control message, or a combination thereof.

16. The apparatus of claim 1, wherein the first downlink bandwidth part is used for reception of CD-SSBs.

17. The apparatus of claim 1, wherein:
the UE is a reduced capability UE; and
the radio resource control state of the UE comprises an idle radio resource control state or an inactive radio resource control state.

18. The apparatus of claim 1, wherein:
the first downlink bandwidth part comprises a first set of common search spaces configured for cell selection procedures or cell re-selection procedures; and
the second downlink bandwidth part comprises a second set of common search spaces configured for random access procedures or paging operations.

19. The apparatus of claim 1, wherein:
the first downlink bandwidth part comprises one or more common search spaces configured for system information acquisition or paging operations.

20. The apparatus of claim 1, wherein the instructions are further executable by the at least one processor to cause the UE to:
determine a quantity of control resource sets within the second downlink bandwidth part based at least in part on a quantity of control resource sets within the first downlink bandwidth part, a summation of control resource sets within other downlink bandwidth parts of the UE, a threshold quantity of control resource sets supported by the UE, or a combination thereof.

21. The apparatus of claim 1, wherein the instructions are further executable by the at least one processor to cause the UE to:
determine a quantity of search space sets within the second downlink bandwidth part based at least in part on a quantity of search space sets within the first downlink bandwidth part, a summation of search space sets within other downlink bandwidth parts of the UE, a threshold quantity of search space sets supported by the UE, or a combination thereof.

22. The apparatus of claim 1, wherein the instructions are further executable by the at least one processor to cause the UE to:
switch from the first downlink bandwidth part to the second downlink bandwidth part after transitioning from a first operating mode associated with the first downlink bandwidth part to a second operating mode associated with the second downlink bandwidth part.

23. The apparatus of claim 1, wherein, to receive the one or more control messages, the instructions are executable by the at least one processor to cause the UE to:
receive system information that indicates at least one of an aggregation level, a monitoring periodicity, or a monitoring occasion configuration for common search space sets within the second downlink bandwidth part specific to reduced capability UEs.

24. The apparatus of claim 1, wherein, to receive the one or more control messages, the instructions are executable by the at least one processor to cause the UE to:
receive a system information block that indicates a first downlink control information size alignment for physical downlink control channel messages scheduled in search space sets of the first downlink bandwidth part, a second downlink control information size alignment for physical downlink control channel messages scheduled in search space sets of the second downlink bandwidth part, or both.

25. The apparatus of claim 1, wherein, to receive the one or more control messages, the instructions are executable by the at least one processor to cause the UE to:
receive an indication of a quantity of physical resource blocks within the second downlink bandwidth part specific to reduced capability UEs, wherein the quantity of physical resource blocks is based at least in part on a control channel element aggregation level of control resource sets within the second downlink bandwidth part, a time duration of control resource sets within the second downlink bandwidth part, a total number of control resource sets within the second downlink bandwidth part, the radio resource control state of the UE, or a combination thereof.

26. The apparatus of claim 1, wherein, to receive the one or more control messages, the instructions are executable by the at least one processor to cause the UE to:
receive one or more of a system information message, a radio resource control message, a broadcast message, or a multicast message that indicates a control channel element aggregation level for search space sets within the second downlink bandwidth part, a quantity of blind decoding candidates for search space sets within the second downlink bandwidth part, or both.

27. An apparatus for wireless communication at a network entity, comprising:

at least one processor; and memory coupled with the at least one processor, the memory storing instructions executable by the at least one processor to cause the network entity to:

transmit one or more control messages that indicate a first configuration for a first downlink bandwidth part and a second configuration for a second downlink bandwidth part specific to reduced capability UEs, the first configuration identifying a first set of resources within the first downlink bandwidth part, the second configuration identifying a second set of resources within the second downlink bandwidth part;

transmit a first downlink message to a reduced capability UE via the first set of resources within the first downlink bandwidth part according to the first configuration indicated by the one or more control messages; and transmit a second downlink message to the reduced capability UE via the second set of resources within the second downlink bandwidth part specific to reduced capability UEs according to the second configuration indicated by the one or more control messages, wherein the second set of resources within the second downlink bandwidth part specific to reduced capability UEs is usable for multicast broadcast services (MBS), and wherein the second downlink bandwidth part specific to reduced capability UEs includes at least one of a cell-defined synchronization signal block (CD-SSB) or a control resource set with an index of zero (0).

28. The apparatus of claim 27, wherein, to transmit the first downlink message via the first set of resources, the instructions are executable by the at least one processor to cause the network entity to:

transmit at least one message of a paging operation to the reduced capability UE via a common search space within the first downlink bandwidth part according to the first configuration, wherein the first downlink bandwidth part includes the control resource set with the index of zero (0).

29. A method for wireless communication at a user equipment (UE), comprising:

receiving one or more control messages that indicate a first configuration for a first downlink bandwidth part and a second configuration for a second downlink bandwidth part specific to reduced capability UEs, the first configuration identifying a first set of resources within the first downlink bandwidth part, the second configuration identifying a second set of resources within the second downlink bandwidth part;

monitoring the first set of resources within the first downlink bandwidth part according to the first configuration, a radio resource control state of the UE, and a capability of the UE; and monitoring the second set of resources within the second downlink bandwidth part specific to reduced capability UEs according to the second configuration, the radio resource control state of the UE, and the capability of the UE, wherein the second set of resources within the second downlink bandwidth part specific to reduced capability UEs is monitored for multicast broadcast services (MBS), and wherein the second downlink bandwidth part specific to reduced capability UEs includes at least one of a cell-defined synchronization signal block (CD-SSB) or a control resource set with an index of zero (0).

30. A method for wireless communication at a network entity, comprising:

transmitting one or more control messages that indicate a first configuration for a first downlink bandwidth part and a second configuration for a second downlink bandwidth part specific to reduced capability UEs, the first configuration identifying a first set of resources within the first downlink bandwidth part, the second configuration identifying a second set of resources within the second downlink bandwidth part;

transmitting a first downlink message to a reduced capability UE via the first set of resources within the first downlink bandwidth part according to the first configuration indicated by the one or more control messages; and transmitting a second downlink message to the reduced capability UE via the second set of resources within the second downlink bandwidth part specific to reduced capability UEs according to the second configuration indicated by the one or more control messages, wherein the second set of resources within the second downlink bandwidth part specific to reduced capability UEs is usable for multicast broadcast services (MBS), and wherein the second downlink bandwidth part specific to reduced capability UEs includes at least one of a cell-defined synchronization signal block (CD-SSB) or a control resource set with an index of zero (0).

\* \* \* \* \*